DIGITAL DATA PROCESSING SYSTEM

Filed Aug. 16, 1965 7 Sheets-Sheet 1

INVENTORS:
Max Palevsky
Ralph Dames
Leo Levine
By Smyth, Roston & Pavitt
Attorneys

DIGITAL DATA PROCESSING SYSTEM

Filed Aug. 16, 1965 7 Sheets-Sheet 2

INVENTORS:
Max Palevsky
Ralph Dames
Leo Levine
By Smyth, Roston & Pavitt
Attorneys

DIGITAL DATA PROCESSING SYSTEM

Filed Aug. 16, 1965 7 Sheets-Sheet 3

INVENTORS:
Max Palevsky
Ralph Dames
Leo Levine

By Smyth, Roston & Pavitt
Attorneys

Fig. 5

| | |
|---|---|
| Ao | Initialization |
| A1 | Digit switch assignment, $\mu$ |
| Aa | Digit switch assignment, $X(0)$ |
| Ab | Digit switch assignment, $\dot{X}(0)$ |
| Ac | Arithmetic instructions to calculate $f(X(0))$, to calculate $g(0)$, and to calculate $-\mu \cdot \dot{x}(0) - f(X(0)) + g(0) = \ddot{X}(0)$ |
| Ad-1 | Store $\ddot{X}(0)$ in "Address – $\ddot{X}(0)$" |
| Ad | Display assignment $\ddot{X}(0)$ |
| Ae | Display assignment $g(0)$ |
| Af | Display assignment $f(X(0))$ |
| Aoo | – BRANCH TO LOCATION M1 |
| Ao1 | Arithmetic instructions for "integrating" $x(t+\Delta t)$ from $x(t)$ and $\dot{x}(t)$; $\dot{x}(t+\Delta t)$ from $\dot{x}(t)$ and $\ddot{X}(t)$; and storing $x$ and $\dot{x}$ |
| An | Digit switch assignment, $\mu$ |
| Aob | Arithmetic instructions to calculate $-\mu \cdot \dot{x}(t+\Delta t) - f(x) + g = \ddot{X}(t+\Delta t)$ and to store $\ddot{X}(t+\Delta t)$ |
| Am | Display assignment $\ddot{X}$ |
| Ak | Display assignment $\dot{X}$ |
| AL | Display assignment $X$ |
| BO | – BRANCH TO LOCATION M2 |
| B1 | Arithmetic instructions to calculate $g(t)$ and $f(X(t))$ |
| Ba | Display assignment $g(t)$ |
| Bb | Other output instructions |
| BEND | – BRANCH TO LOCATION M3 |

RATE 1 ITERATION LINKING SUBROUTINE (BO → Ao1)

RATE 2 ITERATION LINKING SUBROUTINE (BEND → Ao1)

INVENTORS:
Max Palevsky
Ralph Dames
Leo Levine
By [signature]
Attorneys

TABLE I

PROBLEM PROGRAM

| MEMORY LOCATION | INSTR. CODE | ADDR. | |
|---|---|---|---|
| $A_n$ | BRM | $P_1$ | |
| $A_{n+1}$ | EOM | (DIGIT SWITCH) | |
| $A_{n+2}$ | FLM | | FOR SCALING |
| $A_{n+3}$ | FLA | | |
| $A_{n+4}$ | STF | (PARAMETER LOCATION) | |
| $A_{n+5}$ | NEXT PROBLEM PROGRAM INSTR. | | |

ENTRY FROM RATE 2 → $P_4$

| MEMORY LOCATION | INSTR. CODE | ADDR. (OPERAND) | INDIRECT ADDRESSING MODIF. |
|---|---|---|---|
| $P_1$ | PZE | (Receives $A_n$) | |
| $P_2$ | EAX | (Number - 0) | 0 |
| $P_3$ | BRU | $P_3 + 3$ | 0 |
| $P_4$ | PZE | (Receives $B_n$) | 0 |
| $P_5$ | EAX | (Number - 3) | 3 |
| $P_6$ | MPO | $P_1$ (= $A_n$) | $P_1$+3(= $B_n$) |
| $P_7$ | EXU | $P_1$ (= $A_{n+1}$) | |
| $P_8$ | PIN | P | P+3 |
| $P_9$ | SKN | P | P+3 |
| $P_{10}$ | BRU | $P_{10}$+4 | |
| $P_{11}$ | LDA | (Number 3) | |
| $P_{12}$ | ADM | $P_1$ ($A_{n+1}$) | $P_4$($B_{n+1}$) |
| $P_{13}$ | BRR | $P_1$ ($A_{n+4}$) | $P_4$($B_{n+4}$) |
| $P_{14}$ | LDA | P | P+3 |
| $P_{15}$ et seq | Instructions to change format | | |
| $P_x$ | BRR | $P_1$ ($A_{n+1}$) | $P_4$($B_{n+1}$) |

TABLE II

| MEMORY LOCATION | INSTR. CODE | ADDR. |
|---|---|---|
| $A_m$ | SKS | (DISPLAY SWITCH) |
| $A_{m+1}$ | BRU | $A_{m+3}$ |
| $A_{m+2}$ | BRU | $A_{m+5}$ |
| $A_{m+3}$ | LDP | X |
| $A_{m+4}$ | BRM | $D_o$ |
| $A_{m+5}$ | Next instr. | |

| MEMORY LOCATION | INSTR. CODE | ADDR. |
|---|---|---|
| $D_o$ | PZE | |
| $D_1$ | LDX | $D_o$ |
| $D_2$ et seq | Format conversion | |
| $D_{x+1}$ | STA | D |
| $D_{x+2}$ | EOM | Display device |
| $D_{x+3}$ | POT | D |
| $D_{x+4}$ | BRR (Index Reg.) | |

Fig. 6A

INVENTORS:
Max Palevsky
Ralph Dames
Leo Levine

By Smyth, Roston & Pavitt
Attorneys

TABLE III

| MEMORY LOCATION | INSTR. CODE | ADDR. |
|---|---|---|
| → LDC → | 40 → | BRM - No |
| No | PRE | (Stores Branch Location) |
| N1 | LDX | (1, 0) |
| N2 | EXU | Nx+ |
| N3 | BRU | N5 |
| N4 | DRX | N2 |
| N5 | FSTR | FLAG 6 |
| N6 | BRU | Nz |
| N7 | BRV | Ny + index |
| Nz | Store Ny + index into M3 | |
| Nz+m | BRR | No |
| Ny | BRC | (Set up) |
| Ny+1 | BRU | RT1 |
| Ny+2 | BRU | HD1 |
| Ny+3 | BRU | SF1 |
| Ny+4 | BRU | O1 |
| Nx | SKS | "SET UP" |
| Nx+1 | SKS | "RESET" |
| Nx+2 | SKS | "HOLD" |
| Nx+3 | SKS | "SINGLE FRAME" |
| Nx+4 | SKS | "OPER" |
| H1 | STORES BRANCH POINT | |
| H2 et seq | Alternative subroutine | |
| Hx | EOM | "Frame select" |
| Hx+1 | PIN | H |
| Nx+2 et seq | Format Conversion | |
| Hy | STD | Δ |

| MEMORY LOCATION | INSTR. CODE | ADDR. (OPERAND) |
|---|---|---|
| RT1 | EOM | "RESET LIGHT" |
| RT2 | FIRS | FLAG 6 |
| RT3 | STD | "TIME" |
| RT4 | BRM | H1 |
| RT5 | LDA | RD1 |
| RT6 | STA | M1 |
| RT7 | BRV | M5 (A1) |
| FROM M1 → RD1 | EOM | "READY LIGHT" |
| RD2 | FIRS | FLAG 6 |
| RD3 | BRV | RD3 |
| HD1 | EOM | "HOLD LIGHT" |
| HD2 | FIRS | FLAG 6 |
| HD3 | BRU | HD3 |
| O1 | BRM | H1 |
| O2 | FIRS | FLAG 6 |
| O3 | SKS | REAL TIME SW. |
| O4 | BRU | O9 |
| O5 | EOM | OPER LIGHT |
| O6 | LDP | S1, S4 |
| O7 | STD | M2, M3 |
| O8 | BRU | S4 → |
| O9 | LDP | R1, R7 |
| O10 | STD | M2, M3 |
| O11 | EOM | "OPER LIGHT" |
| O12 | BRU | O12 |
| Hy+1 | EOM | "Multiple Select" |
| Hy+2 | PIN | H |
| Hy+3 et seq | FORMAT CONVERSION | |
| Hz | STD | "MULT" |
| Hz+1 | BRR | H1 |

Fig. 6B

INVENTORS:
Max Palevsky
Ralph Dames
Leo Levine
By Smyth, Roston & Pavitt
Attorneys INVENTORS:
Max Palevsky
Ralph Dames
Leo Levine
By Smyth, Roston & Pavitt
Attorneys United States Patent Office
3,406,379
Patented Oct. 15, 1968

3,406,379
DIGITAL DATA PROCESSING SYSTEM
Max Palevsky and Leon Levine, Los Angeles, and Ralph T. Dames, Redondo Beach, Calif., assignors to Scientific Data Systems, Inc., Santa Monica, Calif., a corporation of Delaware
Filed Aug. 16, 1965, Ser. No. 480,016
52 Claims. (Cl. 340—172.5)

ABSTRACT OF THE DISCLOSURE

The disclosure relates to a digital analog simulator using a general purpose digital computer for solving differential equations by providing the solution through successive iteration cycles. A console is provided with a number of switches to permit an operator to communicate with the computer during execution of a program. The communicator is described in detail as to both computer and console. By way of programmed assignment, groups of switches are associated with particular parameters of the differential equation to be solved and the state of these switches is interrogated during each iteration cycle. The independent variable of a differential equation is varied in steps, adjustable through the console. A particular clock is provided to provide interrupt pulses at a rate equal to the increment of the independent variable interpreted as time, so that the computer presents progressive values of the solution as real time progresses. A special set of switches permits variations in the functional relationship of the quantities involved in the differential equation to be solved. A special mode control section causes subdividing of the solution of the differential equation into several steps, separating in particular a mode for calculating initial conditions out of boundary values and from which iteration can then proceeed automatically or in individually controllable steps in two other modes. Another set of switches in the console is assignable to particular variables to control selective display of the value of that variable as the calculations progress.

The present invention relates to a system which permits analog simulation by digital data processing. In recent years it has become increasingly interesting to provide digital means such as digital computers, for purposes of analog simulation. In particular, developments have arisen using digital computers for solving differential equations, while for a long time this has been the domain of analog computers. It is well recognized that digital computers have indeed a great accuracy of solution. Although the analog computer has an inherent limit defined by the accuracy with which an electronic component can be designed, a digital computer can increase its accuracies simply by using numbers with more significant digits. Additionally, a digital computer has a great ability to perform operations like the generation of function with several variables and logical decision functions. It is a basic feature of the digital computer that unlike the analog computer it has logical capabilities and can thus solve a larger class of problems. Furthermore, digital computers in general, have a greater reliability of machine performance, and, most of all, it is easier to store an entire program into a digital computer, particularly if a general purpose computer is used wherein the program can be stored in cards or magnetic tape. The analog computer requires considerable bulky patchboards for program storage.

The stored program concept of the so-called general purpose computer allows a wide flexibility because the design of the computer itself is independent from any problem description. Moreover, non-linearity of functions appearing in mathematical problems do not present any difficulties to the digital computer. One can say that the digital computer is completely indifferent to the degree of non-linearity involved. This holds by no means true for analog computers.

However, the analog computer has one basic advantage over the digital computer for analog simulating programs; it was possible with relative ease to change a program in an analog computer; particularly when using addressable potentiometers or the like the operator could change the program while it was run. On the other hand, digital computers in general require a complete program to be entered into the machine, and the machine will then execute the program. Very few possibilities exist which permit to influence or to change the execution of a program, and any desired data change requires in most instances complete reprogramming. This holds true even though only a small part of the program may be involved for purposes of making the desired change.

In addition, one particular aspect of the digital computer operation has been heretofore completely disregarded in general, and this is particularly true in the case of analog simulation such as solving of a differential equation in non-real time or in real time environment. This difficulty is inherent in the fact that the person who seeks solution of a particular problem such as a particular differential equation or system of such equations, will in general not be equipped to program a computer. For this purpose he needs an intermediary, a programmer. This by itself may not be too disturbing, if one were only concerned with the initial programming and the setting up of the digital computer to run the program. The main difficulty arises when the scientists or mathematician seeks the solution of a differential equation whose terms he cannot state with absolute certainty. In other words, it is possible that he does not know himself completely the configuration of the equation, the numerical values of parameters, and boundary conditions involved for solving the differential equation. Particularly, for problems involving time as an independent variable, initial conditions are required for obtaining a definite solution of any differential equation involved. In this case it may be required to make some arbitrary numerical assumptions at the beginning and turn these assumptions over to the computer programmer for programming. After obtaining the solution, the scientists will then see to what extent these assumptions were correct and entirely satisfactory. In many instances, possibly most instances, this will not be the case at first. He then informs the programmer which changes have to be made, the programmer reprograms the computer, the problem is run again and so forth.

At no time is it possible for the scientist to personally observe how the program runs, how the solution develops, and particularly he is not in a position while the program is run to make any changes which he might feel desirable. In other words, for many cases, the scientist or mathematician is desirous to have the problem solved on a trial and error basis whereby inaccuracies necessarily enter into the picture. If in this trial and error method a computer programmer is "interposed" who does not understand the nature of the problem, very disturbing and annoying delays will necessarily result.

It is an interesting factor how little regard has been given in the past as far as the time of people is concerned who seek solutions of problems. Where the computer itself may be extremely efficient, the delay involved due to reprogramming may be such that the speed of the computer is offset to a large extent by this delay, and the scientist may have to wait for the solution for an extremely long period of time up to a point in which the usefulness of the machine itself becomes questionable.

The present invention now is concerned primarily with a system which permits the human operator to communicate with a computer while a program for solving a differential equation is run, and to exercise control over the execution of the program without requiring any knowledge as far as the computer programming is concerned; he will exercise this control strictly on the basis of a continuous and selective observation of problem variables. More particularly, after an initial programming has been made in any suitable manner the inventive system permits the program to be changed without actually reprogramming the computer.

The program for solving a differential equation is a contiguous entity as far as sequence of possible execution is concerned, but it is divisible into parts which can be executed separately. The human operator is equipped with a means enabling him to control the stepwise execution of parts of the contiguous program. These steps are as far as the computer proper is concerned, basically arbitrary; they divide the program into subprograms, and the individual execution of such parts or subprogram permits the operator to observe how the execution of the program, i.e., the progressive production of the solution develops.

The invention includes a plurality of operating elements preferably assembled in a special console which has a panel enabling a human operator to run the computer program without having any special knowledge as far as conventional operation of the computer is concerned. The digit computer is of the stored program type and has stored a program in its operating memory destined to solve a differential equation or equations linking one or more variables and their derivates in a mathematical, functional relationship. For convenience of wording the case of one dependent variable and one equation shall be used in the following for purposes of description, but it is understood, that several variables and groups of equations can be handled by the system.

The program has basically two parts. One part includes an iteration program which when executed repeatedly calculates discrete number values of the dependent variable by one or more stepwise integration approximations using previously calculated values of this variable, its derivatives of any order and using further the functional relationship as defined by the differential equation. The second program part actually precedes the first program part and calculates all of the number values needed to begin the iteration, using also the equation and numerical, initial condition values.

Aside from the functional relationship among the variable, its derivatives, fixed numbers and for example true physical constants, the equation will always include an independent variable. The calculation requires selection of discrete values the independent variable to produce a corresponding value of the dependent variable by operation of the functional relationship. The dependent variable is formed by iteration. The independent variable is presented as progressive numbers which are apart from each other by a fixed number increment expressible as a whole number, as usually the decimal point is freely insertable. This increment is preselectable by way of an adjusting means. For example, at the beginning of the first part of the program and prior to the iteration proper, that increment is sampled from the adjusting means for subsequent use as the determining number of the progression of the independent variable. For the case that the independent variable is interpreted as time, selective control means are provided permitting the computer to execute the iteration program part once for each period of time in real time of the adjusted increment.

The differential equation may include parameters other than the said fixed numbers. Such parameters usually appear, for example, as factors for derivates. The numerical value of such parameters may be uncertain. Thus, there are provided adjusting means for providing numerical values of such parameters independently from the computing program proper. During either part of the program and specifically during each iteration the parameter adjusting means are sampled, and the values as sampled are used for the calculation. The part of the program which calculates the numbers needed for commencing iteration, may also include such parameters defining initial condition values of the dependent variable and its derivatives.

A display screen is provided associated with several switching means, each switching means being assignable to any of the calculated variable, derivates, any intermediate values, etc. These switching means are likewise sampled during either program part and specifically repeatedly during iteration and the operated one determines what value is to be displayed. As during iteration the displayed value is updated the operator can thus observe how the program runs. Control switching means are provided to permit execution of the program parts individually, at will, and once the part calculating initial conditions has been executed once, either part may be executed again in any succession as often as needed for proper parameter adjustment, whereby the iteration part can be made to repeat itself as often as needed until stopped. Thus the human operator can interfere in the execution of the program and can make changes in parameters involved; he can make changes in the accuracy of the digital process, he can observe the change of final or intermediate variables as they are being calculated by, for example, progressively repeated iterations in the digital computer, he can start the problem over again by using different numbers for the initial conditions and as often as he deems desirable.

While the specification concludes with claims particularly pointing out and distinctly claming the subject matter which is regarded as the invention, it is believed that the invention, the objects and features of the invention and further objects, features and advantages thereof will be better understood from the following description taken in connection with the accompanying drawing in which:

FIGURE 1 illustrates a perspective view of the general layout of differential equation solving system in accordance with the present invention;

FIGURE 1*a* illustrates schematically the digital word format used for controlling the digital computer which is a part of the system shown in FIGURE 1;

FIGURE 5 is a schematic representation of the layout of a program which is considered a part of the computer when operating the differential equation solver in connection with the console shown in FIGURES 2 and 3;

Figure 6C:
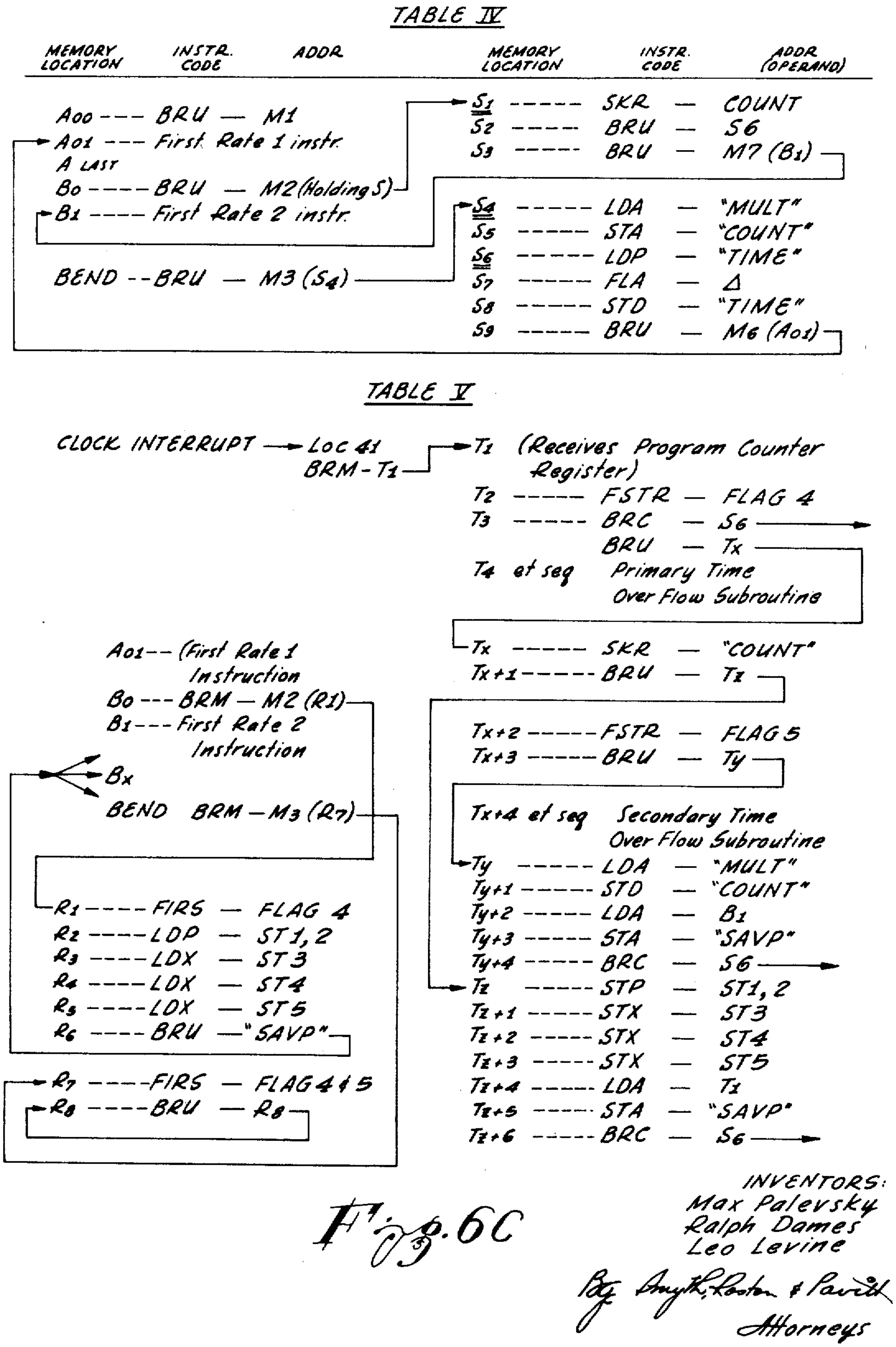

FIGURES 6*a*, *b* and *c* are program tables showing the state of a section of the memory of the computer for solving differential equations.

Figure 1:
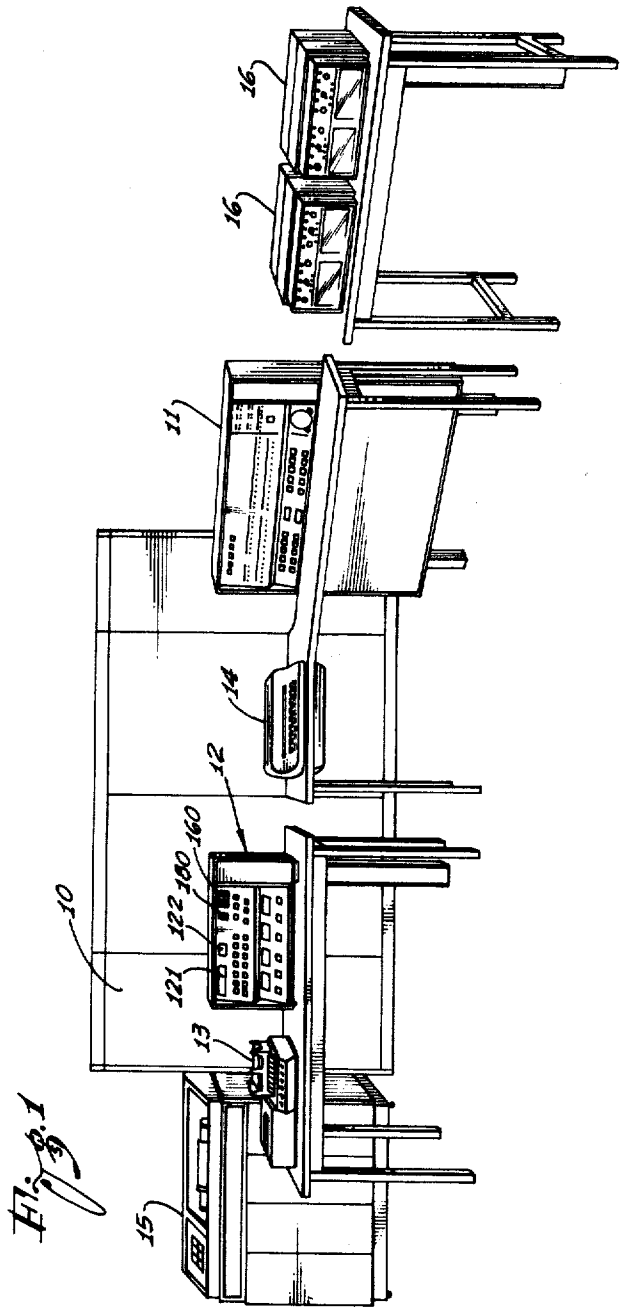

In FIGURE 1 there is shown an overall view of the physical layout of the differential equation solver system in accordance with the invention. Reference numeral 10 indicates the cabinet of a general purpose computer, for example, a computer of the type traded under the name "SDS–9300." This computer is a high-speed, general purpose digital computer designed for rapid computation and includes provisions for real time control.

This computer has as its basic data format a 24-bit word, and it includes circuitry permitting floating point operations, so that the word length can be expanded to a 48-bit word for floating point arithmetic. This computer permits indirect addressing with unlimited address cascading. It has as a basic memory unit a core memory permitting storage of 4,096 words, 8,192 words or 16,384 words and expansion is permitted. These and other salient features of this computer as far as necessary for understanding the invention will be developed more fully below. This computer 10 cooperates with peripheral equipment including the following components.

There is the main computer operator console 11 for supervision operation and being adapted to control the computer in its general functions, thus permitting utilization of this unit on a time sharing basis to operate on problems other than solving of differential equations. This console 11 also includes switching means such as are necessary to put the computer proper into operation. However, as will be developed more fully below the computer when used as a differential equation solver will be controlled after power supply has commenced, substantially from a console 12 designed as communication unit between an operator seeking a solution to a differential equation and the computer proper.

Other peripheral equipment includes a card reader 13, for example, the punched card reader traded under the model designation "SDS–9151" which is standard equipment to be used whenever information stored in punched cards are to be read into the computer 10. As a supplementing or alternative input device there is a typewriter 14 coupled likewise to the computer 10 for input operations. This typewriter provides for manual entry of information to the computer 10, and it can be used for print-out of results. Numeral 15 designates a line printer which, for example, may be of the type traded under the designation "SDS–9174" or "SDS–9178." These are fully buffered line printers operating at a rate of 300 lines per minute for printing out any result obtained by operation of the computer 10.

Reference numeral 16 denotes two magnetic tape units which are, for example, of the type traded under the designation "Magpak," to be used for cooperation with the computer as memory extension with non-random access and permitting temporary as well as permanent storage data to be used in computer operation. With the exception of the console 12, the elements 13, 14, 15 and 16 are peripheral computer equipments which are known, in general, and have been used to advantage in cooperation with the computer 10 which, as was mentioned above, may, for example, be of the "SDS–9300" series.

A general purpose computer of this type in general is operated in the following manner. The principal mode of operation is the sequential response to codes called instructions. The computer "executes" such instructions by performing operations on "data words." The list or sequence of such instructions is called a program. The sequential execution of the instructions of a program produces the solution to a problem which has been translated into the sequence of instructions that makes up the program.

Figure 1A:
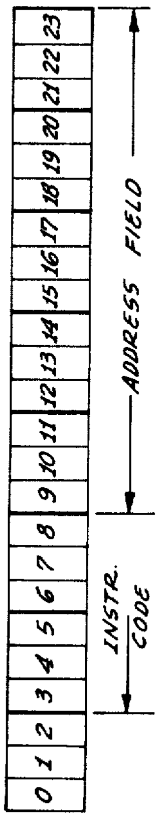

The instructions are represented by bit combinations called instruction words; here, for example, a 24-bit word is used as schematically shown in FIGURE 1*a*. The twenty-four bit positions are distinguishable by bit positions "0" to "23." The bit in position "0" distinguishes between direct and indirect addressing. Bit positions "1" and "2" designate in code the specific register involved for indirect addressing. The six bit positions "3" to "8" contain the instruction code in form of a unique combination of bits from any machine instruction which the computer is capable of executing. Particularly, built-in circuitry in the computer 10 is capable to respond individually to an instruction code and to produce control signals which in effect causes such instruction to be carried out. The last portion of the instruction word, bit positions "9" to "23," is also called the address field, and it designates the location of the operand in the memory called for by the instruction code. In particular, this address field contains the bit combination uniquely assigned to a specific storage location in the permanent memory containing the word with which the instruction as set forth in the instruction code is to be carried out.

For convenience, several of the most important and pertinent instructions will be described in the following. Of particular interest are instructions used to operate this computer 10 particularly as a differential equation solver in conjunction with the console 12. For a complete list of instructions, reference is made to the "9300 Computer Reference Manual" copyrighted 1963 by Scientific Data Systems, Inc., assignee of the instant application. For operating the computer one can, for example, prepare directly a list of such instructions (compiling of a program), and then this list is written into the computer, for example, via the typewriter and in form of a sequence of number codes each identifying an instruction. Here it is of advantage to use an octal code, whereby the twenty-four bit positions of a word can thus be organized into eight octal numbers, each representing three bit positions.

In a different way, punched cards may be prepared first to be fed subsequently into the card reader 13. Upon reading the cards stacked into the card reader 13, the permanent memory of the computer 10 is being loaded, and upon proper manipulation of the console 12, the problem will then be solved, and the result will be printed out by means of the printer 15.

It has been found inconvenient if the program externally compiled by the programmer requires him to list individually and directly all of the machine instructions to be executed by the computer in sequence. It is more convenient to endow the computer with capabilities which permit the computer to compile itself a program in response to simplified input statements each of which the computer is capable of (1) recognizing and (2) converting into a subsequence of instructions proper. "Languages" such as Algol, Fortran, Midas, Dysac and others have been developed for this purpose. The system presently described, however, is not so much concerned with the specific mode of initially programming the computer, as with the problems arising from the fact that it is usually impossible to influence, i.e., modify a program once its execution is in progress. This is particularly important in case of analog simulation, such as the solving of differential equations. The principal drawback of known systems used for solving differential equations is to be seen in the fact that any changes in the problem itself, and for example, any change in a parameter of the differential equation sought to be solved, or a change in the initial conditions, or any change in specific function configurations which forms a component of the differential equation, requires a change in programming, i.e., it requires a reprogramming of the entire computer, there being, of course, always a lengthy interruption. Moreover, this change can only be made by the computer programmer.

Aside from the resulting time delay, one of the basic difficulties here is the separation of the computer programmer from, for example, the mathematician or any other scientist seeking not only a solution to a given differential equation, but if the differential equation itself is not certain in all its aspects, he also seeks to determine whether the differential equation itself is correct or requires modification, and he will do this on the basis of preliminary exploratory solutions.

A person dealing with this problem rarely is trained to program a computer along such lines. On the other hand, the computer programmer is strictly destined to program the computer, i.e., to compile a list of instructions in a manner capable of solving the problem on hand, and he is neither equipped nor authorized to change any part thereof. The inventive system seeks to overbridge this gap in such a manner that the person seeking the solution of the differential equation is capable of directly communicating with the computer during execution of the program without having any knowledge of the specific "machine language" built in, nor does he have to be able to program a computer. The system to be described below is basically a communication system permitting modification of the computer program when executing a program compiled to solve differential equations. The principal communication medium here is the console 12. Additionally, it will be described how any program for analog simulation can be supplemented to the extent that the computer 10 is enabled to continuously communicate with the console 12 in a manner which permits program modifications during execution.

Figure 4:
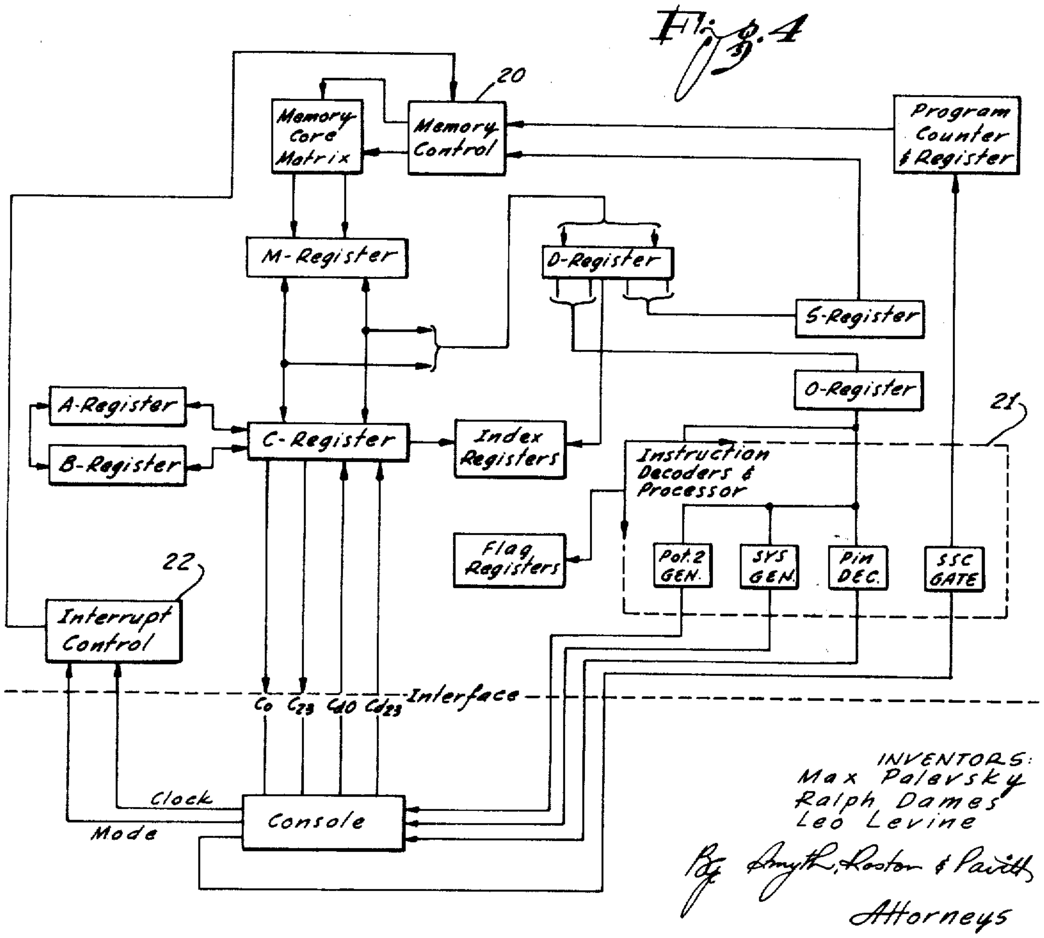
FIGURE 4 illustrates a general block diagram of the principal registers and portions of a representative example of a digital computer and the mode of connecting its principal portions to input and output lines of the console shown in FIGURES 2 and 3.

In order to understand fully the communication aspects as between the console 12 and the computer, it is advisable to briefly explain the basic flow of data between the principal registers of the computer, and reference is made to FIGURE 4. The center element of this computer is, of course, the core memory matrix accessible for input and output operations through an M register whose principal function is to receive information during the memory read process, or to hold the information ready for storage into the memory during a memory write process.

All operands to be received from or to be transmitted to the memory will pass through the C register, being, of course, coupled accordingly, as far as input and output are concerned, to the M register. All instruction words received from the memory will pass into the D register. The instruction code portion will be passed into the O register, which register will always contain the specific instruction code (6 bits) of the instruction currently executed. The address portion of the same instruction word, the code of which is currently held in the O register and executed, is held concurrently in the S register. The respective address defines the memory location to be accessed for executing the instruction and to draw from the core memory an operand which may be either a number word or an instruction, depending, of course, on the type of instruction code then in the O register.

The instruction code held in the O register is decoded in control network 21 which is also the central processor. The response of this processor to all these instruction codes is per se conventional as far as the computer proper is concerned. However, all decoders and responses necessary for communicating with the console 12 will be described in some detail below. The A register is the main accumulator of the computer and is employed in all arithmetic, logical and shifting operations. The B register is an extension of the A register used particularly in case of floating point arithmetic. The registers A and B do not participate directly in the communication of the computer with the console, but they will be referred to frequently when the program and the communication between console and computer will be discussed, because these registers will hold operands for purposes of modifications thereof, which operands are either to be fed into the console or have been drawn out of the console.

Another set of registers include the index registers of which the "SDS-9300" computer has altogether 3. The index registers serve to modify the address of an instruction word and, therefore, will cause a modification of the content of the D register. Whether or not the index registers are used depends on a specific code which is part of an instruction word, usually in the second and third most significant bit positions thereof (see FIGURE 1*a*).

Another register of importance is the so-called "flag" register. The designation is only one of convenience, but it should be mentioned that this register does not contain or receive any data. During arithmetic operations it is employed to receive data overflow that exists, but in general it can be considered as being comprised of a number of bistable stages which are used for marking several operating conditions or phases. These conditions are very important for the communication between console and computer and will be developed more fully below. In general, it can be said that selected ones of the stages of the "flag" register are being set during certain phases of operation and are being reset during other phases of operation, and it very often becomes important to check at a particular instant whether the flag register or a specific portion thereof is in the set or in the reset state.

The register to be discussed finally is the program counter register, which is a 15-bit register that contains the memory address of the current instruction. Unless modified by the program, the program counter is increased by "one" at the completion of execution of each instruction. Thus, in all normal operations, the program will constitute the execution of all those instructions held in memory locations sequentially addressed by the program counter via the program counter register and the memory control. This addressing per se is conventional, the control of the sequences of addressing, however, is an integral part of the invention.

One of the features of a computer of the "SDS-9300" type is that it is equipped with a so-called priority interrupt control system 22. The details of this interrupt system are not of importance here. However, it should be mentioned that as far as communication with the console is concerned, there are two input lines leading into the computer, and they are used for feeding to the computer two interrupt signals. For convenience of description, these input lines may be called "clock" and "mode" interrupt lines. Each one of these interrupt signals is a priority interrupt signal having a degree of priority that will indeed interrupt any current operation of the computer. The priority interrupt operates, in general, in that upon occurrence of an interrupt signal, a specified portion of the memory is accessed directly without disturbing at that instant the program counter. Then the content of the program counter and of the flag register are saved into specific memory locations, and then another instruction will be set into the program counter to be executed in accordance with the priority demands. The two interrupt signals used in the communication as between computer and console will be described more fully below.

*Communication channels and signals*

Figure 2:
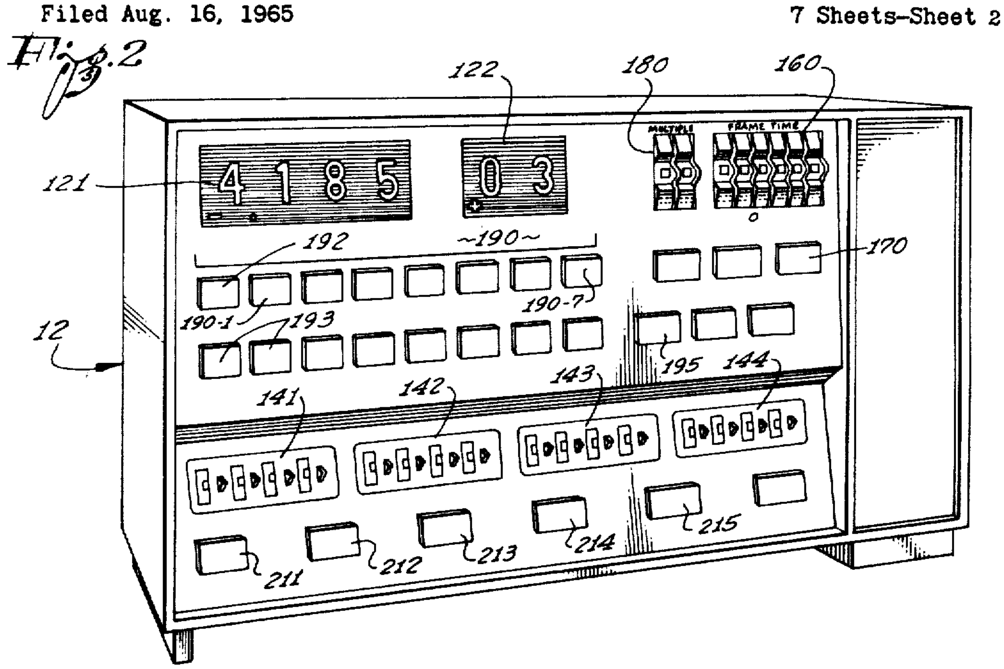
FIGURE 2 illustrates in perspective view an enlargement of the portion of the system shown in FIGURE 1, particularly of the console with which the human operator is capable of communicating with the digital computer.
Figure 3:
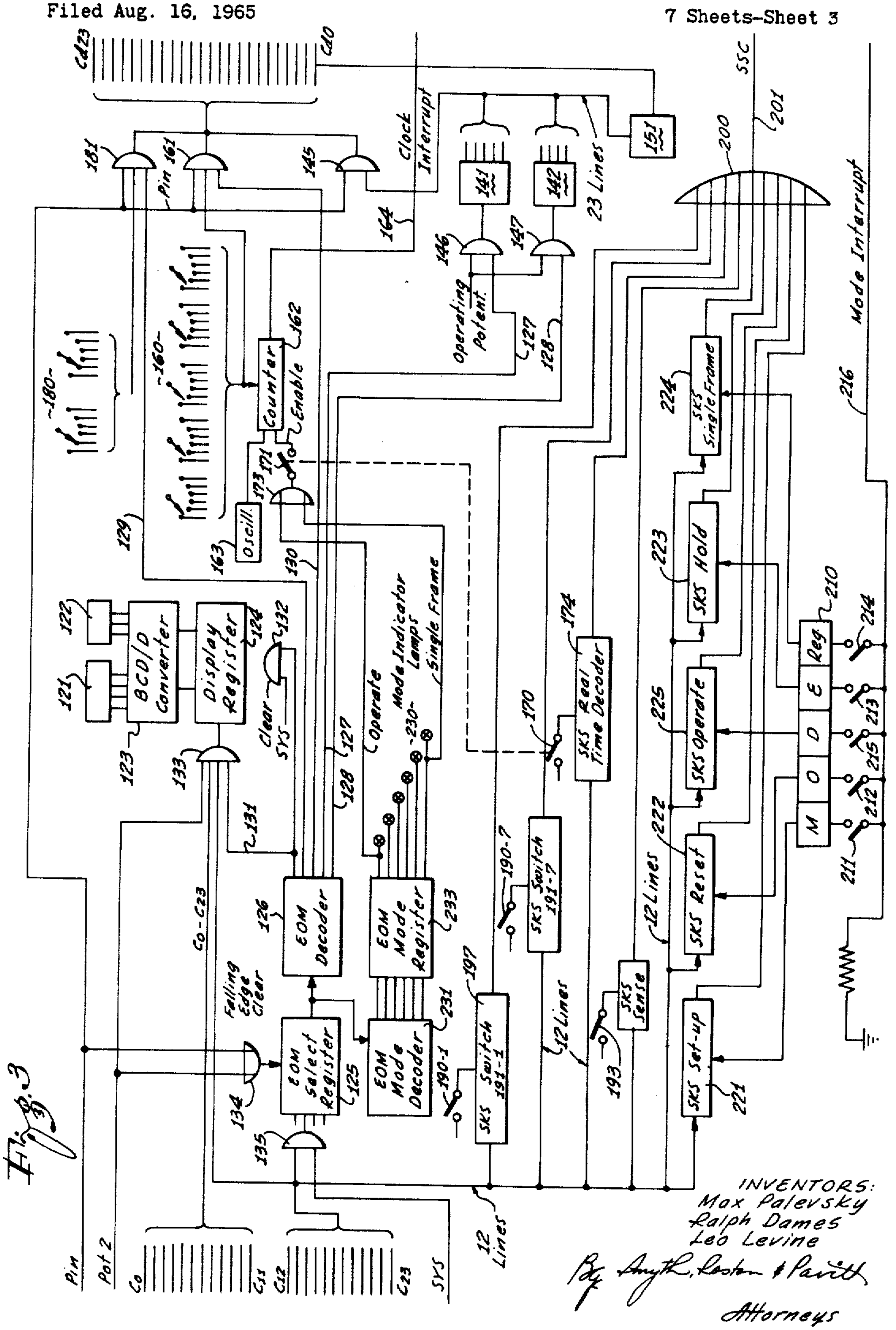
FIGURE 3 illustrates a block diagram of the circuit network which is included in the console shown in FIGURE 2.

Before proceeding to the detailed description of the console which is illustrated as front view in FIGURE 2, and schematically as block diagram in FIGURE 3, it shall be briefly explained in what specific way the console communicates with the computer. Reference is made specifically to FIGURE 4. Reference is being made further and in general to the "SDS-9300 Computer Reference Manual" copyrighted 1963 by Scientific Data Systems, Inc., and explaining several instruction codes including those with which the "SDS-9300" computer communicates with peripheral equipment which is connected to the computer via one of the so-called direct access channels thereof.

In particular, the console 12 is to be connected for direct parallel input and output communications to those connectors provided for this purpose in the "SDS-9300" computer. Specifically, there are available twenty-four output lines denoted with C0 through C23 with which the computer "SDS-9300" furnishes output data in a parallel-by-bit format for a 24-bit word. The designation is derived from the fact that the "SDS-9300" computer renders such data available in the so-called C register for outputting. This C register is the general input-output communication register of this computer which permits input-output operations for a 24-bit word format.

In an analogous manner there are twenty-four input lines *Cd*0 through *Cd*23 likewise feeding into the C register of the computer. The console 12 is accordingly connected to these forty-eight lines C0 through C23 and *Cd*0 through *Cd*23. The console receives words in this 24-bit word format from the computer through the C0 through C23 lines and the console provides words in the 24-bit word format to the computer via the lines *Cd*0 through *Cd*23.

The words which the computer issues and to which the console is to respond include so-called EOM instructions which are the primary input-output instructions for addressing, alerting and energizing specific peripheral equipment (energize output defined by address field "M"). Each peripheral equipment or even each individual component within an external equipment system has assigned to it a specific code having, for example, twelve positions. An instruction word thus provided includes within its format twelve bit positions called address field. These bit positions will appear in line C12 through C23 holding specifically the address code identifying the peripheral device called upon by the computer for response when this code appears in these lines.

Thus, an EOM instructions code plus address will call on aspecific element within the console which will be described below. All external devices, which are to respond individually to an EOM address code, are connected only to the C12 through C23 lines because these lines provide the address bits defining the identification code for the external device. However, within the multiple possibilities of word-bit combinations, it is, of course, possible that these lines C12 through C23 hold at times a combination of bits which accidentally corresponds to the identification code of a particular external device, but not as a result of executing an EOM instruction. In order to avoid any response of the external device in such a situation, the computer generates a pulse SYS (see SYS-generator) and feeds same to a special line so as to indicate that at that time any bit combination then existing in lines C12 through C23 is in fact an EOM address and has no other meaning. The EOM instruction code itself is used internally only, specifically for triggering the SYS-generator so that the computer produces an SYS gating signal externally available as an indication that the content of lines C12 to C23 is the address code for an external device indeed.

The "SDS–9300" computer, furthermore, provides at times while running a program, a so-called POT instruction word (see POT2 generator). The POT instruction (parallel output) is used in the computer in that the address in its address field indicates the memory location which will furnish data through the C register of the computer into the external device previously addressed by an EOM instruction. This memory location address will not appear in the C12 to C23 lines. Externally this POT instruction is being used in that a special output wire from the computer provides a synchronization or call signal called POT2 which signals to an external device that at that time a word data is provided by the computer and will appear in the output lines C0 through C23 for withdrawal therefrom. It is apparent that such POT2 signal will always be preceded by an EOM instruction addressing the respective external device about to receive such data from the computer.

In an analogous manner the computer "SDS–9300" is capable to at times respond to a so-called PIN instruction, (parallel input) the address code of which defines the memory location into which an external device is to discharge its content via the C register. The operation is similar as afore-described. The external device is first addressed by an EOM instruction address, the latter being evaluated and used in the external device, such as for example, the console, for gating operations. A subsequent PIN instruction which in its 24-bit format is used only within the computer, activates a PIN-decoder in the computer, so that upon occurrence of this instruction a single PIN defining output signal is furnished by the computer through a single line and passed into the external device to be used therein as a gating signal, so that the previously addressed external device can now provide its 24-bit word into the *Cd*0 through *Cd*23 lines and from there into the memory location, the address of which pertains to the PIN instruction. Of course, neither the PIN nor the POT address field is available externally.

The console 12 now is comprised of a number of such external devices some of which receive at times words from the computer via the C0 through C23 lines while other devices provide data to the computer. For purposes of additional communication with external devices, the computer of the "SDS–9300 type" uses furthermore a so-called SKS instruction word. This is an abbreviation for "skip if signal is not set." The purpose of this signal is the following: The specific address in the SKS instruction word is set into the C register for delivery to an external device via the C12 through C23 output lines. The SKS instruction word includes further a code for executing the SKS instruction proper. This is performed internally by the computer in that it opens an internal gate into which the currently addressed external device will furnish a signal.

Externally this SKS code is used commensurate with the intention of the computer when issuing this code. The computer seeks to test whether or not externally a particular switching condition is present. If it is, the external device must be wired to produce a pulse, usually called SSC, and to pass this pulse into the particular line gated open by the computer for receiving such pulse and to be used therein as a decision making signal. If the external device was not so set, the output signal produced by the external device and fed into the computer is accordingly $\overline{SSC}$.

The significance of this particular type of instruction and its utilization within the console 12 will be explained also more fully below and particularly in connection with the description of the various devices within the console which respond to the SKS instruction code. It is, of course, further apparent that EOM and SKS instructions are used by the computer to address all of its peripheral equipment such as illustrated in FIGURE 1. This equipment does not only include the console 12 but also the typewriter 14, the card reader 13, the magnetic tape system 16 and the line printer 15. Others can be added, but are of no concern here.

Thus, the principal mode of communication of the console with the computer, for example the "SDS–9300" computer, are, in summary, the twenty-four output lines of the C-register C0 through C23, and twenty-four input lines of the same register *Cd*0 through *Cd*23; the line which receives the SYS pulse signalling that the computer has issued an EOM address signal to address an external device; the line which receives the POT2 pulse signalling to the external device that a word is presently issued by the computer for passage into an external device previously addressed by an EOM instruction; a line which responds to a PIN pulse to gate a previously alerted external device for receiving a word from the computer through *Cd*0 through *Cd*23 lines, and the line which signals back to the computer the SSC signal as a true or false signal in response to a test whether the external device previously addressed by an SKS instruction has been set or not.

*Console*

Proceeding now to the description of FIGURES 2 and 3 and particularly of the details of the console, one of the principal elements of this console are the two display windows 121 and 122. The window 121 serves to display a number comprising four decimal digits and a sign, while the window 122 displays two digits which represent an exponent to the base 10 thus providing for a display of a scale value; the window 122 also displays a sign. The number to be displayed is derived from a converter 123 (FIGURE 3) which is a binary coded decimal-decimal converter.

The binary coded decimal-decimal converter 123 receives a 24-bit word in a manner to be described more fully below. This 24-bit word is, for example, organized as follows: The first bit represents a sign of the number to be displayed in the window 121; the next sixteen bits in groups of four are binary coded decimal numbers. The next bit again is a sign bit for the window 122; the next two bits are a truncated BCD code and are capable of distinguishing decimalwise between decimal numbers 1, 2 and 3, and the last four bits represent the least significant decimal digit of the exponent to be displayed. Thus, the maximum exponent to be displayed is 39 which, due to the sign bit, covers a range of 78 decimal powers.

The converter 123 receives such a signal in a 24-bit parallel format from a 24-stage display register 124. The 24 input lines of this display register are connected to the 24 lines C0 through C23. The purpose of this register is to store the value to be displayed beyond the duration of the signals as provided by the computer to the lines C0 through C23.

Whenever the display register and the display device are to be addressed, the computer furnishes an EOM address into the lines C12 to C23, which address is accompanied by an SYS pulse furnished by the computer to the external device as mentioned above as an indication that the signal derivable from lines C12 through C23 defines an EOM address indeed. There is thus provided in the console an EOM select register 125 having its twelve input lines connected to the lines C12 through C23, respectively, to respond to the twelve bits of any address code in these lines. The twelve-terminal input side of register 125 is governed by a gate 135 having twelve signal input lines to receive EOM address codes and having a gating terminal to receive the SYS gating signal that accompanies an EOM address code.

The output of this register 125 remains set beyond the duration of the signals of the lines C12 through C23 and feeds the EOM address it holds to an EOM code decoder 126. This selective EOM decoder 126 is comprised of coincidence "and" gates and provides individual output signals for the different EOM address codes it is capable of decoding. There are thus provided as many output lines from decoder 126 as there are (1) EOM-addressable devices in the console to be controlled from this decoder, and as there are (2) decoder gates in unit 126. The output lines are representatively denoted with reference numbers 127, 128, 129, 130 and 131.

For example, the line 131 is to receive an output signal as long as the EOM address identifying the display register is stored in register 125. The display register may have an EOM address code, written on octal notation 31000; if this code appears in the lines C12 through C23 then the line 131 provides a true signal. As the EOM address codes are always accompanied by a control signal SYS as stated above, this signal SYS can be used for additional gating purposes. There is provided a clear-register-124 gate 132 which responds to the coincidence of an SYS signal and the output signal in line 131. The gate 132 causes erasing or clearing of the content in the display register for the duration of the SYS signal or at the falling edge thereof. Thus, upon addressing the display device any number displayed by the display windows 121 and 122 and having resulted from some previously addressing operation is erased.

Sometimes after the computer has addressed an external device by the respectively associated EOM instruction address, here the display device, it furnishes a POT timing signal accompanying, as was said above, the data signals then provided by the computer in the twenty-four lines C0 through C23. This signal, together with the decoded alerting signal in line 131 is used to open up an input gate 133 for display register 123, so that the twenty-four data bits held in the lines C0 through C23 can be passed into the register 124 which was previously cleared by the addressing EOM signal, the clearing SYS signal having decayed in the meantime. Thus, the gate 133 responds to a coincidence of the POT2 signal and the output signal of the line 131 which still is true because the select register 125 holds the EOM address code beyond the duration of the production of the EOM address code issued from the computer. The data bits set into register 124 are immediately decoded and displayed in windows 121 and 122.

Since every EOM instruction is succeeded by a POT2 signal, the trailing edge thereof can be used to clear the EOM select register 125 because at the end of the POT2 signal the communication between the computer and the previously addressed external device is terminated. Thus, there is provided a gate 134 responding specifically to the trailing edge of the POT2 signal to clear the select register 125 thereby, of course, causing the signal in line 131 to turn false, and the input circuit of the display register is blocked again. However, the data bits previously provided by the lines C0–C23 into register 124 remain stored therein and are converted by the BCD–D converter 123 into a displayable decimal-type number appearing on the screen 121–122. This number will remain visible until the display device is addressed again. When and how this will occur will be described below under Programming.

Next, there are provided four sets of digit or parameter switches 141 through 144, only two thereof being shown representatively in the block diagram of FIGURE 3. The number of these sets of switches is not critical but primarily dictated by expediency which can be readily derived from the function and purpose of these switches. The switches set number values which during calculation, i.e., during the solving of a differential equation, are not subject to change or updating as a result of the calculations performed but which may be varied arbitrarily and only if the operator so desires.

Differential equations usually include parameters or coefficients. Often these coefficients or parameters are determined only empirically, or they may be known only as to range or such a parameter may even to some extent vary with the variables but a considerably smaller rate as do other variables so that they can be approximated as constants within wide ranges as covered by the solution, and such "constants" need to be changed only when the independent variables exceeds the range in which this parameter is regarded as a constant. Another point of interest, for example, is that at times the real problem may be to find a parameter value or a range for a parameter to produce a solution of specified and desired behavior.

Other parameters which remain independent from the calculated variables are the initial conditions. For solving any differential equation, it is necessary to provide initial conditions. Of course, the number of initial conditions depends on the order of the differential equation, and the number of variables employed. These initial conditions are fixed as far as the solution is concerned, and, therefore, can be regarded as having similar aspects as the parameters of the equation. Furthermore, such initial conditions may not be known and it may be of interest to find a reasonable range or set of initial conditions which affect the solution of the different equation in a particular way so that, for example, the dependent variables of the differential equation will exhibit a specified behavior such as not to exceed a given range or the like.

In any event, it is apparent that for solving differential equations the parameters and constants needed might have to be changed in a manner that is more or less unrelated to the progression of the solution as resulting from the functional relationship among the variables. The sets of switches 141 through 144 permit the setting of these initial conditions and the parameters. This is significant, because the numbers set by these switches are thus "outside" of the program stored in the computer. The switches are shown schematically only, but it is understood that they may, for example, be comprised of thumb wheel switches with Geneva gears and indicating numbers legibly printed on the portion of such a thumb wheel switch which projects through the front face of the console 12.

Upon programming the computer (see infra) a particular core memory address may be assigned to any of the set of switches 141–144; more precisely it should be said that two addresses per switch set are being used because the computer itself operates preferably with floating point numbers requiring for each number two addresses, one for the most significant digits of the number proper and the other for the exponent.

Thus, when the computer is programmed for solving a particular differential equation the numerical values of the parameters which the human operator may want to alert are not programmed into the computer, but a particular set of these parameter switches is assigned to a memory storage location. At specified times the parameters and/or initial conditions of the differential equation to be solved are sampled from these switches 141–144, and the result of this sampling will then be stored into the core memory locations of the computer assigned to the respective sets of digit switches. The computer then draws these numbers from the memory locations whenever needed during the execution of the calculation routine. Here it should be remembered that solving a differential equation means the production of progressive integral values by way of iteration. Each iteration requires substantially the same calculating steps but each time with updated values. Updating uses any previous calculations of any variable; the present invention includes the sampling of the parameters individually for each iteration for updating such parameters.

The console 12 now permits these number values to be changed without reprogramming the computer. When carrying out the calculation program as part of this program is a sampling routine for these switches. Prior to a specific calculation step which involves a parameter, the parameter switches are sampled to determine the desired value thereof and loaded into the memory for subsequent use in the calculation.

The same holds true in principle if any of these parameter switches has been assigned to store an initial condition. These initial conditions, of course, are used only for the initial calculations at the outset, and a return thereto during iteration is not necessary unless the operator repeats the integration, so that a set of switches determining such an initial condition is sampled only once at the beginning of each repetition of calculation. How the computer communicates with the several switches will be described next, and at what point in the program this communication occurs will be described more fully and in detail below. It should be mentioned for purposes of completion, that it is basically immaterial whether or not initially the programmer prescribes a numerical parameter value for initial calculations as part of the program or whether such parameter is to be sampled exclusively from a set of digit switches. However, it is more convenient to exclusively control a parameter value from a digit switch set once it has been decided that such a parameter may have to be varied. This, of course, does not preclude the possibility of running a program with fixed parameters in the conventional manner. This will apply particularly to well-known physical constants.

Thus, for purposes to be described in connection with the console and the circuit diagram in FIGURE 3, it can be said that each set of parameter or digit switches 141–144 is an external device individually addressable by the computer by means of an EOM address, and when such a set of switches is being addressed it is to furnish its adjusted number value combination to the input lines of the C register of the computer, i.e., to the lines *Cd*0 through *Cd*23. Accordingly, the EOM selector decoder 126 includes four detectors individually responding to the EOM addresses assigned respectively to the four sets of parameter adjusting switches. Since only two of these sets shown are in FIGURE 3, there are correspondingly shown only two output lines 127 and 182, respectively furnishing signals when the respective EMO addresses of the switch sets appear in lines C12–C23. The addressing operation is otherwise similar to the aforedescribed cases. When an EOM address is applied to the lines C12–C23 identifying one of the parameter adjusting switches, the accompanying SYS signal will cause this address to be stored in the EOM select register 125 and the output of the register will be decoded by the decoder 126.

Assuming that the set of switches 141 is being addressed, a decoding signal will then appear in line 127; addressing proper is done here, for example, in that operating potential is applied to the switch 141 only when such an alerting signal appears in line 127. Thus, there is a power gate 146 governing the voltage potential in the switch set 141. The switches 141 provide a plurality of output signals, preferably in binary coded decimal format, to the input side of a gate assembly 145 and representing the particular parameter value set at that time in usable format. Only twenty-three lines or less are used here for this particular parameter value.

Subsequent to the addressing by the computer by means of EOM and SYS signals, the computer issues a PIN gating signal to the external device as an indication that at that time now the lines *Cd*0–*Cd*23 (i.e. the C-register) are ready to receive data from the external device. Thus, the gate 145, which is common also to all the sets of digit switches, will now receive a PIN gating pulse. Gate 145 has twenty-three or less output channels to feed lines *Cd*1, etc. The lines *Cd*0 carrying the most significant bit for any word to be put into the computer are usually employed to carry the sign bit. As far as any parameter value is concerned, it is not necessary to distinguish between positive and negative parameters, because as long as parameters do not vary the sign as is usually the case, this sign can be stored initially as part of the calculation process involved, so that only the absolute parameter values are being adjusted by the parameter switches 141–144. Thus, the sign bit is free to be employed for a different purpose. In this case, it is done as follows.

The sign bit line *Cd*0 is connected to the output side of a multiple "or" gate 151. The output of "or" gate 151 is true whenever the respectively addressed digit switch is just then being set. If the switches are of the break-before-make type, any change in the setting of the switches thereof results at that particular moment in no output at all. Thus, lack of any output by a switch set is an indication that its value is being changed and is therefore uncertain. This is being sampled by the multiple "or" gate 151 in that its output turns true whenever an addressed switch is not set. During the sampling process when a true signal appears in the line *Cd*0 an indication is provided therewith to the computer that the previously addressed digit switch is not properly set or has not yet been set completely giving rise to a skipping operation within the computer and the computer will continue to use the parameter value which was previously sampled from this particular set of switches and which is still stored in the proper address location of the core memory. When during the next or any subsequent operating cycle, it is found that the digit switch when addressed is properly set and is not anymore in between setting states, the parameter value is updated accordingly.

The addressing and sampling of each of the switches is similar so that no repetition of the description is required. They all operate in the same binary coded decimal format, and they all use the same gate 145. The falling edge of the PIN signal which provides the output of a switch set into the C register of the computer is used as an alternative signal in gate 134 to clear the EOM select register 125 as the final step of this sampling process.

One of the most important aspects of solving the differential equation is the fact that it requires calculating steps simulating or approximating integration. A digital computer, of course, can carry out integration only by approximation using finite increments of time and calculating a particular integral value from previously calculated and thus known values. The time increment serves as operand to calculate a data increment value to be added to or substracted from a previously calculated integral value as approximation for true integration. "Euler," "Runge-Kutta," "Adams Bashforth" and others are known methods of such stepwise integration. For describing the invention the time increment $\Delta T$ defining the steps of such approximation methods is also called frame time.

In a sense, the value of this frame time can be regarded also as an unknown quantity. When the operator commences the calculation he will initially select a frame time which he reasonably suspects will produce sufficiently accurate results, but this, of course, is prima facie unforeseeable because to foresee sufficiency of the value would require knowledge of the desired solution. It is immaterial whether the initial frame time, i.e., the integration constant value $\Delta T$, is being programmed in the computer as a part of the data stored initially, but preferably the frame time setter 160 is being used for this purpose at all times. It is also a significant feature that in a manner similar to the operation of switches 141–144, the operator can change this frame time for and during some phases of the operation. Thus, without any reprogramming simply by trial and error he can select the most suitable integration time increment.

Also, it has to be considered that the selection of the frame time materially influences the total calculating time for the solution sought if this solution is to cover a particular period of time. The time is takes for the computer to calculate any particular solution value is, of course, independent from the selected frame time which is but a data value for the calculation, and does not enter per se into the calculation speed of the computer itself. On the other hand, if the solution is to cover a given period of time, the frame time selected thereby defines the number of calculation steps (iteration) required to complete the solution for this time interval, and accordingly the shorter the frame time that is selected, the longer it will take for the computer to calculate the values for the independent variables over the desired time range.

Thus, for reason of integration accuracy the operator will tend to select a frame time as short as necessary, but he will tend to select a frame time as large as possible to speed up the calculative process. To strike a proper balance simply requires trial and error. The optimum along this line may very well vary throughout the calculation, i.e., during certain portions of the calculation a larger degree of accuracy is needed, because, for example, the rate of change of the calculated independent variable(s) varies rapidly while during other portions, there is less rapid variation so that at this time larger integration steps are permitted without undue accumulation of errors. It will be appreciated, that due to those considerations, constant attention of the operator is required, and it is significant that the console provides him with a tool enabling him to vary the integration increment time of the frame time in accordance with the requirements which he may directly observe at the display screen.

The frame time selector 160 is comprised of a number of switches, four thereof are being shown, which are adjustable by the operator, and which directly provides for a conversion of the decimal values set into the switches by the operator, into a binary coded decimal format. The number of frame time switches will be determined primarily by the word format available for the frame time value serving as a word to be accommodated by memory storage location.

Thus the frame time is presentable as a 24-digit word in a binary format. Since binary coded decimal format is to be used, and since for each decimal position four binary locations are required, the maximum number of frame time values selectable under these circumstances will cover six decimal positions. It has been found that this number is adequate for many problems to be handled, but it will be described below, that an extension beyond that range is quite possible.

Additionally, there is provided a gate 161 having twenty-four signal input lines and twenty-four corresponding signal output lines respectively connected to the input lines *Cd*0 through *Cd*23 of the C register in the computer. The gate 161 requires two enabling signals. One signal is derived from the EOM selection decoder 126 furnishing a signal into the line 130 for the duration of the time in which the EOM address of the time switch is in the EOM select register 125. The outer gating signal is a PIN-signal issued by the computer when ready to receive the frame time value.

The frame time selector 160 itself is, of course, identified by an EOM address, and when during the calculation, as will be described more fully below, the program currently executed reaches an address in the memory core in which there is stored the EOM instruction having in its address field the address of the frame time selector, then as a result of executing this instruction the address of the frame time selector 160 will appear at the lines C12 through C23 to pass into the EOM select register 125 upon occurrence of the SYS signal accompanying the execution of the EOM instruction by the computer.

Accordingly, the line 130 will be enabled at that time which in turn opens up the gate 161.

Also as aforedescribed, the computer soon thereafter will issue a PIN signal for gating the then existing data content of gate 161 into the C register via the *Cd*0 through *Cd*23 lines, and, of course, concurrently thereto, also as aforedescribed, the EOM select register 125 is cleared from the EOM address at the falling edge of the PIN signal. Thus, it is clear that at any time the console is enabled to communicate for updating the selected frame time, such time will be provided to the computer.

The frame time selector 160, however, is not limited in its operation to this particular frame time selection. There is provided a counter 162, preferably a decade counter, counting pulses derived from an oscillator 163. The input proper for the counter 162, as far as the counting pulses are concerned, may be a pulse train, the frequency of which is equal to the shortest frame time selectable with the frame time selector 160. The frame time selector 160 is connected to the counter 162 in such a manner that the selector 160 presets a counting value (equal to the selected frame time) which then is counted down to zero at a rate determined by the clock 163. Upon reaching zero, the selected frame time is again gated into the counter and the countdown is repeated.

Since the counter operates, of course, in real time, the count down beginning from the time of inputing the selected frame time down to count zero will last for precisely the period of time in real time as was selected by the frame time selector 160. Thus, the counter 162 produces a train of pulses each being produced at count zero with the repetition rate corresponding precisely in real time to the selected frame time. Of course, if the selected frame time is being changed, the rate of output pulses produced by the counter 162 will be changed accordingly. The output line 164, receiving a pulse each time the counter has reached count zero, is connected to a computer input line wired for the purpose of receiving a so-called interrupt signal. This signal was introduced above as "clock" interrupt signal. The utilization of this interrupt signal is strictly up to the computer in accordance with the programming thereof as will be described more fully below.

The counter 162 will not operate at all times. In order for it to operate it is necessary that a switch 170 be pushed. Thus, for reasons of simplification, it may be assumed that this switch 170 is a push switch which remains in a closed position after having been pushed. One of the effects of pushing switch 170 is to close one of its contacts 171, governing and enabling a control circuit 172 which provides an enabling signal to the counter 162. In order to be effective the counter requires additionally one of two so-called mode signals representative of whether the system is in the "operate" or in the "single frame" mode signal. These signals and what they represent will be described more fully below.

As was stated above, the frame time necessary to integrate functions within a specific range of accuracy is not a fixed value and will considerably depend on the "behavior" of the function to be integrated. Also within an extensive problem certain dependent variables of intermediate dependent variables will vary to a different degree. This means that certain integrations and certain intermediate variables or generated functions might not have to be updated or newly calculated during each iteration, i.e., during each calculating cycle (iteration). It may be possible that a specific portion of the calculation requires updating only for every 3, 5, or 10 frame times. This does not only speed up the problem in that it eliminates for each iteration those calculating steps which would not produce a materially changed result, but it also takes into account that for reasons of accuracy certain integration has to be carried out in very fine and short steps while other integration steps or even the major part of the calculation may require only relatively large time increments for updating.

Again, it is not necessarily known to the operator at the outset which one of the variables or intermediate variables might require frequent updating, and which might require only infrequent updating. On the other hand to some extent differences in the extent of required updating might be known, particularly from the type of parametric functions used and from the functional relationship within the differential equation as between a dependent and independent variables. For example, there may occur periodic functions having very different periodicities. It can readily be seen that calculations involving a function with a small oscillation period will require more frequent updating than calculations involving a function having large periodicity.

Thus, the inventive system is equipped with means capable of introducing what will be called in the following a secondary frame time. A pair of switches 180 is used for the preselection of a factor K in form of a value to be adjusted by two *bcd* coded thumbwheel switches. The factor K selected by these switches 180 defines the secondary frame time in that the secondary frame time is K-times the primary frame time as set by the primary frame time selector switch 160.

The secondary frame time multiple selector 180 is being called upon by the computer in the same manner as the primary frame time selector 160; thus this set of switches 180 is associated with an EOM address and is addressed by the computer at an apropriate instant during execution of the program, and when so addressed an enabling signal is provided in output line 129 of the decoder 126 thus opening preliminarily a gate 181, having its input line connected to the output of the switches 180. A PIN decoded instruction signal finally gates open the gate 181, so that the secondary frame time multiple can be loaded into the C register of the computer.

This completes the description of the elements in the console destined to provide data transfer as between the computer and the operator; in the following several control buttons and switches will be described, with the aid of which the operator may influence directly without reprogramming the instantaneous mode of operation of the computer. Another set of switches is associated with the display device 121 through 122 of the computer. The display device by itself is not equipped nor intended to be equipped to display any specific and predetermined value, i.e., the content of a specific memory address location of the computer during the computation. The inventive device permits preselection and preassignment of the specific data to be displayed at will and upon command by the operator. Thus, there are provided on the face of the console a number of display buttons 190, altogether eight, which with the exception of one are individually assignable.

The switches 190 are mechanically interlocked in that only one of them can be depressed at a time, and upon pressiing another one the previously pressed button will be released.

During programming the operator has a choice of altogether seven values which can be assigned to specific intermediate variables or output values, variables, final solution, etc. which he may desire to observe while the program is being executed. An example of this type will be described more fully below, but it is readily apparent that any calculated value which will be updated in the computer during iteration can be assigned to one switch out of these seven switches. This assignment during programming has the following effect. Each of these switches will be associated with a fixed so-called SKS address (see definition given above). A switch, i.e., the address of such a switch, will during programming be assigned to a particular calculated data value. During execution of the program the corresponding SKS instruction will be executed and the respectively assigned data value will or will not be caused to be displayed, depending on whether or not the operator has pressed the switch. Care must be taken that the switches 190 be sufficiently often interrogated by the computer as to their respective setting state.

Thus, whenever during execution of the program the SKS address of any of the switches 190, for example, of switch 190–1, appears in the lines C12 through C23 this address will be decoded by a decoder, i.e., a gate assembly such as 191–1. The switch 190–1 may at that point be set or not be set. If it is set, complete coincidence is established at the output of decoder 191–1 feeding an output signal accordingly through a multiple "or" gate assembly 200 into a line 201 connected to the computer at a connector pin destined to receive an SSC signal. A signal will appear in this line only if the switch, which has just been tested by addressing it, has been set.

It will be noted that for the SKS address no specific gating input is provided so that any switch addressable by an SKS code such as, for example, switch 190–1, may respond upon appearance of a bit combination in the lines C12 through C23 which is identical with its SKS identifying code, but which at that time does not represent an SKS code. Thus, in this case the SSC signal will be also produced in the line 201. However, this is of no consequence because the computer internally gates its input for the SSC signal (see FIGURE 4) and this particular line will be gated open only if the computer has in fact issued an SKS address code. If it has not, and if there is some unrelated, accidentally similar bit combination in the lines C12 through C23, the resulting signal in the line 201 will not be used.

Since, of course, the various SKS addresses initially assigned to the various switches differ, no overlap can occur. Thus, if the computer has internally gated open its line which connects to receive an SSC signal, any bit combination in the lines C12 through C23 is an SKS address indeed and response at that time is proper.

By definition, an SKS instruction is internally used by the computer as a branch point within its program. The branching depends on whether in response to an SKS instruction code issued in the lines C12 through C23 the pulse introduced into the computer via line 201 is SSC or $\overline{SSC}$. If $\overline{SSC}$ results from testing the SKS-addressable element, it is presently unimportant how the computer is programmed to continue at that point. However, if a switch such as switch 190–1 has been pressed by the operator, (i.e. set) this is signalled to the computer (SSC) as an indication that the operator wants to see the function or variable which was assigned to this particular button. The existence of this pulse SSC now introduces a second branch line into the program and it temporarily branches off the main calculation program and opens up a memory core address holding the variable or function value associated with this switch 190–1 which has just been pressed. The value of this variable is then loaded into the C register, and it is part of this particular sub-routine that the computer will then issue an EOM address which is the address of the display register, and after proper addressing as aforedescribed, the particular value to be displayed will then appear in the lines C0 through C23 for passage through the display register 124, the binary coded decimal-decimal converter 123 into the screens 121 and 122. This sequence will be described in detail in the section Programming.

The eighth display button bears reference number 192. Structurally this button is the same as the other display button, i.e., it has an SKS address, and whenever it is being addressed by the computer and it is being pressed, an SSC signal will also be produced in the line 201. However, this particular button is not assignable by the programmer but has a fixed function. Its function will be of importance only in case of real time operation. Real time operation is defined as follows.

If $\Delta T$ is the primary frame time as selected, then at a rate of the selected time an interrupt signal will be produced in the line 164 as aforedescribed provided the conditions given above are met. This real time operation means, that at such instances marking in real time elapsing of the preselected frame time, the calculated variable is of interest. Thus, real time operation means that the computer is to furnish progressive values of the solution of a differential equation at a rate determined by the progression of real time, whereby the integrating frame time $\Delta T$ (1) determines the instances during which the computer is to present the calculated values, (2) is the time increment used for approximating integration.

Of course, the operation of the computer itself is a fixed one, i.e., the duration of its calculating operation is determined only to a negligible extent by the selected value of the frame time. For a particular differential equation under given conditions, one calculating cycle, i.e., one iteration will require a fixed number of steps, and the solution will, therefore, appear at the end of this calculation. This time is entirely independent from the selected frame time. In general, the calculating time will be much shorter than the frame time. For example, a single iteration of solving a differential equation may require the execution of about 50 additions, 350 multiplications, 30 integrations and several function generations taking a total time between 10 and 15 milliseconds for one iteration. Hence, from an arbitrarily selected starting point in time, the computer is capable of presenting the solution after about 10 to 15 milliseconds. If the frame time is 100 milliseconds then for real time operation the computer should in fact "wait" for 90 to 85 milliseconds before it (1) presents its solution and (2) is permitted to perform the next iteration.

As far as the computer proper is concerned it might appear that 85 to 90 percent of the computer's time is wasted. But is is additionally apparent that this time may be used by the computer otherwise, on a time shared basis; i.e., during this waiting period or "idle time," it might perform other, even completely unrelated, functions having nothing to do with the solving of the differential equation. For example, if a system in accordance with the invention is used for process control in which the computer controls production processes to be determined in accordance with progressing solutions of a differential equation, the computer is thus capable of concurrently solving several, unrelated differential equations on a time sharing basis, and in the leftover time it might operate on bookkeeping problems. In case of space flight simulations the idle time might even go beyond 99 percent of the computer's time. A specific utilization of this "idle time" will be described more fully below. Two points are immediately apparent. When the operator starts to run the problem he might only have a very general idea how long it will take the computer to perform one iteration. He sets the frame time, particularly the primary frame time, and on a trial basis starts the problem to run. How this is done will also be described more fully below. He then presses the idle time button 192 and the idle time, i.e., the difference between frame time and real time for integration, will be displayed. This enables him, for example to decide to what extent the computer can be used otherwise, but also he can now go ahead and shorten the selected frame time. Such shorter frame time will improve accuracy of the solution. It will be apparent that the frame time as finally selected must not be shorter than the actual execution time. If it were shorter, and still considering real time operation, the computer would then be called upon by the interrupt signal in line 164 to present its solution prior to completion thereof. This can be handled in different ways which is of no concern here. The principal point is, that by properly selecting the frame time in a manner which produces positive idle time, no problem can arise.

The number value representing the idle time can be observed by pressing the idle time button as stated. Specifically, the computer in response to an SSC signal will introduce a branch program which causes detection in real time how long it takes to perform one iteration; the branch program further causes the frame time as selected to be ascertained, whether by addressing the switches 160 or by going into the memory address location in which the primary frame time is normally stored. The subroutine resulting from the branching of the main program will then cause a subtraction of these two values, then they will be passed into the C register and from there into the opened register 124, to be displayed in windows 121, 122.

The next set of switches 193 is called sense switches, and there are altogether eight sense switches provided on th front of the console 12. These sense switches likewise respond to computer issued SKS instruction code as aforedescribed. During execution of the calculating program these switches will be also interrogated by the computer by issuing at the appropriate time an SKS instruction.

Structurally, the setup of these switches 193 in the console 12 does not differ from the display control switches, but their specific function is exclusively related to the programming of the computer. In case one or more of these sense switches has been assigned in the computer program, the result is as follows. A sense switch, of course, can be pressed or not pressed and thereby a distinction is made between two alternative branching programs. Upon interrogating a switch, the computer distinguishes between these alternatives by responding to absence or presence of an SSC signal produced in response to the issuance of the SKS instruction address assigned to this particular sense switch. By means of these simple switches the inventive system is endowed with capabilities permitting the solution of a differential equation wherein not all of its components are fixed. In particular, parameter functions forming a part of the differential equation may differ, and it may well be of interest to study the behavior of the dependent variable or variables to be calculated when either one or the other function is being used.

The next set of switches preferably will be described here only briefly, and its main function will follow from the more general description below. There is a card feed switch 195 governing an SKS card feed address decoder 196 to be interrogated by the computer during the programming and deciding in the initial phase at what time the program cards are to be fed into computer (see reader 13 in FIGURE 1). This is of only minor consequence as far as the general operation is concerned, but it is provided for the purpose of giving the operator, who is interested in the solution of a differential equation, complete control of the operation of the computer without requiring him to know the general set up as far as computer control is concerned; in other words, for solving a differential equation the complete control of the computer is turned over to the console after, of course, the initial starting operations have been performed with the aid of the main computer console 11 (FIGURE 1).

The real time button 170 was introduced above and it has its own SKS decoder 171; when pressed and after interrogation of the decoder by the respective SKS instruction, the resulting SSC signal in line 201 will indicate to the computer that real time operation is desired. As stated above, whenever the calculation for one iteration has been completed, the computer is to stop and wait until it receives the interrupt signal from the line 164. It will be recalled that the switch 170 is linked to the blade 171 controlling the enabling circuit for counter 162 so as to provide the interrupt signal train in this situation in the line 164.

Next, there are altogether five mode switches 211 to 215.These switches will also be described only briefly. The control they exercise over the computer will be described below under the section about programming. There is a mode switch register 210 having altogether five stages individually activated upon pressing of a "set up" switch 211, a "reset" switch 212, a "hold" switch 213, a "single frame" switch 214, and an "operate" switch 215. With the aid of these switches the operator is in a position to control the entire sequence of calculations, whereby the computer is programmed to respond to the pressing of any of these buttons, to interrogate which one of these buttons has been pressed and to react accordingly. The switches are push button switches remaining in activated position only as long as pressed. The register 210 does not have to have storing capacity since, as will be described below, upon pressing of any of the switches the computer will instantaneously interrogate the register as to which switch has been pressed and will recognize the particular one. This will occur long before the human operator has released the button. In order to permit this interrogation, these switches are connected to a line 216 in a manner that a signal is sent into line 216 whenever any of the switches 211 to 215 has been pressed. The line 216 is connected to another one of the interrupt channels in the computer. It is the "mode" interrupt channel introduced above and shown in FIGURE 2. Thus, when receiving a signal from line 216 the computer will interrupt its operation at that instant and will interrogate all of the five SKS addresses assigned to these five mode switches, to ascertain the identity of the switch pressed and to "memorize" same.

The "set up" button prepares the SKS "set up" address decoder 221. This switch governs the very beginning of computer operation to prepared the computer for solving the differential equation. The reset switch 212 enables an SKS "reset" decoder 222. In the reset mode the computer prepares itself by means of initial calculations to complete all those steps necessary before any iteration calculation can begin. The "operate" switch 215 enables an SKS "operate" decoder 225, and this switch is being pressed when normal calculations, i.e., sequential iteration is required. The "hold" switch 213 enables an SKS "hold" decoder 223, and in the hold mode the computer stops calculation at the end of the current iteration. The "single frame" switch 214 enables an SKS "single frame" decoder 224, and this single frame mode is similar to the operate mode, but operation is restricted to one iteration. As will be described more fully below, when any of the mode switches has been pressed, the computer in response to the interrupt signal in line 216 will sequentially apply all five different SKS addresses to lines C12 to C23, and the respectively enabled decoder (221 to 225) will respond and will send an SSC signal to the line 201. The computer then will decide how to proceed.

In order to provide the operator with information as to the particular mode in which the system is at any given time, a set of lamps 230 is provided. These lamps may be incorporated physically, individually in the mode buttons 211 through 215, but, of course, it is understood that each of these lamps does not light up just when the respectively associated button is pressed. Light goes on only upon receiving from the computer a mode change signal as an indication that the computer has in fact entered the new mode. There may be a delay between a console signal for a mode change and the actual change in mode by the computer.

Each of these "mode" lamps is additionally characterized and identified by an EOM address. Accordingly, there is provided another EOM mode decoder 231 composed of altogether six logic "and" gates, each having individually its input sides connected to the register 125 so as to individually respond to the particular EOM mode address code.

The decoder 231 has altogether six output lines in accordance with the six different modes. The energized one of the lines respectively controls one stage of a six-stage EOM mode register 233. Each of these mode register states remains energized for the duration determined by the appearance of another mode code. The output side of the mode register 232 of course is respectively connected to the six lamps 230.

*Programming (general)*

The communication between the operator and the computer via the console will best be described with reference to a specific example with the aid of which the various phases of operation will be described, particularly those permitting the operator to directly interfere with the computer operation by varying its program without being required to reprogram the computer completely anew. As an example, a simple equation may be used:

$$\ddot{x}+\mu\dot{x}+f(x)+g(t)=0$$

With reference to FIGURE 5, the format of the program for solving differential equations, particularly the one noted above, shall be described briefly. The program as ultimately used by the computer is, of course, a sequence of instructions organized in such a manner that succesive instructions are located in sequentially addressable locations of the core memory so that the program can also be defined as the content of a sequence of momory address locations. For purposes of the present invention, it is basically unimportant whether the program in the machine language is originally prepared in this manner by a programmer having knowledge of the machine language and externally compiling this program prior to feeding the same into the computer, or whether the program has been compiled by the computer itself in response to a sequence of so-called "operator statements" to be translated by the computer itself into its own machine language by way of executing a compiler program stored on magnetic tape and transferred therefrom into the core memory prior to execution of a differential equation solving program to be compiled as the first step of solving the problem.

Thus, in FIGURE 5, the block diagram illustrates such a program as it will appear finally in the core memory ready for execution, i.e., solving a specific differential equation. The program proper, of course, will vary in accordance with the type of differential equation to be solved. However, its general format is of a uniform type. The specific example is a differential equation of the second order, and the problem is to solve $x$ as a function of time. The equation includes two functions, $$f(x) \text{ and } g(t)$$

which may be any kind of functions given empirically or in closed form. The principal point is that the functions $f$ and $g$ should be susceptible to approximation, for example, by a power series. Where this is not possible, a function may be given, for example, empirically as discrete measuring values, in which case the argument steps determine the required value $\Delta t$ for integration. In addition, there is given a parameter $\mu$ which may be a constant. Furthermore, there are given as initial conditions $x$ and $\dot{x}$ at a time 0.

With the exception of these initial conditions $x$ and $\dot{x}$ at a time 0, nothing else is known, at least for the time 0. Thus, the initial conditions to be provided for will include calculating steps which will calculate $f$ for $x$ at the time 0 and $g$ at the time 0, as well as $\ddot{x}$ at the time 0:

$$\ddot{x}(o) - \mu\dot{x}(o) - f(x(o)) + g(o)$$

Normally, the values for $\mu$, $x$ and $x$ at the time 0 could be programmed numerically into the computer. The arithmetic computer program there may thus include instructions requiring the loading of specific number digits into specific memory locations from which they were to be drawn subsequently when needed for use in calculations carried out by executing subsequent instructions of the program. This conventional way fixes the numerical value of these parameters. As was explained above, the principal purpose of the invention is to enable the operator to change such parameters without reprogramming.

Turning now to the details of instructions in the program shown in FIGURE 5, memory locations $A_1$ et seq. hold the instructions for correlating a specific digit switch to a number to be used within the computer, in the present case parameter $\mu$. In locations $A_a$ et seq. and $A_b$ et seq. there are held assignment instructions with which the other digit switches are assigned to respectively determine $x$ and $\dot{x}$ at the time 0. The specific subroutine for each of these assignments is of principal concern here and will be explained with reference to Table I.

Subsequent instructions for the initial condition program portion will include all the instructions that are needed to calculate $f(x(o))g(o)$ and $\ddot{x}$ for the time 0. The details of these calculating instructions are of no concern here. In most instances they will include all those instructions used and necessary to carry out arithmetic operations such as additions, multiplications, divisions, etc. More particularly, these instructions will when executed cause selective transfer of data between the memory and the A and B registers (FIGURE 4). There may be provided additional instructions which when executed will cause these calculated initial values to be recorded externally by printing, linograph recording, etc.

In addition to the first sequence of instructions for calculating initial conditions, several of the display switches 190 may be assigned to calculated values to enable the operator to have any or all of these initially calculated values displayed on demand in the windows 121 and 122 of the console 12. The specific subroutine for assigning the specific display switch to a specific value to be displayed will be explained below with reference to Table II. In the present example, the operator may have the option to display $\ddot{x}(o)$, $g(o)$, and $f(x(o))$ when needed. This way, for example, he can check at the outset whether the calculative representation of these functions is sufficiently accurate. The display switch assignment subroutine for any specific switch must appear in the instruction sequence subsequently to those instructions defining the steps that are required to calculate the value to be displayed. Furthermore, the digit switch assignment subroutine must appear in the sequence prior to the calculating steps which will require the values set by these digit switches so assigned. The program illustrated meets these requirements.

The group of instructions defining all the initial conditions is ended when at a location in the instruction sequence, here marked *Aoo*, there appears a so-called branching instruction, amounting to the statement "Branch to $M_1$." $M_1$ is a memory location not assignable by the programmer and containing for each problem program of the character described the address of the first instruction of a subroutine which will be explained with reference to Table IV. In particular, this "Branch to $M_1$" instruction when appearing in the main program sequence, so to speak, marks the dividing line between the initial calculations and the calculations composing the iteration for progressively producing the solution $x$ in steps or increments of the frame time, as was defined above. Moreover, this instruction "Branch to $M_1$" is also the dividing line marking specifically the beginning of the rate 1 calculating operations, also as defined above, and constituting the iteration carried out in steps of the selected primary frame time.

The instruction in memory core location $A_{01}$ will be the first instruction for executing the rate 1 or primary frame time calculating operations which, in our example, will include integrating $\ddot{x}$ to produce $\dot{x}$, integrating $\dot{x}$ to produce $x$; calculating a new value for $\ddot{x}$. More specifically, at a time a rate 1 calculation cycle starts $x$, $\dot{x}$, $g$ and $f$ are "known" either as initial conditions or from a previous iteration. The integration steps $x = \int\dot{x}$ are carried out as approximation using known methods, for example, Runge-Kutta, Adam-Bashforth, etc. In each such method the value of a function $x(t+\Delta t)$ is calculated by additions, multiplications, and divisions of previously calculated values including at least $x(t)$ $\dot{x}(t)$ and $\Delta t$, the latter, of course, being the selected frame time.

Briefly, by way of representative example, one iteration cycle for performing stepwise integration of the differential equation given above, will require two integrations. It may, for example, be assumed that the integration step $x = \int\dot{x}dt$ be carried out with the simple Euler type integration, while the integration $\dot{x} = \int\ddot{x}dt$ be performed with the more sophisticated fourth order Runge-Kutta method. In this case, the very first step integration will produce $x(\Delta t) = x(o) + \Delta t\dot{x}(o)$, wherein $x(o)$ and $\dot{x}(o)$ are initial conditions. Additionally, for the second integration half-step values are needed so that $$x\left(\frac{\Delta t}{2}\right) = x(o) + \frac{\Delta t}{2}\dot{x}(o)$$

Instructions to this effect involve only multiplication and addition type operations.

The second integration step will be to produce $\dot{x}(\Delta t)$. The Runge-Kutta method requires the following substeps: First, by suitable multiplication and addition it is formed $$\dot{x}(o) + \frac{\Delta t}{2}\ddot{x}(o) = \dot{x}^{(1)}\left(\frac{\Delta t}{2}\right)$$

wherein $x(o)$ is an initial condition and $x(o)$ is calculated as was referred to above. Next is formed $$-\mu\dot{x}^{(1)}\left(\frac{\Delta t}{2}\right) - f\left(x\left(\frac{\Delta t}{2}\right)\right) - g\left(\frac{t}{2}\right) = \ddot{x}^{(1)}\left(\frac{\Delta t}{2}\right)$$

wherein all values at the left hand side are known to form the right hand term. Then is formed $$\dot{x}^{(2)}\left(\frac{\Delta t}{2}\right) = \dot{x}(0) + \frac{\Delta t}{2}\cdot\ddot{x}^{(1)}\left(\frac{\Delta t}{2}\right)$$

$$\ddot{x}^{(2)}\left(\frac{\Delta t}{2}\right) = -\mu\cdot\dot{x}^{(2)}\left(\frac{\Delta t}{2}\right) - f\left(x\left(\frac{\Delta t}{2}\right)\right) - g\left(\frac{\Delta t}{2}\right)$$

$$\dot{x}^{(3)}(\Delta t) = \dot{x}(o) + \Delta t\cdot\ddot{x}^{(2)}\left(\frac{\Delta t}{2}\right)$$

which is a stepwise calculation of terms needed for the Runge-Kutta method, to then obtain the first iteration value $x(\Delta t)$ by the expression $$\dot{x}(\Delta t) = \dot{x}(o) + \Delta t/6\cdot\ddot{x}(o) + 2\dot{x}^{(1)}\left(\frac{\Delta t}{2}\right) + 2\dot{x}^{(2)}\left(\frac{\Delta t}{2}\right) + \dot{x}^{(3)}(\Delta t)$$

wherein $x^{(1)}$, $x^{(2)}$ and $x^{(3)}$ are auxiliary, intermediate values. Thus, we now have obtained $x(\Delta t)$ and $\dot{x}(\Delta t)$ and can obtain $\ddot{x}(\Delta t)=-\mu\dot{x}(\Delta t)-f(x(\Delta t))-g(\Delta t)$ and repeat the cycle to obtain $x(2\Delta t)$ and $\dot{x}(2\Delta t)$. For details as to this method we refer, for example, to "Introduction of Numerical Analysis" by F. B. Hildebranch, McGraw Hill 1956 and others. The known methods for numerically performing stepwise integration are all methods in which previously obtained number values and fixed numbers are used to perform additions, subtractions, multiplications and division in accordance with specific rules to arrive at new values representing the dependent variables.

The instruction block beginning with $A_{01}$ up to $A_{n-1}$ will, therefore, when completely executed, have produced the following: If the program is being run for the first time, it will result in X at a time which is 0 plus one frame time; if it is the second cycle, it will produce X for the time 0 plus two frame times. Of course, the rate 1 operations will be repeated as often as necessary to calculate progressive values X as was stated above, and for sequential time values following each other at a rate determined by the primary frame time.

Within this sequence of instructions which, as far as the details of the arithmetic operations are concerned, is of no interest here, there may also be used certain instructions, which include digit switch assignment subroutines ($A_n$) and display switch assignment subroutines ($A_m$ et seq., $A_k$ et seq., $A_l$ et seq.) in the same manner as was discussed above with reference to the calculating of the initial conditions. During operation, the human operator may desire to display, for example, the calculated value $x$ or $\dot{x}$ or $\ddot{x}$ as they have been progressively calculated, and/or he may want to modify, for example, the parameter $\mu$ in the specific example shown in FIGURE 5. Thus, a particular digit switch set will be assigned for determining what the value of $\mu$ is to be. It should be mentioned that for this purpose (assignment of $\mu$) exactly the same digit switch may be used which was assigned to determine $\mu$ during the initial condition calculations. This double assignment of the same digit switch set at different locations within the same program is compatible with the execution of the program as long as the same digit switch is used for determining the same type of parameter.

The end of this instruction block is marked by a location $B_o$. The numerical value of $B_o$, of course, will vary in accordance with the length, i.e., the number of instructions needed for carrying out all of the preceding rate 1 operations, but this location $B_o$ will contain an instruction: "Branch to location $M_2$" which is also a fixed memory location and not assignable by the programmer. In location $M_2$ there is stored the first address location of a second subroutine. Now it should be mentioned that it is of specific importance for the invention that the execution of these subroutines as determined by memory locations $M_1$ and $M_2$ will be controlled from the console, particularly from the mode switches of the console, and this will be described more fully with reference to the various tables.

The next instruction within the main program is in memory location $B_1$, and it is the first instruction for executing rate 2 or secondary frame time operations. In this series of instructions there will appear all of those calculations which require an updating of numerical values less frequently than is required for each primary frame time iteration. In this example, and in a purely representative manner it was assumed that calculations or updating of the functions $f(x(t))$ and $g(t)$ is carried out as secondary rate calculation, since for example, these functions vary very little from $\Delta t$ to $\Delta t$, so that their respective updating is required only for instances apart by $K\cdot\Delta t$, with "K" being determined by the switches 180 in the console 12. At this point it should be mentioned that the example above for the first iteration using the Runge-Kutta method is correct as far as the structure of the formula is concerned, but in the first integration step during the first rate 1 cycle, the values $$f\left(x\left(\frac{\Delta t}{2}\right)\right) \text{ and } g\left(\frac{\Delta t}{2}\right)$$

are actually not available and are not calculated, so that instead $f(x(o))$ and $g(o)$ are used because the error resulting from this simplification is very low since it was presumed, that $f$ and $g$ require updating only at intervals $K\cdot\Delta t$.

It should be mentioned further that it is well within the possibilities that a specific program will require only rate 1 or only rate 2 operations, the latter case occurring if the maximum value which can be set for $\Delta t$ by means of switches 160 is too short. In either case any value calculated would be updated with each cycle. The instruction $B_o$ would then be omitted. At the end of the entire program, however, there is one instruction in the last memory location which defines this particular program containing an instruction "Branch to $M_3$" and as a result thereof, a subroutine will be carried out having a first address which is stored in the fixed location $M_3$.

From the foregoing, it will be apparent that the memory locations $M_1$, $M_2$ and $M_3$ identify subroutines serving as a "frame work" for executing the program in a controllable manner. The entire problem is thus tri-sected: $A_o\rightarrow A_{oo}$; $A_{o1}\rightarrow B_o$; $B_1\rightarrow B_{end}$. The portions $A_o\rightarrow A_{oo}$ and $A_{o1}\rightarrow B_{end}$ are individually executable by control of the operation. Specifically, iteration must be susceptible to be stopped and continued at will by the human operator to permit evaluation, parameter changes, etc. The rate 2 calculations are bounded by $B_o$:BRU$\rightarrow M_2$ (upper border) and $B_{end}$:BRU$\rightarrow M_3$, and by definition they are less frequently executed than the rate 1 calculations. Provisions must be made (1) to permit a continuation beyond $B_o$ or return to $A_{oo}$ at $B_o$ and (2) to ensure return from $B_{end}$ to $A_{oo}$ for continuation. This "frame" into which the program is cast permits the human operator to exercise the desired control.

Before the details of this mode control are discussed, the data communication between console and computer will be developed. The subroutines interposed for digit switch and display switch assignment are the principal elements for controlling data transfer to and from the computer, respectively from and to the console. This will now be developed in greater detail.

*Data communication*

With the aid of Table I, FIGURE 4 and FIGURE 3, it will be explained how the human operator can communicate via the console with the computer to determine specific parameter values, such as, for example, the parameter $\mu$ and the values $x$ and $\dot{x}$ at the time 0 in the example given above.

During execution of the program, for example, a program of the type shown in FIGURE 5 for solving the differential equation mentioned above, and, particularly, during the execution of the instructions for the initial conditions, the program counter (FIGURE 4) will call on a memory address such as $A_n$. In this location there may now be stored an instruction code BRM accompanied by an address field defining an address $P_1$. The execution of this instruction occurs completely within the computer. It means specifically that the current content of the program counter (here the code for $A_n$) is stored in bit positions 9 to 23 of the effective memory location, here in memory location $P_1$, and that further control of the computer is transferred to location $P_1+1$ by loading such location code into the program counter register. Thus, a program branch is introduced and the next step will be carried out in accordance with this branch program.

The address location $A_n$ from which branching occurs is not fixed, but is assigned as part of the programming of the computer for the specific differential equation to be solved. The instruction BRM–$P_1$ will always be used when a digit switch of the console is to be assigned. The address $P_1$ to which the program is now branched is a fixed one within the memory core and constitutes an integral part thereof provided the computer is used for solving differential equations. Thus, for purposes of the invention, this particular subroutine in location $P_1$ et seq. and others as will be described, can be considered as constituting an integral part of the computer.

The BRM–$P_1$ instruction when executed results in placing the address $A_n$ into the effective memory location $P_1$ so as to mark the place at which the main program was left. The instruction code stored in $P_1$ is denoted PZE and no activity is performed as a result thereof. Subsequently, control of the computer is turned over to the respective next memory location which is $P_2$. The memory location $P_2$ contains an EAX instruction with an address holding an operand "0," which, when executed, means that a "0" is placed into the Index Register. The program counter then shifts to $P_3$ containing an instruction BRU having in its address field memory location $P_3+3$. This unconditional branching instruction means that the two locations $P_4$ and $P_5$ are being skipped over at this instant for reasons to be described below, and the subroutine now branches to $P_6$ containing an instruction MPO with address $P_1$ and which when executed means that "one" or "unity" is being added to the address stored in $P_1$. This is $A_n$, so that subsequently the address location $P_1$ holds or stores the address $A_{n+1}$.

The program counter then shifts to location $P_7$ of the subroutine, containing EXU and the effective address field holding $P_1$. The instruction EXU when executed, causes the content of the memory location in the address field $P_1$ to be executed as an instruction without altering the content of the program counter. The effective memory location is $P_1$. The content of the effective memory location is the instruction address $A_{n+1}$, which, in effect, means that at this point the subroutine turns back to the main program. The instruction in $A_{n+1}$ which, of course, succeeded the instruction $A_n$, contains an instruction code EOM. The address field of location $A_{n+1}$ contains the EOM address of the set of digit switches, for example, the EOD address of the digit switch 141 in the console.

Since the program is now returned to the instruction in memory location $A_{n+1}$, the instruction EOM is executed, which means that, in a manner as aforedescribed, the control circuit 21 of the computer causes the production of an SYS signal to be fed to the console 12, and the EOM address of the switch 141 will appear in the C register of the computer, particularly in the lines C12 through C23 thereof, and the digit switch set 141 becomes alerted as was described above.

The next instruction to be executed is located in $P_8$ because the program counter register content was not changed for the execution of the EXU instruction in $P_7$, thus the branching back to the main program was only a temporary one for executing that one instruction. The memory location $P_8$ now contains a PIN instruction which was also described above, and which means that the PIN instruction code will appear in the 0 register (FIGURE 4) and will be passed on to the PIN decoder of network 21 to produce a PIN gating signal which in turn appears externally and enters the console 12 to open up the gate 145 (FIGURE 3) for passing the content of the digit switch 141 into the C register. The PIN instruction in the memory location $P_8$ is accompanied by an address P, which is also a fixed one, and is currently held in the S register. Accordingly, at the PIN gating signal the content of the switch 141 is passed not only into the C register but also into the M register and from there, by conventional computer operation, into the address location P. Thus, the number value held in digit switch set 141 after having been preselected by the human operator, is now temporarily placed into memory location P.

The next instruction is taken from location $P_9$ and it is an instruction SKN–P, which means that the next memory location $P_{10}$ is to be skipped when the data in the P memory location are negative. Location P, of course, holds the value sampled from digit switch 141. It will be recalled from the description of FIGURE 3 that the sign bit line *Cd*0 receives a signal from a multiple "or" gate 151. This sign bit represents a negative sign in case switch 141 was not properly set when interrogated. Therefore, if the digit switch 141 is properly set, the data in location P will appear "positive" and the SKN test, so to speak, will develop an indication accordingly, which simply means that there will be no skipping, but the next memory location will be addressed for calling on the next instruction. Thus, the program counter shifts to $P_{10}$ containing a BRU instruction, and in the effective address field there is the address $P_{14}$ so that the program at this point is branched unconditionally to memory location $P_{14}$. In $P_{14}$ there is an instruction word containing the instruction code LDA and its address field is address location P, which means that the content of location P (digit switch content) is to be loaded into the A register.

As will be recalled, the digit switch data are presented in binary-coded-decimal format. Numbers are preferably used in octal format with floating point notation. The next memory locations $P_{15}$ through $P_{X-1}$ contain instructions which, when executed, will cause the number now in the A register in a binary coded decimal format to be converted into a floating point number. The details of this conversion are not of specific interest because it does not form a part of the communication of the computer with the console, but it can be mentioned that it contains in sequence the following instructions codes: ETR, MUL, ADD, STA, ETR, MUL, ADD, LDB and FLA. At the end of this portion of the digit switch loading subroutine there will be a floating point number in the A and B registers representing the parameter which was set manually into the digit switch 141.

The last memory location for this subroutine $P_X$ contains the instruction BRR with the effective address field containing memory location $P_1$. When executed, this means that "one" is to be added to the content of the memory location, the memory location being $P_1$, the present content thereof being $A_{n+1}$, and the resulting address will be $A_{n+2}$. This address is set into the program counter, since the BRR instruction is, so to speak, the complement of the BRM instruction and it causes return from a particular subroutine to the main program; here control is returned to $A_{n+2}$ memory location, which is part of the main program.

It can be seen that the subroutine $P_1$ through $P_X$ is completely autonomous and is independent from any specific addresses outside of the computer, particularly those of the console. Thus, this instruction $P_1$ through $P_X$ will be carried out each time the content of a digit switch is to be loaded into the computer. Which digit switch it is, is to be determined by the main program which, in this case, was determined by the instruction address field in memory location $A_{n+1}$. Having now returned to the main program, the locations $A_{n+2}$ and $A_{n+3}$ respectively contain FLM and FLA instructions which, when executed will result in a normalizing and scaling of the content of the A and B registers. These are floating point multiplication and adding instructions which are in effect the final modifications of the number originally drawn from digit switch such as 141. The operands for these instructions are freely selectable and are of no concern here.

The next effective memory location is $A_{n+4}$ containing the instruction STF. The address field of this instruction word contains a pre-assignable memory location into which now the parameter, originally set by digit switch 141, is stored in useable format. This particular number is now being placed into the reach of the main program and in a manner which permits subsequent calculations to make use of this value. The memory location $A_{n+5}$ contains the next instruction, which may be part of the problem program, or it may contain the BRM–$P_1$ instruction with $A_{n+5}$ containing EOM with another digit switch address.

In order to introduce into the main program a number value as externally adjusted by a digit switch, all that is required is to put into the problem program the instructions which are in the memory locations $A_n$, $A_{n+1}$ and $A_{n+4}$. The instructions in $A_{n+2}$ and $A_{n+3}$ are optional and not essential. This way, the computer is enabled to temporarily turn to a subroutine, explained with reference to memory locations $P_1$ through $P_X$, and causes the externally adjusted value to be placed into a memory location so that it can be used during subsequent calculations. It is self evident that each time the program is run in such a manner, the program counter passes through the locations $A_n$, $A_{n+1}$, etc. The specific set of digit switches in the console assigned by way of EOM address selection is thereupon addressed and interrogated as to its content regardless of whether this content has been changed in the meantime or not.

The programming can be simplified by preparing a statement recognizable by the computer that within a particular location of the main program, for example, at the beginning thereof, or the beginning of the primary calculations, a digit switch interrogation is to take place. Such statement merely has to identify the particular digit switch (by EOM address or otherwise), and the variable or parameter it is to represent. The computer may then be endowed with the capability of translating this statement into the sequence:

```
BRM  P1
EOM  (Address of switch)
STF  (Address location for the parameter)
```

which sequence is placed into sequentially addressed memory location. This does not complete the interrogation possibilities. Care must be taken that indeed there are provided definite periods of time during which the switch can be newly adjusted, and that the adjustment is in fact being used. These enabling provisions are tied to the "framing" of the program with the aid of the instructions $A_{oo}$, $B_o$ and $B_{end}$ to be explained below.

At this point, we have not yet considered what happens if the digit switch 141 when addressed and interrogated was not properly set. In this case, the sign bit was negative, which means that while executing the subroutine $P_1$ et seq. and particularly when the memory location $P_9$ is effective there was a negative response causing the next instruction, which was in $P_{10}$, to be skipped and location $P_{11}$ will then be addressed. The instruction therein is LDA, the operand being the number 3; upon execution, the number 3 is loaded into the A register. The next location $P_{12}$ contains the instruction ADM, with the address field containing the address $P_1$. Upon execution, the content of the A register, which is the number "3," is added to the content in location $P_1$ which at that point is the address $A_{n+1}$. The thus incremented address, which is $A_{n+4}$, is put back into memory location $P_1$.

The next instruction is drawn from location $P_{13}$ and it is again a BRR instruction with the address field containing the address location $P_1$. As was described above, upon execution of BRR, the content of the address field is again incremented by "one" and the result, which now would be $A_{n+5}$, is stored into the program counter so that, in effect, the control of the computer is returned to memory location $A_{n+5}$, which, as was seen above, contains the next instruction of the problem program. Thus, in this case, there is a simple continuing of the main problem program. The improper data then in location P will be destroyed at the next occasion and this particular digit switch is presently disregarded. For any subsequent calculations the value as previously adjusted by the digit switch 141 and previously put into the proper memory location is still being used. Of course, at the next cycle or at the next time when the program counter runs through $A_n$, et seq. again, an attempt is being made to interrogate the switch 141, and if it is properly set then the loading is had as aforedescribed.

The situation is similar to all digit switch assignment and interrogating routines in the program portion prior to the memory location $B_o$ containing the "Branch to $M_2$" instruction (see FIGURE 5). In the example shown in FIGURE 5, there would be four digit switch assignments, as was explained above, one for the initial condition X at the time 0, one for the initial condition X at the time 0, and two for parameter $\mu$, one before and one after $A_{oo}$. In this case, for example, digit switch 141 can be assigned for use in determining the parameter $\mu$ during the initial calculations as well as during the rate 1 operations; no overlap is possible because the initial condition here for the $x$ and $x$ at a time 0 are needed only in the instruction group for initial conditions, and they do not enter anymore as assignable values during rate 1 operations. It is, of course, entirely immaterial what particular digit switch is being used for any specific value; the switch sets are all basically similar.

The situation is somewhat different for rate 2 operations operations. A different type of subroutine for loading a number drawn from a digit switch into the memory has to be used. The reason for this will be explained more fully below, but at this point it is sufficient to mention that during the rate 2 calculations an interrupt signal may occur. Regardless at what particular point within the subroutine the interrupt occurs, such interrupt causes branching to a different portion of the program. The details thereof will be described below. Presently it suffices to understand that the several memory locations used in the digit switch interrogating subroutines may have to be used otherwise subsequent to the interruption. Therefore, for the digit switch interrogation subroutine during a rate 2 cycle, other memory locations have to be used for purposes of temporarily storing any result, for example, of the binary coded decimal bit combination drawn originally from the interrogated digit switch. Such a result must then be put into a memory location from which it could not be extinguished. In particular, it has to be observed that is is possible that a rate 2 operation may be interrupted anywhere, and a complete rate 1 operation is subsequently carried out before the rate 2 operation can be completed. In the rate 1 operations there may be also digit switch interrogations in which case the $P_1$ through $P_X$ subroutines (Table I) would be used. Thus, all of the memory locations, particularly the memory locations P and $P_1$, would then be used, and these memory locations should not contain any data values "leftover" from the interrupted rate 2 operation. Thus, different types of memory locations have to be used in case of rate 2 operations, as such memory locations should be permitted to store for an indefinitely long period of time any content they may have at any instant.

The memory locations for the main program for the rate 2 operations may be denoted with $B_n$, $B_{n+1}$, etc. The instructions are very similar, but whenever the programmer wishes to make as assignment of digit switches for a value needed only in a rate 2 operation, he then puts ahead of the subprogram wherein that value is needed, and into a memory location such as $B_n$, an instruction called, again BRM, which is exactly the same type as used above, but with the address now containing $P_4$. Thus, the entry into the digit switch assignment subroutine is at a different memory location, and it will be recalled that the address $P_4$ was left out from the description given above. When this situation arises in that the execution of the main program has arrived at memory location $B_n$, the memory location $B_n$ will be put into memory location $P_4$ for temporary storage, and operation of the computer is shifted to memory location $P_5$. $P_5$ contains an EAX instruction and the number 3 as operand, so that the number "3" is put into the Index Register.

At this point, it should be mentioned that the instructions in memory locations $P_6$, $P_8$, $P_9$, $P_{12}$, $P_{13}$, $P_{14}$ and $P_X$ are, in addition, provided with a code denoting indirect addressing. Since, as was stated above, the location $P_2$ contains an instruction EAX in which the number "0" was put into the Index Register, the instruction was executed in the manner as given by the sequence of address locations $P_1$ through $P_X$. In the instant case, i.e., for the rate 2 operation, the entrance into this subroutine is made in such a manner that a number "3" is put into the Index Register. Thus, the program counter shifts the control into the memory location $P_6$. It contains the MPO instructions, with $P_1$ being the address field, but the indirect addressing now causes the number "3" to be added so that, in effect, the content of the memory location $P_4$ is being called upon, which holds the number $B_n$.

The next following memory location holds the $P_7$, EXU instruction, resulting in a temporary return to the location held in $P_1$ which is here now $B_{n+1}$ and the instruction $B_{n+1}$ is executed (no indirect addressing). For example, switch 142 is now EOM addressed and the program returns to $P_8$. The data from the alerted digit switch, for example, 142, are gated from the console 12, not into the memory location P but into the memory location P(+3). This memory location for holding temporarily the the content of the alerted digit switch is one which is not being used otherwise, particularly not during any other rate 1 operation, so that in case an interrupt would occur right at that moment, the content of the memory location P(+3) would not be touched subsequently until the program returns to $P_9$.

The other instructions in the memory locations $P_9$, $P_{10}$, $P_{11}$, $P_{12}$, are all executed as aforedescribed with the modification that at $P_{12}$, again address $P_{1+3}=P_4$ is being called on. In case the SKN-test (instruction in $P_9$) causes skipping of $P_{10}$, this subroutine is left at $P_{13}$ with branching occurring to the location held in $P_{1+3}$ which is now $B_n+1$ so that the rate 2 calculations are resumed at $B_{n+5}$. In case $P_{14}$ is reached from $P_{10}$, in $P_{14}$ the address P(+3) is called on for parameter format conversion, and when $P_X$ has been reached the BRR instruction is executed, the address field thereof containing address $P_1(+3)$ and location $P_4$ is called on, now holding the address location $B_{n+1}$. The execution of the BRR instruction again causes $B_{n+2}$ to be loaded into the program counter so that control of the computer is returned to this memory location. There is again the normalization and scaling, and then the value from interrogated switch 142 in suitable format is stored into an assigned location. At $B_{n+5}$ the rate 2 operations are continued.

Proceeding now to the description of Table II, there is shown how specific display switches of the console can be assigned in the main program for displaying the content of specific memory locations, in which are stored particular variables. There is used a particular subroutine for providing communication between the display device in the console 12 and the memory, particularly the core memory, of the computer. One will appreciate that display is required or desired, preferably for those values which are being calculated. This is not necessarily restricted to the solution, i.e., the progressively developed dependent variable, but other components of the problems such as nonlinear functions of the variables, intermediate derivates, etc. may also be of interest. Thus, the display assignment subroutines will be placed toward the end of the program for the initial condition instructions or at the end of the block containing the rate 1 and/or rate 2 operating instructions (see FIGURE 5).

Representatively, in a memory location $A_m$ addressed pursuant to the execution of the problem program, there will now appear an SKS instruction, which was explained above, having in its address field the address of a display switch, i.e., one of the display switches 190. It will be recalled that the execution of an SKS instruction interrogates the setting or not setting of the switch respectively identified by the address in the address field of the instruction word having the SKS code in its code part.

Accordingly, if the program counter has shifted the control of the computer to the memory location $A_m$, this will cause the SSC gate of the control section 21 (FIGURE 4) to be gated open. Additionally, the SKS address is loaded into the C-register to appear in the lines C12 through C23. This address is in this case the SKS identifying address of one of the display switches of the console, and in the line 201 of the console there will now appear a true or false signal, depending on the state of the thus addressed switch. Assuming that this switch has been pressed, then as a result of the test there will be no skipping and the program counter proceeds to location $A_{m+1}$ which now contains a BRU instruction causing branching to the next following location of the executed program, which is $A_{m+3}$. $A_{m+3}$ contains an LDP instruction code and the address field identifies a memory location containing the value which is respectively associated with the particular switch.

A console display switch is assigned to a value to be displayed on demand in that in one memory location within the program, such as $A_m$, there is placed an SKS instruction together with the address of the switch as defined by the SKS decoder such as 190–1. This is succeeded by a BRU instruction to skip over the next location, $A_{m+2}$, and in $A_{m+3}$ a LDP instruction code coupled with the address *x* of the memory location of the value to be displayed, causes the content of this location "*x*" to be loaded into the A and B registers.

Since the number to be displayed is a floating point number, it is held in the locations "*x*" and "*x*+1." Of course, two registers A and B are required to hold this number. The program counter proceeds and turns the control to location $A_{m+4}$ containing a BRM instruction code and the address field defines a $D_0$ address which is the first memory location of the display subroutine and receiving the branching location, i.e., $A_{m+4}$. Location $D_1$ contains an instruction LDX–$D_0$ requiring the memory location from which branching occurred, which is $A_{n+4}$, to be loaded into the one of the Index Registers, for example, into Index Register 2. The program counter proceeds to the next memory location which is $D_2$. Locations $D_2$ et seq. contain instructions which convert the floating number held at that time in the A and B registers, into a number in binary coded decimal format, and the last instruction thereof loads the resulting BCD number into the A register. Proceeding to the memory location $D_{x+1}$, it contains an instruction STA–D whereupon the present content of the A register is stored in the address D. This is a non-assignable, fixed memory location for storage. All numbers to be displayed are stored in location D just prior to their transmission to the console.

The next memory location $D_{x+2}$ now contains an EOM instruction together with the EOM address of the display device in the console. Since this is also a non-assignable address this EOM address is also a fixed part of this subroutine $D_1$ et seq. The execution of the EOM instruction in location $D_{x+2}$, of course, now causes the production of an SYS signal in the control portion 21 of the computer, while the EOM address code appears in the lines C12 through C23 of the C register, and the display register 124 is alerted in the manner which was described above.

The next instruction is in location $D_{x+3}$ which is a POT instruction, uses the POT generator in the control section 21 to respond, and the address field contains D, so that now the content of memory location D, which is the number originally drawn from the address location *x* is loaded in the display device as was described above, for display by screens 121 and 122.

The program continues to location $D_{x+4}$ containing the BRR instruction identifying, in this case, the Index Register which contains the location $A_{m+4}$ and a complete execution of the BRR instruction means that $A_{m+4+1}$ is placed into the program counter so that control is returned to memory location $A_{m+5}$ which contains the first instruction to continue the problem.

In case the SKS test result of the display switch was negative, the display switch having not been pressed by the opeartor location $A_{m+1}$ is skipped and $A_{m+2}$ is accessed, branching the program around $A_{m+3}$ and $A_{m+4}$ to merely continue with the main program. This subroutine is the same for initial rate 1 or rate 2 operations, so that this type of program can be used at any place.

As far as the main program sequence is concerned, one can see that the display is identified by suitably providing in sequential memory locations:

```
SKS—(address of a switch)
BRU to
BRU to
LPD (address of variable, previously assigned)
BRM—D1
```

The computer may readily be endowed with translation capabilities in that a statement read into the computer during programming merely contains an identifying code for the switch and for the variable to be displayed. The computer then places these five instructions into sequential memory locations. This, however, is of no further concern here.

The lower portion of Table III shows the subroutine which is being called upon whenever the frame time, as well as the multiple K which determines the rate 2 frame time, is to be drawn from the console. It will be recalled that the switch set 160 and the switch set 180 in the console are respectively used for this purpose, and the subroutine shown in Table III now provides for the instructions necessary to call on these frame times setting switches for placing them into proper locations, so that they can be used when the problem program is being executed. The subroutine for calling on the frame time selectors is not entered into directly during execution of the problem program, but this subroutine for interrogating the frame time selectors is by itself a subroutine branched into from another subroutine which will be explained more fully below. Presently, it is sufficient to state that during execution of the problem program at large a branching occurs, and that the content of the program counter is stored in address location $H_1$ and control of the computer is turned over to memory address location $H_2$. The memory locations $H_2$ et seq. are not of immediate interest here because they contain instructions to the effect of testing whether the frame time has been preselected otherwise. For example, in case the frame time selector in the console is to be circumvented and the frame time is to be selected by way of ordinary programming, this portion of the frame time monitoring subroutine will indeed respond to this other mode of preselection.

If no other preselection has been made, the program counter will then arrive at memory location $H_x$ containing the address of the frame time switch 160 in the console 12. Accordingly, as aforedescribed, the frame time selector will be alerted in that its address code is fed by the computer to the C register to appear in the C12 through C23 lines, and the SYS generator of the control portion 21 feeds an SYS signal into the console so that the EOM select decoder 126 in the console will provide for a gating signal at the output side of the time selector switches 160.

The next memory location $H_{x+1}$ contains a PIN instruction, the respective address field thereof defines a fixed non-assignable storage location H in the memory for temporarily storing the binary coded decimal value of the selected frame time. The decoded PIN instruction results in a gating signal provided by the PIN signal decoder in control logic 21. This gating signal passes into the console 12, particularly for gating open the gate 161 therein, so that the selected frame time will be transferred into the C register, and from there directly into the memory location H.

The next sequence of instruction is contained in the memory location $H_{x+2}$ to $H_{y-1}$ which convert the BCD value of the selected frame time then in the temporary memory location H into a floating point number. The last instruction for this conversion is in location $H_y$, the instruction being STD, the address field defining the location.

This memory location is a fixed one in the memory for all problems, and it is set aside for always containing the primary frame time to be used in the rate 1 operations, particularly during integration subroutines.

Location $H_{y+1}$ contains another EOM instruction, with the address field containing the address of the factor selector switches 180 in the console. Thus, in a similar manner, the output circuit of switches 180 is alerted. The EOM select decoder 126 in the console decodes the EOM address as was described above. Location $H_{y+2}$ in the memory contains a PIN instruction with the address field defining a temporary location H into which the factor K in its selected format is being stored. Locations $H_{y+3}$ to $H_{z-1}$ contain instructions for converting this factor given in BCD format into a floating point number. Location $H_z$ contains the instruction STD, the address field, being fixed and non-assignable, to be called MULT. This location MULT is also permanently used for any differential equation solving and storing a floating point number representing a value factor "K—1." The reason for using "K-1" will become apparent below; briefly the number of repeated primary calculations is counted by reducing the content of MULT for each completed primary calculation cycle by "one" until a negative value is reached. For a number K—1 this requires K-negative incrementations.

The frame time reading subroutine is terminated when the program counter arrives at $H_{z+1}$ containing the instruction BRR-$H_1$ which, when executed causes "one" to be added to the address stored in the $H_1$ memory location, and the thus incremented address is put into the program register, so that the control of the computer is returned to the program portion from which this subroutine was branched off so as to continue. This latter program will be described more fully below; as was stated above, it is not the main problem program.

This completes the description of the transfer of data from and to the computer, to and from the console, particularly with respect to programmable places within the problem program but whereby fixed subroutines are being used to be considered part of the computer itself.

*Iteration*

Before describing the iteration, the following distinction should be emphasized. Rate 1 or primary operations or calculations are all those instructions executed subsequently to the branching instruction to $M_1$ (i.e., $A_{01}$ et seq.) and prior to the branching instruction to $M_2$. If these rate 1 operations are directly repeated, such rate 1 operations will also be called a rate 1 cycle. The instruction subsequent to the BRU-$M_2$ instruction down to $B_{end}$ are called rate 2 or secondary operations or calculations, while K sequences of rate 1 operations plus one sequence of rate 2 operations are called a rate 2 cycle.

Somewhat below it will be described how the human operator, with the aid of the console 12, is enabled to exercise directly complete control over the several phases of the execution of any program for solving differential equations, particularly for the purpose of permitting him to change parameter values if he has observed that the problem deviates from his expectations. He may perform the changes as deemed necessary, and he may control repetitions of operations simply by operating appropriate switches without having to reprogram the computer.

How this direct control is possible requires first a basic understanding as far as the iteration cycle is concerned both for non-real time and for real time. The division of the program into portions bounded by locations containing branching instructions with address $M_1$, $M_2$ and $M_3$ serving as entrance address locations for respective subroutines, permits controlled iteration of such bounded portions independent from the initial calculations.

We thus refer first to Table IV schematically describing the iteration cycles for non-real operations. As will be recalled, in non-real time operations the computer provides solutions as fast as is inherently possible, and whenever an iteration cycle has been completed, another one is started instantly. It shall be assumed, that the rate 1 operations ($A_{01}$ et seq.) are executed for the first time.

How this first entry into the rate 1 operations is performed will be described below under the heading Mode Control.

Soon the program counter in the computer will arrive at a state in which it contains the address location $A_{last}$. This location may contain the last instruction for the block of the primary arithmetic calculations.

It is assumed further that the selected frame time $\Delta t$ and the multiple K−1 for the secondary frame time ($=K\cdot\Delta t$) have been appropriately stored in the memory locations "Δ" and MULT defined above. Moreover, the multiple (K−1) has been stored in a memory location "count" during the entry in the operate mode that resulted in the running through the primary calculations for the first time.

Location "count" is a non-assignable operating address location used to count K primary cycles before instigating rate 2 calculations.

The next memory location to be called upon by the program counter is then $B_0$ containing, as was mentioned above, the instruction BRU–$M_2$ so that the program is branched unconditionally and without storing the branching point to memory location $M_2$. For non-real time memory location $M_2$ holds address location $S_1$ and in continuance of the BRU instruction, the control is now turned over to the address location in $M_2$ which is $S_1$. $S_1$ is a memory location within another subroutine determining the cyclic operation for non-real time operations.

$S_1$ holds the instruction SKR, the address field referring to the memory location "COUNT." The SKR instruction, when executed, means that the content of the memory location in its address field be reduced by "one" and the reduced number is turned. As stipulated, address location called "COUNT" holds number "K−1." Assuming that secondary calculations are present then K>1 so that K−2 will be ≥0 and not negative. Hence, the program counter will proceed for $S_2$ holding BRU–$S_6$ and the program thus branches to location $S_6$.

Memory location $S_6$ contains an instruction LDP–, the address field containing an address to be designated as "TIME," which is likewise a fixed, non-assignable memory location which, at that time, contains a value that is equal to $\Delta t$ times the total number of primary cycles executed up to this time. Presently this value is $\Delta t\cdot 1$ and this value is now being placed into the A and B registers. $S_7$ contains instruction FLA–; this instruction when executed causes the primary frame time value $\Delta t$ to be added to the content in the A and B register which is the number originally drawn from the location "TIME." This means that this particular position of the subroutine, progressively increments the value in the locations called "TIME" by the values of the primary frame time indeed, and thereby keeps track of the progression in non-real time of the development of the solution to the differential equation. This time-number will, for example, directly be used to calculate the needed values for the function $g(t)$ in the differential equation given above (see also FIGURE 5 assignment $B_1$ et seq.).

$S_8$ contains an instruction STD which means that the incremented time value in registers A and B is returned to the "TIME" address location; memory locations $S_9$ contains the final instruction for the subroutine, which is a BRU instruction, having $M_6$ as address field. The $M_6$ memory location is by itself a non-assignable memory location, but it has been loaded during initial programming with the specific memory location containing the first instruction of the rate 1 arithmetic operation, here $A_{01}$. Upon execution of this BRU instruction, the control of the computer is thus returned to the address location $A_{01}$ to begin the next (second) rate 1 calculating cycle. Thus, this instruction BRU–$M_1(A_{01})$ closes the loop for iteration. Accordingly, the rate 1 operations are repeated whereby some values may be updated again, others may have to wait until secondary rate operations are performed. At $B_0$ the main or calculating program is left, at $S_1$ the content of "count" is negatively incremented, and if K–3 is still not negative, the program is returned to $A_{01}$ (after, of course, the value in "Time" has been incremented).

This iteration of repeating only the rate 1 operation will proceed until the SKR-test of location COUNT results in a negative value, indicating that K-primary calculations have been performed (K−1–K<0). Further execution of the SKR instruction means that if, after such negative incrementing, the remaining number of its address field COUNT is negative, then the next instruction is to be skipped, which is now the case, so that the program proceeds to memory location $S_3$.

Location $S_3$ contains an instruction BRU–$M_7$. Upon programming, the $M_7$ address location, which is fixed and nonassignable, has been loaded with the program address $B_1$, which is the memory location holding the first instruction for the rate 2 arithmetic operations. For execution of the BRU–$M_7$ instruction, the address location ($B_1$) stored in the location $M_7$ is placed into the program counter register, thereby the control is turned back to the main program and proceeds with the execution of the instruction in memory locations $B_1$ et seq. Thus, the secondary or rate 2 program portion is now being executed.

Rate 2 operations or calculations now progress until the $B_{end}$ instructions location is reached. At this point all of the rate 1 operations have been executed K-times, and all of the rate 2 operations have been executed once. This completes a secondary cycle. Memory location $B_{end}$ contains an instruction BRU–$M_3$ and the memory location $M_3$ holds for non-real time operation the address $S_4$. Thus, when executing this branching instruction, which is the last instruction of the entire problem program, the address $S_4$ is being placed into the program counter and control shifts to this memory location. It is this instant that a new rate 2-cycle is started.

Memory location $S_4$ contains an instruction LDA–MULT. Thus, the secondary frame time factor K–1 which was previously drawn from the console, particularly from the switches 180, and which were previously placed into the fixed memory location MULT after having been converted into a number of appropriate format for the ease of the arithmetic operation, is now placed into the A register. Memory location $S_5$ contains an instruction STA–"COUNT," so that as a result, the factor K−1 is now placed again into the memory location "COUNT" mentioned above.

Since at this point we begin another rate 1 and rate 2 cycle, the program proceeds to $S_6$ et seq. to increment "Time" and to exit from this subroutine for a return (via $M_6$) into the problem program at location $A_{01}$ so as to begin another rate 1 (and rate 2) cycle.

It can be well understood from this instruction scheme shown in Table IV that this iteration process can be repeated indefinitely; it is self-cycling. It will be described below how, on one hand, the human operator can set this cycle into motion, i.e., enter into it, and how he can stop or exit from it, particularly in a manner which enables arbitrary repetition and continuation whenever desired.

This cyclic operation proceeds until interrupted. Such interruptions will be discussed below under the heading of mode control. It is apparent that such interruption can be caused by somehow placing different addresses into locations $M_2$ of $M_3$ to prevent closing of the iteration loop as defined by the S et seq. subroutines. This will be described below under the heading Mode Control.

*Real time iteration*

It will be necessary to turn now to Table V which describes the somewhat more involved iteration cycles for real time operation.

It will be recalled that for real time operation the result of each one iteration, i.e., the updated progressing dependent variable(s), is not to be presented at the end thereof, but after the selected frame time has elapsed in real time, and only when the next iteration is to be started. This presentation is due specifically when in real time the primary frame time $\Delta t$ has elapsed.

It is permissible that the primary frame time as real time can be selected to be smaller than the time required for executing a complete rate 2 cycle. Of course, the primary frame time must not be selected to be shorter than the execution for the rate 1 calculations alone, because, in this case, the calculation for each iteration could never keep up with the progression of real time increments, and the computer would be required to furnish a result prior to its production.

The condition exists that for such real time operation the primary frame time $\Delta t$ in real time must be shorter than the execution time for all rate 1 operations plus 1/K of the time required for executing all rate 2 operations. Thus, the program cycle shown in Table V is now destined and laid out to permit interruption of the rate 2 operations. The intricacies of this subroutine will not be used when the frame time $\Delta t$ in real time is larger than the execution time of a complete rate 2 cycle. It will be recalled from the description above that the digit switch interrogations during primary and initial calculations differ somewhat from the digit switch interrogation within the program portion covering the secondary calculations. The principle reason for this distinction is that the secondary can be interrupted and the sampled digit value should not be destroyed in any manner.

For the description of Table V, it is important to remember that the console 12 is equipped with a counter 162 furnishing pulses into a line 164 which appear in real time at a rate determined by the primary frame time selector switch set 160. The line 164 leads into the interrupt logic of the computer, as shown in FIGURE 4. Upon occurrence of a pulse in line 164, a memory location, for example, a location "41" in the computer is accessed immediately and directly. This direct accessing does not at that instant disturb the program counter content, but location "41" contains an instruction BRM as instruction code and location $T_1$ in its address field, which when loaded at that time into the registers S and O causes as its execution the content of the program counter to be loaded into the memory location $T_1$ and memory location $T_2$ is instead loaded into the program counter. Thus, the phase of the execution of the program which was in progress at the time of occurrence of the interrupt signal, is now, in effect, being interrupted but "memorized" by loading the current program counter content into $T_1$ and control is subsequently turned over to memory location $T_2$.

Location $T_2$ holds an instruction FSTR with the address field designating a flag register, for example, flag register portion 4. The flag register portion 4 monitors operation time overflow. It will be recalled that by definition, the primary frame time in real time must exceed the execution time of the rate 1 calculation. These primary calculations begin at an interrupt signal from the counter 162 and this flag register portion 4 is not set for as long as primary calculations are in progress. The next interrupt signal must not occur as long as the primary rate calculations are still in progress and flag 4 will be set at the end thereof. Hence, the condition exists that flag 4 must be in the set state at an interrupt signal in line 164. If flag register portion 4 is not set, the time overflow occurs, location $T_3$ is skipped and $T_4$ is addressed. The instructions in location $T_4$ et seq. include subroutines to deal with the situation as desired. It is apparent, that a time overflow of this nature will occur (1) if the frame time $\Delta t$ was improperly selected and (2) during the very first iteration cycle. The $T_4$ et seq. subroutine may simply provide for visible and/or audible alarm signal and a stopping of operation.

If flag 4 was set, the program counter proceeds from $T_2$ to $T_3$ containing a branching instruction as instruction code. The address field in $T_3$ is either the address of memory location $S_6$ in case the problem program does not contain any secondary, i.e., rate 2 calculations, the branching instruction code is BRC. If there are secondary rate 2 calculations then during the initial programming, the branching instruction inserted should be BRU and the address field will then contain an address $T_x$. More specifically, when during programming instruction BRU–$M_2$ (see Table IV) is used which occurs only if there are secondary calculations indeed, a fixed address $T_x$ is concurrently loaded in to the likewise fixed location $T_3$; if no BRU–$M_2$ is used, fixed location $S_6$ is loaded into $T_3$. This may be done externally during programming of the machine or by a computer responding to presence and absence of the BRU–$M_2$ instruction.

The execution of the instrutcion BRC, in general, requires branching of the program to the memory location in the address field at that time while concurrently the interrupt channel, i.e., the line 164 is cleared.

If there are no secondary calculations at this point, the program branches to $S_6$ (Table IV) and after due incrementing of "Time" entry is made into the main program and particularly into the instruction location $A_{01}$ which is the beginning of the then solely existing rate 1 operations. In this case (no rate 2 calculations) of course, the rate 1 operations will be terminated by the instruction in $B_{end}$. Skipping, therefore, for the moment to the left hand portion of Table V one finds $B_{end}$ memory location containing a BRU instruction with $M_3$ being the content of the address field, which is, of course, the same for all operations. However, when real time operation is in progress, the memory location $M_3$ will contain an address location $R_7$. As will be recalled the address stored in the memory location $M_3$ is memory location $S_4$ for non-real time operations. Thus, at the end of solely present rate 1 calculations, control is turned over to the memory location $R_7$, containing an instrutcion FIRS which sets the flag registers 4 and 5 as an indication that there is no time overflow.

It will be appreciated that in case of time overflow this point can never be reached so that if $R_7$ is being addressed there is an indication that indeed no time overflow exists. The next location $R_8$ contains a BRU instruction having as its address field its own address location, i.e., $R_8$. Thus, at this point, a branching to itself occurs which is simply the mode of programming the waiting state for the computer. The computer at this point has completed the calculations for an iteration and now waits for the elapse of the primary frame time in real time which is signaled by a pulse furnished in the console 12, particularly by counter 162 thereof, into the line 164, and then there is a continuation in that the memory location 41 is addressed. Thus, in real time, with no secondary calculations, the iteration control is simply as follows: After an interrupt in line 164, entry into the primary rate calculations runs via sequential addressing $T_1$, $T_2$, $T_3$ to $S_6$, incrementing "Time" and from there to $A_{01}$. The iteration cycle is completed at $B_{end}$ and exit occurs via $$M_3 \rightarrow R_7 - R_8$$

which is the waiting state for waiting for the interrupt signal in line 164.

It should be noted, that this waiting period may be used by the computer to perform other operations at a lower priority level. The $R_8$–BRU→$R_8$ state occurs only in the absence of such alternative operations. The interrupt signal 164 will at any event override such alternative operations or the waiting state. This in effect completes the description of real time iterations with no secondary operations being programmed.

The situation is different in case we have secondary calculations in which case, as will be recalled, the memory location $T_3$ contains in its address field the memory location $T_x$. $T_3$ was reached after an interrupt signal (see top of Table V). Thus, instead of entering into the rate 1 operations at that point (via $S_6$), control is turned over to memory location $T_x$ contain an instruction SKR, the address field holds the address "count."

It will be recalled that "count" is a memory location which contains the multiple K, more precisely, K–1, for defining the secondary frame rate, and again this number now is negatively incremented. If the incremented number in the memory location "count" is not negative, the next memory location $T_{x+1}$ is skipped over and the program counter proceeds to location $T_{x+2}$ containing an instruction FSTR with the register flag 5 being the address field. If flag 5 register portion is set, the program continues; if it is not set, then the next instruction would be skipped over and the program counter would proceed at $T_{x+4}$. If flag 5 is not set, there is a time overflow and the instruction $T_{x+4}$ et seq. contain instructions to the extent that the operator be alerted. This is of no concern here because it is strictly optional; for example, one could program this portion for a complete stopping of operation. What type of time overflow as signalled by flag 5 is explained more fully below.

Assuming, therefore, the flag 5 was set (no time overflow) the program continues to $T_{x+3}$ containing a BRU instruction with $T_y$, in its address field, so that control is turned over to the memory location $T_y$ containing LDA–MULT, address MULT contains the secondary frame time factor K–1 and upon execution of this instruction, this factor is loaded into the A register. Location $T_{y+1}$ contains STD meaning that the factor K–1 is to be stored into the location "count."

Location $T_{y+2}$ contains LDA–$B_1$ and it will be recalled that location $B_1$ contains the first instruction for rate 2 calculations. Thus, upon programming, address location $B_1$ is to be loaded into the address field of the fixed location $T_{y+2}$. This address $B_1$ is now loaded into the A register. $T_{y+3}$ has STA as instruction code, and "SAVP" in its address field, so that upon execution now the memory location $B_1$ is stored into this address.

"SAVP" is the memonic designation of a fixed saving address set aside to insure that any subsequent interrupt signal will not cause erasure of the memory location $B_1$ at the appropriate location where it is needed. $T_{y+4}$ contains BRC–S6, meaning that again there is an entry into the rate 1 operation.

In summary this latter portion of the real time control subroutine will be run through, if it was found that the memory location "count" contained "Zero" which is always an indication that the just completed primary calculations must be succeeded by secondary calculations, but prior to commencement thereof "K" is loaded into "Count." At this point, i.e., upon executing the instruction in the $T_{y+4}$ memory location the computer enters now into a state in which it will first again perform all rate 1 calculations which, of course, must always be completed before occurrence of an interrupt signal. Assuming that this is the case then, at the end of the primary calculations the program counter will arrive at the $B_0$ memory location, and branching occurs as aforedescribed to memory location $M_2$. In case of real time operations $M_2$ does not contain memory locations $S_1$ as is the case in non-real time operation, but instead there will be held the address of memory location $R_1$, so that control is turned over to this memory location $R_1$ holding an instruction FIRS identifying flag register portion 4 in its address field. The flag register portion is now being set as an indication that indeed the primary calculations have been completed without interrupt and correspondingly there does not occur any overflow. Memory locations $R_2$ through $R_5$ now contain loading instructions, i.e., there is one loading instruction LDP and three loading instructions LDX, to respectively load A and B registers and the index registers with values drawn respectively from permanently assigned "saving" storage locations $S_{t-1}$ through $S_{t-5}$. Since we are assuming at this time that this is the beginning of any arithmetical secondary calculations, locations $S_{t-1}$ through $S_{t-5}$ do not contain any data saved so that neither the A and B registers nor the index registers will receive any data.

Next in sequence is the memory location $R_6$ containing BRU–SAVP. As will be recalled the address location SAVP has stored temporarily the address of memory location $B_1$ which is the beginning of the secondary calculations, so that in effect branching occurs to the beginning of secondary calculations and secondary calculations will progressively be carried out by executing the instructions in memory locations $B_1$ et seq.

Now, it shall be assumed that an interrupt signal occurs from the counter 162 in console 12, prior to the completion of the secondary calculations. Again, the interrupt signal calls on location 41 in the memory containing the instruction BRM–T1. The complete execution of the BRM instruction requires that the memory location, for example, BX which was in the program counter at the time the interrupting signal occured is being stored into the $T_1$ memory location, and then control of the computer is turned over to this subroutine loading memory location $T_2$ into the program counter register. Again, location $T_2$ contains FSTR as aforedescribed, and since as was stated above the flag 4 register is set, the program is continued to location $T_3$ containing a branching instruction BRU to turn over control to location $T_x$. $T_x$ holds the SKR instruction causing the number in location "count" to be reduced by one, and subsequently causing a checking of the sign of this negatively incremented number.

As was mentioned above, the secondary frame rate multiple or factor "K−1" was loaded into the memory location "count," and after having been negatively incremented by one, one will find here that the number is still positive, since, of course, "K" will at least be "two" without being meaningless. Thus, in this case the program does not skip over the next memory location, but continues to location $T_{x+1}$ containing a branching instruction to turn over the control to memory location $T_z$.

It will be appreciated that from the instant the interrupt signal occurred up to the time when the program completed its run through location $T_z$, the operants effective at the time of the interrupt signal and pertaining to the secondary rate problem program were not influenced nor disturbed in any manner.

The memory locations $T_z$ et seq. now hold storing instructions such as STP and STX to load the content of the A and B registers, and the content of the index registers at that time into the memory locations $S_{t-1}$ through $S_{t-5}$. These are the values of the current secondary calculations at a time the interrupt signal occurred. Thus, what is stored into the memory location $S_{t-1}$ through $S_{t-5}$ are all those values which have to be saved, and which have to be used if later when the secondary calculations are to be continued at the point at which the interrupt signal occurred.

Locations $T_{z+4}$ holds a loading instruction LDA–$T_1$, to put the address location in $T_1$ into the A register. This address location is precisely $B_x$ which was in the program counter register at the time the interrupt occurred. The next instruction executed (located in $T_{z+5}$) is STA–SAVP so that the address code $B_x$ is then stored into the location SAVP to be called upon when the interrupted secondary calculations are to be continued. After all the "saving operations" have been completed the program counter register may hold $T_{z+6}$, and in $T_{z+6}$ there is a branching instruction BRC which, on one hand, clears the interrupt channel and, on the other hand, turns the operation to memory location $S_6$.

Whenever an interrupt signal is fed by the console 12 into the line 164 for energizing the respective interrupt channel, a new primary frame rate operating cycle is to commence. It will be appreciated that thus at that time all primary rate operations will be executed first and when the program counter has again reached location $B_o$ the program branches to $M_2$ and from there to $R_1$. Flag 4 is set to indicate that this point has been reached without interrupt and thus there is no overflow. Next, the program shifts sequentially from $R_2$ through $R_5$ holding having loading instructions and addressing memory locations $S_{t-1}$ through $S_{t-5}$ to now put the saved values back to the registers from which these values were taken at the previous interrupt, so that the computer actually is now placed back into the same operating conditions in which it was at the time when the previous interrupt signal occurred at the computer can continue the secondary rate operations.

The next instruction is drawn from memory location $R_6$ and this is BRU–SAVP indicating that the content of memory location SAVP is to be used for the next program step thus placing the content of SAVP, which is $B_x$, into the program counter register and the secondary operations can continue. These secondary calculations will continue until again an interrupt signal occurs in line 164, possibly again before the $B_{end}$ instruction location has been reached by the program counter. However, it is significant that the $B_{end}$ memory location may be reached for signalling completion of the secondary rate calculations, prior to the time that the count number in location "count" has been reduced to produce a negative value.

It will be recalled that the number in the memory location "count" when incremented to a negative value causes the location $T_{x+1}$ to be skipped and the location $T_{x+2}$ is being addressed. When this occurs at a time when the flag register 5 is not set, then there is an indication that the multiple K−1 in the location "count" has been reduced to below zero prior to the program counter reaching the $B_{end}$ in the memory location. It will be recalled further that when $B_{end}$ has been reached there is an entry into the subroutine $R_7$ and $R_8$ and upon executing the instruction in memory location $R_7$ the flag register 5 is being set. This is an indication that the end of the secondary frame rate calculations have been reached, here specifically, prior to incrementing the multiple K−1 to a negative value. Thus, when the location $T_{x+2}$ is being reached the instruction therein conducts a test by monitoring flag 5; if it is set then the secondary rate calculations have been completed, and there is no secondary calculation overflow and the program then proceeds to $T_{x+3} \rightarrow T_y$ et seq. $\rightarrow S_6$ as aforedescribed to possibly but not necessarily begin another rate 2 cycle.

A special situation exists if the secondary calculations are completed early within a secondary cycle (i.e. $B_{end}$ has been reached), with the number held in "count" still not being negative. This situation will arise in case the selected primary frame time and/or the multiple K is relatively large, and it includes the case that the secondary calculations can be completed without interruption. All these cases are included implicitly in the foregoing discussion and thus can be treated here very briefly.

When $B_{end}$ has been reached branching occurs to location $R_7$ and the waiting subroutine $R_8$ puts the computer into the idle state. At the next clock interrupt, the sequence is $T_1 \rightarrow T_2 \rightarrow T_x$ (now giving a positive result, so that branching occurs to $T_z$); the $T_z$ to $T_{z+5}$ subroutine results in that $R_8$ is placed into the saving address "SAVP" as $R_8$ was the address held in the program counter register when the clock interrupt occurred. At $T_{z+6}$ this subroutine is left for entry into the rate 1 calculation routine. At the end of this rate 1 cycle ($B_o$) entry is made again into the $R_1$ et seq. subroutine. At $R_6$ branching occurs to the address held in "SAVP" which is $R_8$. Thus, after completing of all secondary calculations, each rate 1 sequence is terminated by placing the system into the idle state until the present rate 2 cycle is completed as monitored and controlled by the SKN-test of location "count" and the result of the test.

*Mode control*

We now proceed to the description of the communication permitted between the operator and the computer via the console by means of the mode control switches in the console enabling the operator to exercise complete control over the execution of the calculating program. In particular, it now will be described how the human operator can exercise control over the execution of the several iteration cycle outlined above, enabling him to make use of the display and setting devices in the console 12. Several subroutines are involved here as shown in Tables III and IV. It will be recalled from the description of the console 12 with particular reference to FIGURE 3, that each time any of the mode control switches is pressed, an interrupt signal is fed into the second interrupt channel, called "mode" interrupt and being governed by signals in output line 216.

Whenever a pulse or signal appears in interrupt line 216, an address location in the computer memory called, for example, location 40 is accessed. Location 40 contains a BRM instruction with the address field containing an address location $N_o$, so that in an analogous manner as aforedescribed immediately after occurrence of such signal the memory location $N_o$ will be loaded with the content of the program counter register held therein at the time of the mode interrupt, while control is turned over to the address location $N_1$ to be loaded into the program counter register.

This subroutine now entered into tests sequentially which one of the switches of the mode switches has been pressed by the operator. This testing subroutine does not involve A and B registers so that no saving operation is required; this is unlike the situation of a clock interrupt signal.

Location $N_1$ holds instruction code LDX, and the operand is a memory location not further specified by its address field is loaded into the index register. This operand has two portions; the first portion is a number "one" to be placed into the increment portion of an index register. The second portion of this operand defines the base address value to be placed in this index register, and this base value is presently zero. This base value is used as incrementing number for indirect addressing.

The next memory location addressed is $N_2$ containing an indirect addressing instruction with EXU as instruction code and an address $N_x$ in its address field, so that just the instruction in location $N_x$ plus base value of the index register, is executed. As this base value is presently zero, $N_x$ is directly addressed for execution. $N_x$ holds an instruction SKS with the set up mode switch code as address. Hence, detector 221 in console 12 is interrogated whether or not the mode switch pressed is the set up switch 211. If it was the setup switch there will be a corresponding reply signal SSC from the console to the computer, and the next location $N_2$, is not skipped. The instruction in $N_2$ causes branching to location $N_5$(BRU–$N_5$) holding an instruction FSTR–Flag 6. This is a test the outcome of which decides whether the previous or current mode is to be completed as prescribed before the new mode is entered into, or whether the previous or current mode is to be discontinued instantly so that the new mode can be entered into forthwith.

By definition, the Ready and Hold modes can be interrupted instantly (register flag 6 being reset) while in the Operate or Single Frame modes a secondary cycle is completed; in the Reset mode the initial calculations are likewise to be completed (flag 6 being set) before any mode change. Hence, depending upon the current mode register, flag 6 may either be set or reset, and the instruction in $N_5$ tests this.

If flag 6 is reset, execution of an FSTR instruction requires skipping, here now to $N_7$, holding instruction BRU–$N_y$ plus an indirect address instruction. Since the base address portion of the index register presently still holds the number zero, the program branches to $N_y$ holding BRC and an address location from which there will commence the set up subroutine; if flag 6 was set at the FSTR execution test, there is no skipping and the program continues to $N_6$, causing branching to $N_z$ which is the beginning of a loading subroutine instruction for storing address $N_y$ plus index register base address value (presently still zero) into memory location $M_3$. Thus, the location that is indicative of the new mode to be entered into, here location $N_y$ will be arrived at only, when the system subsequently addresses location $M_3$ and find $N_y$. It will be recalled, that $M_3$ is addressed via an instruction BRU executed when the system (program counter) arrived at location $B_{end}$, which in turn occurs after completion of a secondary frame cycle. Thus a secondary frame cycle be completed if a mode change is instituted during the Operate and the Single Frame mode indeed, in that the set up mode will be entered into only via $B_{end}$→BRU→$M_3$ (holding $N_y$), if the set up button was pressed.

As stated above, the reset mode likewise is to be completed before a mode change may become effective. This completion is arrived at (supra) when location $A_{oo}$ has been reached causing branching to the memory location held in location $M_1$ (not $M_3$). Thus, a mode change command during the Reset mode is of no effect at all. This is a simplification, merely requiring to press the desired mode switch anew at the end of the reset mode. Alternatively, one could provide also for storing of the location $N_7$ into both locations $M_3$ and $M_1$.

The activities carried out as described in the preceding paragraphs resulted in alternative branchings depending upon the outcome of testing the state of the set-up button as well as of the current mode as to when it can be interrupted. If not immediately, then at location $N_z$ et seq. and in $N_{z+m}$ there is BRR–$N_o$. $N_o$ holds the location which was in the program counter when the mode interrupt occurred, so that now there is a return to this location to complete the current mode which is either operate, single frame or reset in a manner as outlined above.

We have described the events that occur if the setup button was pressed for the desired mode change. Assuming that during the initial button interrogation location $N_x$ is reached and the testing of the "set up" switch finds it not to be set, then the program having thus executed instruction EXU in $N_2$ skips over location $N_3$ and turns to location $N_4$, holding an instruction BRX–$N_2$. Upon execution, the increment value in the index register (here "one") is added to the base value in the index register (presently "zero") and the next instruction is taken from $N_2$ holding indirect-addressing instruction EXU–$N_x$, and thus the instruction in location $N_{x+1}$ is executed which is SKS-"reset button."

Decoder 222 in the console is now addressed, and if it was the reset mode switch that was pressed to cause the mode interrupt, then the program proceeds to $N_3$, branches to $N_5$, causing flag 6 to be tested. If flag was reset, there can be an immediate mode change, and the program proceeds to $N_7$, causing branching to $N_y$+base index register content (=1), i.e., to $N_{y+1}$ holding BRU–RT1. This subroutine for the reset mode thus entered will be explained below. When flag 6 was set, then the program proceeds from $N_5$ to $N_6$, branching to $N_z$ occurs causing storing of address $N_{y+1}$ in location $M_3$; the program continues to $N_{z+m}$ holding BRR–$N_o$ and again there is a return to the memory location held in the program counter when the mode interrupt occured and the current mode is to be continued as prescribed.

If the reset button was likewise not the one that caused the interrupt (SKS test negative) then the program skips $N_3$ to proceed from $N_2$ to $N_4$ holding BRX $N_2$ and again the base address (now "one") is incremented by "one," and the program returns to $N_2$ holding EXU–$N_x$ to execute the instruction hold in $N_x$+index register content (now "two")=$N_{x+2}$ holding SKS "Hold." The situation is now analogous as aforedescribed and branching may occur to $N_{y+2}$ holding BRU–HD1, wherein HD1 is the beginning of the Hold mode subroutine to be described below.

If the Hold button was not pressed, the base address in the index register is incremented by one so that next location $N_{x+3}$ can be called upon to test the "Single Frame" mode switch. When set, this may result in either directly addressing location $N_{y+3}$ or in storing same in location $M_3$. $N_{y+3}$ holds BRU–SF1 wherein adddess SF1 is the beginning of a Single Frame subroutine. When the "single frame" switch or button was not pressed, then there is again incrementing of the base address in the index register to now address location $N_{x+4}$ holding SKS "operate" mode, which mode switch now must have been the one causing the interrupt and the program continues either to location $N_{y+4}$ or stores this location in $M_3$. $N_{y+4}$ holds BRU–O which is the beginning of the operate mode subroutine.

A location $N_{x+5}$ may hold an instruction to handle the situation when an interrupt signal did occur accidentally in the mode interrupt channel while none of the mode switches was pressed, there may, for example, simply be a return to location $N_o$ holding the program counter content at the time of the mode interrupt signal to proceed in the current mode.

Normally, the pressing of a mode switch will cause either instantly or after completion of the current mode as prescribed, the program counter to arrive at locations $N_{y+1,\ 2,\ 3\ or\ 4}$. Now the several subroutines branched to will be described. First, the set up mode switch 211 will be described only briefly. Switch 211 enables the human operator to control via the console the first part of the computer operation whereby the computer places itself into an operating condition. These initial operations are of no particular concern here. It could be mentioned, however, that after completion of these initial steps an appropriate light lights up which means that at that time the entire calculating program including, of course, all the subroutines discussed above and to be discussed further below are loaded in their respective memory locations.

The provision of this "set up" button in the console 12 serves only convenience, and is analogous to the load switches of the main control console of the computer.

The set up mode further includes the period of initial programming. The details of the programming at large are of no interest here, but it is of importance, that here the human operator has the opportunity to interpose into the sequence of normal arithmetic calculating instructions, all those instructions needed for the communication between console and computer. These are instructions to the effect that selected digit switches and display switches be assigned to particular values. Furthermore, he must interpose the three instructions BRU–$M_1$, $M_2$, $M_3$. For this, he may, for example, prepare at first a number of so-called operator statements which for example is information encoded in punched cards and to be read into the computer by the card reader 13. The details of these operator statements are of no concern here; furthermore, the main operator program for running any kind of problem for the purposes of solving a differential equation is of interest here only as to those steps which permit the operator to interfere with the programming and the operation of the computer per se. Specifically, the calculating steps in detail for performing the calculations proper are not of interest.

It is important to remember that a powerful general purpose computer never must have a completely empty core memory. Certain programs, a master or principal executive program, must always be stored, which permits upon application of power coupling of the computer to an input device with the aid of which the computer is enabled to receive the program recorded for example on cards sequentially read into the computer or via a typewriter. Furthermore, the computer must be enabled to communicate with a magnetic tape system so as to at least temporarily store the content of the data which have been read from the card or the typewriter, into one main track of a magnetic tape unit. Usually there is a tape track set aside for this purpose, and the content to be received from cards or typewriter is called the object program. In the instant case this general situation is dealt with as follows:

The line 216 of the console which responds to the pressing of any of the mode switches is connected to the computer in such a manner that it immediately accesses the memory address location 40 which permanently holds the instruction BRM, the address of which will accordingly be accessed subsequently thereto by the computer and it is the first address of the N-subroutine which enables the computer to sequentially interrogate the five mode switches as aforedescribed. This particular subroutine includes all of the SKS addresses including the set up button.

As the set up button will always be pressed first its SKS address always is the first in the line of interrogation to eliminate unnecessary steps, and the resulting signal in the line 201 is in effect a starting signal for the computer to perform all the initial steps necessary for it to operate as a different solver.

There will be a program which may be called a master program stored for this purpose in one of the magnetic tapes, and this master program will then be read into the core memory. This master program includes all the various subroutines outlined above and having been referred to as being located in permanently assigned address locations. There is some basic similarity here in that the "set up" mode switch performs a function similar to the Load switch-magnetic tape on the main "SDS-9300" computer control console. (See Reference Manual, supra.)

However, the Set up mode is not restricted to just this operation. A card feed switch may be part of the console control elements which when pressed subsequently causes the card reader to be addressed; this corresponds to the card load switch in the main console, and as far as the computer is concerned, similar functions are performed by the computer and the card reader in that the latter now reads the cards and the former stores the so-called object program of the problem into the main computer to be read from there into a tape. Additional steps will be performed automatically by the computer in that it also starts to execute already the program and presents into the core memory a sequence of instructions which the machine is capable of executing directly independently from the operator program read into the computer via the cards. This part is of no importance, and it is basically possible that the initial program is written directly in terms of the machine language which in this case will then be stored directly into the core memory. Whenever the system is in the Set up, Ready or Hold modes, the flag register portion 6 is reset. Which also means that whenever the system is entering the Set up, the Hold or the Ready modes, flag register 6 will be reset. As was developed above, this permits any mode change at that point without waiting, i.e. the system can leave the Set up, Hold and Ready modes at any time. There is, of course, the exception that the Set up mode subroutine will cause resetting of the flag 6 only after the pre-initial steps have been completed by the computer.

While the system is in the Set up mode and also subsequently thereto, the human operator will adjust the several digit switches in the cosole to set up the parameters and initial conditions needed; he will also set the primary and secondary frame time values. In addition, he may press one of the display switches assigned to display a value calculated during the initial calculations. In the example given above (FIGURE 5) this may be the display switch assigned to display X(0).

Next, the operator will press the "reset" mode button and there is accordingly an interrupt signal developed in line 216. The "reset" mode button is denoted in FIGURE 3 with reference number 212. The mode interrogation subroutine will be run through as aforedescribed until it is determined that, on one hand, flag 6 has been set or has not been set. Since it has not been set at that point, we are in the setup mode, the operation proceeds by addressing location $N_{y+1}$ holding BRU–RT1 so that control of the system is turned over immediately to the subroutine for the Reset mode.

In memory location $RT_1$ is an EOM instruction with the addres being the reset mode light (203) in the console 12. The EOM address is decoded in decoder 231 (FIGURE 3) and the decoded signal is stored in register 233 so that the reset light lights up in the console and remains on until a mode change occurs. As will be recalled from the description of the console, the EOM mode register 233 in the console will be cleared only when there is a true mode change, and this mode change is always indicated in that another EOM mode light address is being passed to the EOM mode register 233.

The next instruction executed is in the memory location $RT_2$ which is FIRS and causing the setting of flag register portion 6, since the reset mode now entered into is one which should not be interrupted until completed. In location $RT_3$ is an instruction STD, the address field thereof holds the memory location "Time." Execution of this particular instruction causes "zero" to be stored in the "Time" memory location. At this time the A and B registers are empty indeed so that no prior loading instruction for the A and B registers are required. Accordingly, the location Time which keeps track of the progression of the solution in time is set to time value zero. The next instruction is drawn from location $RT_4$ and this contains an instruction BRM–$H_1$. The branching which occurs at this point has been described already, since it simply means that the control of the computer causes branching to run through the frame times sampling and loading subroutine.

It should be mentioned that the initial conditions of arithmetic operations may include conceivably all arithmetic operations which the computer is capable of executing, with one exception, namely integration. Thus, from this standpoint it might appear superfluous that the frame time which determines the rate of progressive integration approximation is being sampled from the console for loading into the appropriate location during the Reset mode. However, it should be mentioned that a wide use of operation is envisioned with this system. Furthermore, this system does not preclude the possibility that the initial condition arithmetic operations contain instructions to the effect amounting to some preliminary calculations, enabling the operator, for example, to determine ranges or the like to be expected, and for such type of operation it may very well be necessary to use the then already adjusted primary frame time. Also, the system may be endowed with capabilities of employing different types of integration methods such as Runge Kutta, Adam Bashford or tapezoidal or four point predictor, and each one of these methods has a different residual error. This may to some extent be estimated and calculated initially.

The memory location $H_1$ will receive the address location $RT_4$ and then the sequence described above with reference to the lower portion of Table IV and concerning the loading of the primary and secondary frame times into their appropriate locations will be carried out; at the end thereof as will be recalled, control of the computer is returned to the effective address stored in $H_1$ plus one which in this case is $RT_{4+1}$.

The $RT_5$ memory location contains an instruction LDA, effective memory address being $RD_1$ which is the first memory location for the "ready" mode subroutine. Thus, this address location of $RD_1$ is stored into A register, and when the control shifts to $RT_6$ the instruction STA–$M_1$ therein is carried out, by placing the $RD_1$ subroutine into memory location $M_1$. It will be remembered that location $M_1$ is the address to which the main program branches just prior to the first instruction for rate 1 arithmetic operation (see FIGURE 5 $A_{00}$).

The control then shifts to $RT_7$ and there is found BRU–$M_5$. Memory location $M_5$ is a fixed, non-assignable memory address which during programming is loaded with the effective address $A_1$ that contains the first instruction for initial conditions. For example, this may be an instruction for branching to a digit switch assignment operation discussed above. Thus, at this point during the Reset mode the main program is being entered and all the initial conditions, arithmetic, loading and other instructions are being executed. These include assignments of digit switches and/or assignments of display control switches as described above.

At the end of this sequence of initial condition calculating instructions the program counter will reach the memory location $A_{00}$ holding the instruction BRU–$M_1$, and location $M_1$ was loaded with the $RD_1$ memory location address so that when the program counter register reach $A_{00}$ branching occurs by loading the $RD_1$ memory location into the program counter thereby turning over the effective memory control to the subroutine starting with the $RD_1$ memory location.

$RD_1$ contains an EOM instruction the address containing the "ready" mode light. Thus, the changeover from the Reset mode to the Ready mode is not controlled by the operator, but results automatically after completion of the execution of the initial arithmetic instruction, and this completion is indicated visibly to the operator by the fact that the system is shifted out of the Reset mode and into the Ready mode.

The change in lamps in console 12 as aforedescribed. Control then shifts to the $RD_2$ memory location containing a FIRS instruction effective to reset flag register 6 as an indication, that the ready mode can be left immediately without waiting. The $RD_3$ memory location now finally contains the BRU instruction having in its address field the address location $RD_3$ as an indication that the computer is shifted into the waiting or idle state. The program counter does not progress so as to maintain this idle state and the computer simply waits for the operator to press a different mode button to cause a change. However, it may be possible, that the operator has forgotten to press a display button which he had previously assigned to a value calculated during the initial condition arithmetic operation or he has two display switches assigned to different values, only one thereof can become effective when the program runs through the initial conditions section. He simply can press the respective display button at this point and then the "reset" mode button again, so that the computer runs again through all the initial condition operations which includes the aforedescribed interrogating operations as far as pressing or not pressing of those display switches as concerned which have been assigned specific operand locations in the initial program section; if such another button is found as having been pressed, then the calculated value will appear as a display window 121–122.

From his observation, the operator may conclude that one or more of the parameters set are not correct and he can change the setting, press a display button and then the "reset" button again and observe the different result.

After being satisfied, the operator will proceed and press the "operate" mode switch. Of course, immediately an interrupt signal results in line 216, and the subroutine for interrogating all of the mode switches is carried out after having discovered that flag 6 is reset permitting an immediate change in mode. Now, after arriving at location $N_{y+4}$ the address location $O_1$ is loaded into the program counter. Memory location $O_1$ contains instruction BRM–$H_1$ as memory address causing address $O_1$ to be loaded into the memory location $H_1$ and the system shifts to $H_2$ and the primary and secondary frame times will be loaded again into their respective memory locations Δ and Mult. They were loaded already during the Reset mode, but the operator may have changed them. Also, if the initial condition program does not need these periods, the operator can wait with the adjustment of the respective switches 160 and 180. At $H_{z+1}$ the system leaves the frame times loading subroutine and returns to $O_2$.

Flag 6 is set upon executing the instruction FIRS held in location $O_2$. The next controlling memory location is $O_3$ containing an SKS instruction, the address field containing the "real time" switch in the console 12. Thus, the gate for the SSC signal in the computer control section (FIGURE 4) will be opened, and the address code for this particular switch will appear in the C register, lines C12 through C33, and the decoder 174 in the console will monitor the pressing or not-pressing of the "real-time" switch 170. Assuming that the real time switch is not pressed, this is an indication that non-real time operation is desired, so that as a result of this execution of the SKS instruction the next memory location is skipped over, and the computer control is turned over to memory location $O_5$ containing the EOM instruction code with the address field now being the operating mode light. Thus, only at this time the system indicates that the operate mode has been entered into. The EOM mode decoder 231 in the console and the mode register 233 cooperate to maintain the "operate" light on for as long as the system stays in the operate mode.

The next effective memory location is $O_6$ containing an instruction LDP and causing the two addresses $S_1$ and $S_4$ to be loaded into the registers A and B. At location $O_7$ an STD instruction is executed, and the $S_1$ and $S_4$ address location codes are transferred from A and B registers respectively to the $M_2$ and $M_3$ memory locations for storage.

It will be recalled that the $S_1$ and $S_4$ are addresses pertaining to a particular subroutine which causes continuously cycling or iteration of the calculating operations in non-real time, as was described above in reference to FIGURE 5 and Table V. The memory location $M_2$ is always being called upon at the end of primary calculations provided there are secondary calculations. The location $M_3$ is always called upon at the end of each rate 2 cycle if any, or, if none, at the end of each rate 1 cycle, for controlling the cyclic repetition of the iteration program. Thus, this subroutine $O_1$ et seq. presently described causes in dependence upon the non-actuation of the real time switch the appropriate subroutines entry locations ($S_1$–$S_4$) to be loaded into effective memory locations $M_2$ and $M_3$ thereby enabling the system to iterate in non-real time environment (i.e. as fast as permissible).

The next instruction is drawn from memory location $O_8$ which is an instruction BRU–$S_4$. As will be recalled from Table IV, location $S_4$ is an entry into the primary calculations, preceded by loading "K–1" into location "count" and incrementing the value held in location "Time." The S-subroutine is left by entry into the primary calculating portion of the problem program.

The iteration proceeds in non-real time as aforedescribed, permitting all changes of parameters and the display of any desired value without any interruption of operation. The loading of locations $M_2$ and $M_3$ with the two entries into subroutines $S_1$ et seq. (Table IV) ensures automatic recycling and interpositioning of secondary rate calculations as often as determined by the adjusted multiple "K." How the operator can change the frame time $\Delta t$ and factor K was explained above, how this can be made effective at any time during running of a problem will be described below.

The situation is different if at the time of executing the instruction in location $O_3$ it was found that the real time switch was pressed. In this case the memory location $O_4$ is not skipped over, but when the SKS test of the real time switch resulted into a signal indicating that the switch was pressed, memory location $O_4$ is then accessed holding branching BRU–$O_9$. The memory location $O_9$ contains an instruction LDP with addresses $R_1$ and $R_7$ being the effective operands to be loaded into A and B registers respectively. Location $O_{10}$ contains S*t*D–$M_2$ and $M_3$ so that the address locations $R_1$ and $R_7$ are respectively stored into memory locations $M_2$ and $M_3$.

Of course, control is not turned over yet to either of these locations, but it will be remembered that in case of real time environment operation memory locations $M_2$ and $M_3$ respectively are called upon at the beginning and end of the secondary calculations as was described above in detail and it will be recalled that the subroutine $R_1$ et seq. is destined primarily to provide a "saving" operation in case of a clock interrupt as resulting from the count down of the primary frame time in real time. The cycling of the program, i.e., the iteration in real time operation is controlled by the interrupt (see $T_1$ et seq.), but also partially from an entry into the S-subroutine $S_6 \rightarrow S_9 \rightarrow M_6 \rightarrow A_{01}$.

After $R_1$ and $R_7$ have been properly loaded into their respective operation location for real time control, the system shifts to $O_{11}$ having an EOM instruction to cause the "operate" mode light to be set as an indication that now in this case for real time operation the operate mode has been entered. The last instruction of this particular operating mode subroutine is in $O_{12}$ and is a BRU instruction containing in its address field its own memory location address, so that the computer is shifted into the waiting state to remain idle, and the program counter remains loaded with the memory location $O_{12}$. The purpose thereof is, of course, to synchronize right from the start the iteration operation to the clock. In particular the system now waits for the counter 162 to produce an interrupt signal; (the first effective clock interrupt) and when this interrupt signal occurs, operations starts as when described above with reference to Table V by entry into $T_1$.

It will also be recalled from the description of FIGURE 3 that for real time operation counter 162 requires as enabling signal the "operating" mode signal which is derived from the mode register 233. Since in the operate mode flag 6 is set, any mode interruption due to the operator pressing a different mode switch will still cause a rate 2 cycle to be completed first before the contemplated mode change occurs. As was described above, this is evidenced by reaching $B_{end}$, branching to $M_3$ then holding $N_{y1}$ or $N_{y+1}$, etc. for branching into the new mode subroutine, and only thereafter this new mode is being entered.

A different mode at that instance may, for example, be the reset mode. The operator may have, for example, continuously observed during real time or non-real time operation, how the program runs. He does so by observing the display windows 121 and 122 and as he desires, he presses the respectively assigned display switches. For each iteration the displayed value is updated not only in the computer, but the new value is set into the display register. If he finds that the problem does not run the way he expected it to do, he simply presses the "reset" button which in effect means that every result obtained up to this time is being eliminated from the appropriate data storage locations, and the initial conditions are being run through again, the system is placed into the ready mode and the problem can be run again after appropriate parameter adjustments have been made.

If the operator does not wish such a drastic change, he has another choice. He can simply switch the system into the Hold mode. The Hold mode will be entered into only after completion of a rate 2 cycle. Thereafter, the control of the computer is turned over to the $HD_1$ memory location and the EOM instruction therein causes the "hold" mode light to light up in the console. $HD_2$ contains the instruction to reset register flag 6 because the "Hold" mode can be left at any time, and the $HD_3$ location finally contains a self-cycling BRU instruction which places the system into a waiting state.

Now, for example, the operator can make changes. For example, he can change parameters. Most important, however, he can now change effectively the setting for the primary frame time $\Delta t$ as well as the setting for multiple K. The operator then can continue the problem by simply pressing again the "operate" mode switch. The Operate mode will continue, however, the O and N subroutines will be run through again, so that the newly adjusted frame time values are sampled for subsequent use. Otherwise, the program will continue at the point that has been reached by iteration, where it was interrupted, calculated values have not been erased: The time summed in the "time" location is continued where left off, updated variable values are the same and no change has been made as far as memory content is concerned.

The sixth mode routine is not being described here in detail, it is the Single Frame mode operation. The single frame operating mode is basically similar to the Operate mode subroutine as shown in Table III, and particularly the frame time interrogating subroutine is being run through here also; flag 6 is set, and the memory locations $M_2$ and $M_3$ which are controlling for the cycle operation are being loaded. The subroutine used and particularly the entries thereof as loaded into memory locations $M_2$ and $M_3$ are to some extent similar to the S-subroutine of which memory locations $S_1$ and $S_4$ are a part (Table V). The difference is, that after one complete rate 2 cycle the system shifts into the Hold mode.

These modifications can easily be derived from the $S_7$-subroutine. There are, of course, possible different ways of modification. For example, subsequently to $S_8$, one interposes a sequence of instructions which multiplies K with $\Delta t$, then the difference of this value and of the value stored in "Time" is formed. As long as this difference is negative, branching to $S_9$, i.e., $M_6$ occurs for another rate 1 cycle. When the difference is not negative any more, and provided the real time button is not pressed (SKS test) branching to the hold mode, i.e., $HD_1$ occurs. In real time single frame, branching to the hold mode will additionally be made dependent that $B_{end}$ is reached. Branching into the hold mode will thus depend on the aforedescribed time metering tets and reaching of $B_{end}$.

It has not yet been discussed, how the idle time will be displayed. Idle time is in real time the difference between the primary frame time in real time and the time it takes the computer to complete a full rate 2 cycle. If there are no rate 2 calculations, idle time is the difference of the primary frame time in real time and the operating time for one primary cycle. This may be metered by metering the time when the program counter has reached $B_{end}$, up to the next time-interrupt signal (line 164). Since the computer is equipped with a time metering device, such value can readily be provided and when ascertained at this next time interrupt signal, it is stored in a fixed location and accessed in a manner analogous to the other display controls prior to the entering into the hold mode.

What is claimed is:

1. In a digital analog problem simulator having storage means including a plurality of addressable storage locations holding machine instruction codes and operand identifying codes, further having processing means for addressing such storage locations thereby causing the machine instructions to be executed in that the respective operands are processed, the combination comprising:
manually adjustable means for setting a multi-digit value;
means in said processing means for cyclically addressing a sequence of said locations to repeatedly execute an iteration computing program in steps of an independent variable for progressively calculating numbers representing solutions of a differential equation progressing in dependence upon the stepwise change of the independent variable and using numbers calculated during previous cycles;
means responsive to instructions in said program to interrogate said setting means for each cycle as to the value set and loading same into a storage location for subsequent use as an operand during the same or the following cycle; and
second adjustable means for providing controlled variations in the initial conditions of the iteration program.

2. In a digital analog problem simulator having a storage means including a plurality of addressable storage locations in which are stored machine instruction codes identifying operands, the combination comprising:
means for carrying out computations by sequentially addressing storage locations in said storage means and executing the instructions therein by processing the respectively identified operands; and
a console having switching means for selectively controlling cyclic repetition of a first portion of said computations and non-cyclic repetition of a second portion of said computations requiring the result of computations in accordance with the first portion.

3. A digital analog problem simulator which includes processing means responsive to machine instructions for processing operands, further including storage means having a plurality of addressable storage locations in which are stored machine instructions and codes identifying such operands, comprising:
means for addressing a first plurality of said storage locations holding instructions that define a first computing program and including several locations, each holding a branching instruction to subroutine programs which when executed permit data transfer between selected operand storage locations and an externally accessible location, said program further including locations holding instructions which when executed cause addressing codes to appear at said externally accessible location;
data setting means and data displaying means, each of said setting and displaying means including decoder means connected to said externally accessible location for being individually addressable by address codes when received by the decoder means;
means connected to the decoder means and being enabled when the decoder means receive one of the address codes to provide signals enabling data communication between the respective enabled one of the setting means and the displaying means, and said processing means when the respective address code appears at said external location; and
means responsive to the enabling signal to cause the addressed one of said setting and displaying means to be coupled to said externally accessible location to provide for data communication between the thus addressed means and a selected one of said operand addresses.

4. In a digital analog simulator having means responsive to machine instruction codes for processing data codes, comprising:
storage means including a plurality of addressable storage locations, there being a plurality of machine instruction codes in said storage locations;
means for sequentially addressing said storage locations for computing dependent variables, there being a first and a last storage location pertaining to such computing program;
a console having first and second switching means operatively connected to said processing means;
means in said processing means responsive to actuation of said first switching means for causing said addressing means to return to said first location after having arrived at said last location to repeat said computing program;
adjustable clock means for periodically providing a signal after a predetermined period of time has elapsed; and
means in said processing means responsive to actuation of said second switch and to said signal for causing said addressing means to return to said first location after having arrived at said last location upon detection of said signal.

5. In a digital analog simulator having storage means including a plurality of addressable storage locations holding machine instruction codes and operand identifying codes, further having processing means for addressing such storage locations thereby causing the machine instructions to be executed in that the respective operands are processed, the combination comprising:
an externally accessible digit value setting means connected to the processing means for manually adjusting a digital number value to be represented as an electrical signal;
means in said processing means for repeatedly sequentially addressing a plurality of said locations to execute an iteration computing program progressing in steps of an independent variable, there being a location holding an instruction code which when executed during each repetition causes said signal as it results from independent manual adjustment of said setting means to be passed to said processing means; and
means in said processing means responsive to said signal each time it is passed to said output lines for storing it into a location for use as an operand pursuant to continuation of said computing program.

6. In a digital analog simulator having storage means including a plurality of addressable storage locations holding machine instruction codes and operand identifying codes, further having processing means for addressing such storage locations thereby causing the machine instructions to be executed in that the respective operands are processed, the combination comprising:
a console having operable switching means connected to said processing means;
means in said processing means responsive to the operation of said switching means to first cause addressing of a first sequence of said locations and to subsequently cause repeated addressing of a second sequence of said locations, said second sequence constituting a computing program; and
a digit value setting means in said console for setting a digital number value, said value setting means being interrogated by said processing means during addressing of said first sequence to store the number value set for use as operand representing stepwise progression of computation during addressing of said second sequence.

7. A digital analog simulator which includes computing and processing means responsive to machine instruction codes for processing operand representing code signals, comprising:

storage means including a plurality of addressable storage locations holding machine instructions to be executed in predetermined order and including a plurality of instructions constituting a computing program, there being a storage location holding a data value representing a time period used for calculating sequentially discrete variables as a function of time and being updated in increments of said time period;

a console having input and output channels respectively connected to output and input channels of said processing means;

a selector switching means in said console for selecting digital values representative of said period of time;

addressable decoder means in said console connected to said console input channels to be addressed from said processing means to provide an enabling signal;

means in said console responsive to said enabling signal to provide said digital values to said console output channels; and means in said processing means responsive to said digital values when received from said console to load said values into said one storage location.

8. A digital analog simulator which includes computing and processing means responsive to machine instruction codes for processing operand representing code signals and having input and output channels, comprising:

storage means including a plurality of addressable storage locations holding machine instructions to be executed in predetermined order and including a plurality of instructions constituting a computing program, there being a storage location holding a data value representing a time period used for calculating sequentially discrete variables as a function of time and being updated in increments of said time period;

a console having input and output channels respectively connected to output and input channels of said processing means;

a selector switching means in said console for selecting digital values representative of said period of time;

addressable decoder means in said console connected to said console input channels to be addressed from said processing means so as to provide an enabling signal;

means in said console responsive to said enabling signal to provide said digital values to said console output channels;

means in said processing means responsive to said digital values when received from said console to load said values into said one storage location;

a first mode control switch in said console operatively connected to a further input channel of said computer which when pressed causes said computing means to address said decoder to sample said values and to repeat execution of said program for said processing means to calcuate said variables progressively using said values in said one storage location; and second mode control means connected to said further input channel, and which when pressed disables said computing means to any further repetition of said program.

9. A digital analog simulator which includes computing and processing means for executing machine instruction codes by processing operand representing code signals, further having storage means including a plurality of addressable storage locations holding machine instructions to which said processing means respond by processing operands identified by codes stored in addressable locations together with such instructions, comprising:

means for sequentially addressing said storage locations, a first plurality of instructions therein when executed by sequential response of said computing means resulting in a first set of calculated operands stored in respective locations, a second plurality of instructions therein when executed by sequential response of said computing means using as some of the operands said first set of calculated operands and resulting in a second set of operands, a third plurality of instructions therein when executed by sequential response of said computing means causing said computing means to repeat execution of said second plurality of instructions;

a console having a plurality of digit value setting switches;

a plurality of decoders in said console responding to alerting and sampling signals issued by said processing means pursuant to execution of said first and second program, to feed digit values set by the respectively alerted switches to said computing means for storage as an operand;

a first control switch in said console connected operatively to said computing means for causing said computing means to commence response and execution of said first plurality of instructions;

indicating means in said console connected to said computing means to respond to completion of execution of said first plurality of instructions; and a second control switch in said console for causing said addressing means to sequentially address said third plurality of instruction for said computing means to cyclically execute said second plurality of instructions, such cyclic execution being interrupted upon operating said first control switch.

10. A digital analog simulator which includes computing and processing means responsive to machine instruction codes for processing operand representing code signals, comprising:

storage means including a plurality of addressable storage locations holding machine instructions, a plurality thereof to be executed in predetermined order, and constituting a computing program, there being a storage location holding a data value representing a time period used for calculating sequentially discrete variables as function of time and being updated in increments of said time period;

a console having input and output channels respectively connected to output and input channels of said processing means;

a selector switching means in said console for selecting digital values representative of said period of time;

addressable decoder means in said console connected to said console input channels to be addressed from said processing means to provide an enabling signal;

means in said console responsive to said enabling signal to provide said digital values to said console output channels;

means in said processing means responsive to said digital values when received from said console to load said values into said one storage location;

a clock pulse source;

a counter in said console counting said clock pulses issued from said source and being connected to said switching means to provide a signal when the selected period of time value has elapsed in real time; and means in said processing means responsive to said signal causing said processing means to respond to and execute said program every time said signal is received.

11. In a digital analog simulator having storage means including a plurality of addressable storage locations holding machine instruction codes and operand identifying codes, further having processing means for addressing such storage locations thereby causing the machine instructions to be executed in that the respective operands are processed, the combination comprising:

a console having an adjustable rate clock to produce signals at the adjustable rate, and feeding such signals to said processing means;

a first switch in said console connected to said processing means for enabling said processing means to commence addressing a first sequence of said locations each time a rate clock signal is received; and digit value setting means in said console interrogated by said processing means to determine the frequency of addressing a second sequence of said locations, such second sequence being interruptable by each one of said signals and continued after completion of addressing the first sequence of locations which was commenced upon occurrence of said one signal.

12. A digital analog simulator having a storage means including a plurality of addressable storage locations in which are stored machine instructions and identifying addresses of other storage locations holding operands to be subjected to the execution of machine instructions, said plurality of addressable storage locations holding a plurality of subroutines each including at least one machine instruction and to be executed in sequence, comprising:

means for addressing the locations holding instructions for a first subroutine which when executed computes a dependent variable out of at least one independent variable held as operand in one of said other locations, said dependent variable being stored subsequent to its computation in a second one of said other locations, said addressing means addressing the locations holding a second subroutine prior to addressing the locations holding the instructions for said first subroutine for execution and causing issuance of a code signal, said addressing means addressing the locations holding a third subroutine subsequent to addressing the locations holding said first subroutine for execution and causing issuance of an interrogating signal;

a console having a selective switching means for setting a digital value, further having a plurality of output channels connected to said simulator;

a decoder in said console responsive to said code signal when issued and causing said digital value to pass to a plurality of output channels, said second subroutine including instructions to the effect of loading said digital value into said second storage location;

a digital display device in said console;

an enabling switch in said display device responsive to said interrogating signal to return a display command signal to the computer, said third subroutine including instructions to the effect of feeding the operand in said second location to said display device when said enabling switch was actuated to cause said command signal; and switching means in said console to selectively control repetition of execution of said plurality of subroutines.

13. In a digital analog simulator, the combination comprising:

a storage means including a plurality of addressable storage locations in which are stored machine instructions and address codes identifying further storage locations containing operands;

means for carrying out in successive iteration cycles a computation program by sequentially repeatedly addressing storage locations in said storage means, there being a storage location which when addressed during each cycle causes an identification code to be passed into output channels;

a console having digital data display means connected to said output channels and being responsive to coded signals in said output channels for providing a digital display of such code signals;

at least one selector display switch in said console connected for selectively enabling and disabling a decoder connected also to said output channels to be responsive to an identification code; and means responsive to the enabling of said decoder when receiving said identification code to interrupt execution of said program and causing addressing of a second storage location to pass its operand content to said output channels for display while returning to said program to continue said computations, said display operand being undated whenever said first storage location is addressed again during successive iteration cycles and said display switch continues to enable said decoder.

14. A digital-analog simulator which includes computing and processing means capable of responding to machine instruction codes for processing operand representing code signals, comprising:

a storage means including a plurality of addressable storage locations, in which are stored machine instructions and address codes, said instructions being organized in a sequence of sequentially executed subroutines, said computing means responding to some of said subroutines to form dependent variables out of operands including operands representing independent variables and parameters, such dependent variables being respectively stored in assigned storage locations;

means for sequentially addressing said locations to permit said computing means to execute the instruction respectively found in such locations, said processing means responding to a further plurality of said subroutines respectively executed subsequently to the computation of an independent variable, each further subroutine comprising a test instruction and an instruction permitting presentation of a particular dependent variable previously computed, to be executed in dependence upon the result of execution of the respectively preceding test instruction, said processing means responding to a branch subroutine subsequently to response and execution of a loading instruction of one of said computing program subroutines to present such independent variable at output channels of said simulator;

a console having a plurality of control switches each switch being provided with a test code decoder to respond to execution of a particular one of said test instructions and when being set providing a signal to said processing means to permit execution of said presentation instruction and of said branch subroutine, each of said test instructions when executed tests setting of a different one of said control switches; and display means in said console connected to said output channels to receive therefrom the respectively presented independent variable.

15. A digital-analog simulator having processing means responsive to machine instruction codes for processing operands, comprising:

storage means including a plurality of addressable storage locations in which are stored machine instructions and address codes identifying further storage locations containing operands, a first plurality of said locations representing a first computing program to compute dependent variables from parameters and at least one independent variable stored in a second plurality of locations, a third plurality of said locations representing a second program to compute further dependent variables using at least one of the dependent variables computed pursuant to execution of said first program;

a console having a plurality of indicator means;

a first switch in said console, there being means to connect said switch to said processing means, to ascertain the identity of said first switch when pressed, and to subsequently enable said processing means to execute said first program;

means to provide to said indicator means in said console a first indication of the execution of said first program and a second indication at the completion of execution of said first program;

a second switch in said console, there being means to connect said switch to said processing means, to ascertain its identity when pressed and to cause repeated execution of said second program, said repetition being interruptable upon pressing said first switch.

16. In a digital-analog simulator having storage means including a plurality of addressable storage locations holding machine instruction codes and operand identifying codes, further having processing means for addressing such storage locations in predetermined sequences thereby causing predetermined sequences of machine instructions to be executed, the combination comprising:

a consol having a plurality of manually operable switching means, each switching means being associated with a predetermined one of said sequences;

a circuit network in said console responsive to operation of any of said switching means and being connected to said processing means to temporarily interrupt its operation;

means in said processing means responsive to said interruption and causing interrogation signals to be passed to said console to identify the respective operated switching means that caused the interruption; and means in said processing means responsive to the identification of such switching means to decide upon temporary continuation or immediate discontinuance of the interrupted sequence before commencing the sequence associated with the operated switch.

17. A digital analog simulator which includes computing and processing means responsive to machine instruction codes for processing operands representing code signals and having input and output channels, further including storage means having a plurality of addressable storage locations holding machine instructions to which said processing means respond by processing operands stored in locations identified by addresses stored in addressable locations together with such instructions, comprising:

means for addressing sequentially a first plurality of instruction code locations, the instructions therein constituting a first computing program, one of the operands used being a period of time, and a second plurality of instruction code locations, the instructions therein constituting a second computing program, one of the operands being a second period of time that is a multiple of said first period of time;

a console having input and output channels respectively connected to said output and input channels of said processing means;

a first and a second selector switching means for selecting digital values representative of said periods of time;

addressable decoder means in said console connected to said console input channels to be individually addressed from said processing means prior to execution of either program and to respectively provide enabling signals;

means in said console responsive to said enabling signals for respectively providing said digital values to said console output channels;

means in said processing means responsive to said digital values when received from said console to load said values into selected operand storage locations; and means for causing said addressing means to address the locations for said first and second computing programs repeatedly with said second program being executed once for several executions of said first program, the ratio of frequencies being given by the ratio of the second to the first periods of time as selected by said switching means.

18. In a digital-analog simulator having storage means including a plurality of addressable storage locations holding machine instruction codes and operand identifying codes, further having processing means for addressing such storage locations thereby causing the machine instructions to be executed in that the respective operands are processed, the combination comprising:

a console having a plurality of manually operable switching means, connected to the processing means;

means in said processing means responsive to operation of a first one of said switching means to cause repeated addressing of a first sequence of said locations to execute an interation computing program; and means in said processing means responsive to the operation of a second one of said switching means to cause addressing of a second sequence of said locations to execute an initial condition computing program for use in said iteration program.

19. In a digital-analog simulator having storage means including a plurality of addressable storage locations holding machine instruction codes and operand identifying codes, further having processing means for addressing such storage locations thereby causing the machine instructions to be executed in that the respective operands are processed, the combination comprising:

a console having an adjustable rate clock to produce signals at the adjustable rate, and feeding such signals to said processing means;

a first switch in said console connected to said processing means for enabling said processing means to commerce addressing a first sequence of said locations each time a rate clock signal is received; and means in said processing means responsive to each of said signals to determine completion of addressing of said sequence commenced at the preceding one of said signals.

20. In a digital analog simulator having a storage means including a plurality of addressable storage locations in which are stored machine instructions and address codes identifying further storage locations containing operands, the combination comprising:

means for carrying out a computation by sequentially addressing storage locations in said storage means and executing the instructions therein by processing the operands of the location identified by the respective address that accompanies the respectively executed instruction, one of the operands being a parameter, another one representing a period of time;

a console having input and output channels and first and second digit value setting means, further having first and second decoders to respectively receive codes from the input channels for enabling said first and second digit value setting means by applying the respective digit values set to said output channels;

means enabled during execution of said computation for feeding a code signal to said input channels and for subsequently causing the digit value of said first setting means as it appears in said output channels to be located as parameter operand into an operand location;

means enabled prior to execution of said computation for feeding a second signal to said input channels and subsequently causing the digit value of said second setting means as it appears in said output channels to be loaded as period-of-time operand into another operand location; and means in said console for selectively controlling cyclic and non-cyclic repetition of said computation including repeated sampling of said first digit value setting means during cycling repetition and sampling of said second setting means prior to non-cyclic repetition.

21. A digital-analog simulator including a plurality of addressable storage locations in which are stored machine instructions and address codes identifying further storage locations of said storage means holding operands, said plurality of locations holding a program as defined by a sequence of the instructions in said plurality of locations which when executed by said computing means causes computation of at least one dependent variable and of several of said operands in progression of successive iteration cycles, said computing means including means to provide externally detectable alerting code signals sequentially during execution of said program and repeatedly during each cycle:

a console having input and output channels, said input channels connected to receive said alerting signals;

a plurality of switching means in said console, each switching means adapted to provide a digital value setting;

a decoder in said console, connected to said input channels and providing one of a plurality of enabling signals when receiving one of a plurality of said alerting code signals;

means in said console responsive to said enabling signals and to correlate an enabling signal when present to one of said switching means, to provide the digital value set by said switching means to said output channels;

means in said computer responsive to said value in said output channels and to load said value into an operand address; and selective control means in said console communicating with said computing means to selectively cause repeated execution of said first program and repeated sampling of said switching means pursuant thereto.

22. In a digital-analog simulator having a storage means including a plurality of addressable storage locations in which are stored machine instruction codes and codes identifying operands, the combination comprising:

means for carrying out a computation by sequentially addressing storage locations in said storage means and executing the instructions therein by processing the operands as identified by the codes accompanying the respectively executed instruction codes, a plurality of the operands being parameters;

a console having input and output channels connected to said computation means and having a plurality of digit value setting means, further having decoders to respectively receive codes from the input channels for decoding them and enabling the respectively addressed digit value setting means by applying the respective digit values set to said output channels;

means sequentially enabled during execution of said computation for sequentially feeding code signals to said input channels, each code signal when decoded subsequently causing the digit value of the respectively addressed setting means as it appears in said output channels to be located as parameter operand into an operand location; and means in said console for selectively controlling cyclic repetition of said computation including repeated sampling of said first digit value setting means during cycling repetition.

23. In a digital analog problem simulator having a storage means including a plurality of addressable storage locations in which are stored machine instruction codes and operand identifying codes, the combination comprising:

a processing means for sequentially addressing storage locations in said storage means and executing the instructions therein by processing the respectively identified operands, a plurality of the operands representing parameters;

a console having input and output channels connected to said processing means, and digit value setting means;

a plurality of decoders in said console to respectively receive codes from the input channels thereof for respectively enabling one of said digit value setting means by applying the respective digit values set to said output channels;

means sequentially enabled during execution of said computation for sequentially feeding code signals to said input channels, each code signal when decoded subsequentially causing the digit value of the respectively addressed setting means as it appears in said output channels to be located as parameter operand into an operand location; and means in said console for selectively controlling cyclic repetition of a first portion of said computation and non-cyclic repetition of a second portion of said computation, including repeated sampling of at least some of said digit value setting means during at least one of said portions of said computation.

24. A device for solving differential equations comprising:

a plurality of variable signals;

a general purpose digital computer including means for storing said variable signals at addressable locations and means for performing whole number iterative integration operations on at least one function of at least a portion of said stored variable signals; and means for manually varying at least a portion of said variable signals during said integration operations.

25. In combination for facilitating the solution of a differential equation represented by a plurality of different derivatives of a dependent variable and a plurality of factors individually modifying the derivatives, a general purpose digital computer, first means in the computer for storing first pluralities of signals individually representing the different derivatives, second means in the computer for storing second pluralities of signals individually representing the factors modifying the different derivatives, third means in the computer and operatively coupled to the first and second means for operating upon the first and second pluralities of signals in an individual pattern in successive cycles of computation and in accordance with the interrelationship between the different derivatives and the different factors in the differential equation to be solved, adjustable means for providing for adjustments in individual ones of the first and second pluralities of signals in accordance with controlled adjustments in the adjustable means independently from the third means, and means operatively coupled to the adjustable means and to the first and second means in the computer for providing adjustments in the individual ones of the first and second pluralities of signals in accordance with the adjustments in the adjustable means and under control of the third means.

26. The combination set forth in claim 25, including:

means operatively coupled to the first and second means in the computer for providing visual indications of the values represented by the individual ones of the first and second pluralities of signals to provide for adjustments in the adjustable means in accordance with such indications.

27. In combination for facilitating the solution of a differential equation represented by a plurality of different derivatives of a dependent variable and a plurality of factors individually modifying the derivatives, a digital computer, first means in the computer for providing first pluralities of signals individually representing the different derivatives, second means in the computer for providing second pluralities of signals individually representing the different factors, third means in the computer and operatively coupled to the first and second means in the computer for varying the first pluralities of signals in successive cycles of computation in accordance with the interrelationship between the different derivatives and the individual factors in the differential equation to be solved, means adjustable to different positions to provide for variations in individual ones of the first and second pluralities of signals, means operatively coupled to the first and second means in the plurality and to the adjustable means for providing visual indications of the values represented by individual ones of the first and second pluralities of signals, and means operatively coupled to the adjustable means and to the first and second means in the plurality for providing adjustments in the individual ones of the first and second pluralities of signals in accordance with variations in the positions of the adjustable means and without interrupting the operation of the digital computer and the first, second and third means in the digital computer.

28. The combination set forth in claim 27 wherein the digital computer is a general purpose digital computer.

29. In combination for facilitating the solution of a differential equation represented by a plurality of different derivatives of a dependent variable and a plurality of factors individually modifying the derivatives, a general purpose digital computer, first means in the computer for providing first pluralities of signals individually representing the different derivatives, second means in the computer for providing second pluralities of signals individually representing the different factors, third means in the computer and operatively coupled to the first and second means in the computer for varying the first pluralities of signals in successive cycles of computation in accordance with the interrelationship between the different derivatives and the individual factors in the differential equation to be solved, means adjustable to different positions to provide for variations in individual ones of the second pluralities of signals, means operatively coupled to the second means in the plurality and to the adjustable means for providing visual indications of the values represented by the individual ones of the second pluralities of signals, and means operatively coupled to the adjustable means and to the second means in the plurality for providing adjustments in the individual ones of the second pluralities of signals in accordance with adjustment in the positions of the adjustable means and without interrupting the operation of the digital computer and the first, second and third means in the digital computer.

30. In combination for facilitating the solution of a differential equation represented by a plurality of different derivatives of a dependent variable and a plurality of factors individually modifying the different derivatives where the derivatives are to be integrated with respect to an independent variable, a digital computer, first means in the digital computer for providing first pluralities of signals individually representing the different derivatives, second means in the digital computer for providing second pluralities of signals individually representing the different factors, third means in the signal computer for providing signals representing successive increments in the independent variable, fourth means in the digital computer and operatively coupled to the first, second and third means in the digital computer for varying the first pluralities of signals, upon the production of the signals representing the successive increments in the independent variable, in accordance with the interrelationship between the different derivatives and the individual factors in the differential equation to be solved and in accordance with the magnitude of such successive increments in the independent variable, means adjustable to different positions to provide for variations in the production of signals representing the magnitude of the successive increments in the independent variable, and means operatively coupled to the adjustable means and to the third means in the digital computer for adjusting the production of signals by the third means in the digital computer in accordance with adjustments in the adjustable means to vary the magnitude of the successive increments in the variable quantity.

31. The combination set forth in claim 30 wherein the digital computer is a general purpose digital computer.

32. In combination for facilitating the solution of a differential equation represented by a plurality of different derivatives of a dependent variable and a plurality of factors individually modifying the different derivatives where the derivatives are to be integrated with respect to an independent variable, a digital computer, first means in the digital computer for providing first pluralities of signals individually representing the different derivatives, second means in the digital computer for providing second pluralities of signals individually representing the different factors, third means in the digital computer for providing signals representing successive increments in the independent variable to control successive cycles of computation, fourth means in the computer and operatively coupled to the first, second and third means in the computer for operating upon the first pluralities of signals in accordance with the values of individual ones of these pluralities of signals and in accordance with the values of the second pluralities of signals and the increments represented by the signals from the third means to obtain modifications in the signals in individual ones of the first pluralities in the successive cycles of computation, visual means operatively coupled to the first means for providing visual indications of the values represented by the signals in individual ones of the first pluralities, adjustable means for providing for controlled adjustments in the magnitude of the successive increments in the independent variable in accordance with controlled adjustments in the adjustable means and upon the presentation of visual indications by the visual means, and means operatively coupled to the adjustable means and to the third means in the digital computer for obtaining adjustments in the magnitude of the successive increments of the independent variable in accordance with the adjustments of the adjustable means.

33. The combination set forth in claim 32 wherein the digital computer is a general purpose digital computer.

34. In combination for facilitating the solution of a differential equation represented by a plurality of different derivatives of a dependent variable and a plurality of different factors individually modifying the different derivatives where the derivatives are to be integrated with respect to an independent variable, a digital computer, first means in the digital computer for providing first pluralities of signals individually and digitally representing the different derivatives, second means in the digital computer for providing second pluralities of signals individually and digitally representing the different factors, third means in the digital computer for providing third signals representing controlled increments in the independent variable to control successive cycles of computation, fourth means in the computer and operatively coupled to the first, second and third means for varying the first pluralities of signals in each cycle of computation in accordance with the patterns of the first and second pluralities of signals and in accordance with the magnitudes of the increments in the variable quantity and in an interrelationship dependent upon the differential equation to be solved, adjustable means for providing for controlled variations in the magnitude of the increments in the independent variable in accordance with controlled adjustments in the adjustable means, and means operatively coupled to the adjustable means and to the third means in the digital computer for adjusting the production of the third signals by the third means in accordance with the controlled adjustments of the adjustable means to obtain controlled variations in the magnitude of the increments in the independent variable.

35. In combination for facilitating the solution of a differential equation represented by a plurality of different derivatives of a dependent variable and a plurality of different factors individually modifying the different derivatives where the derivatives are to be integrated with respect to an independent variable, a digital computer, first means in the digital computer for providing first pluralities of signals individually and digitally representing the different derivatives, second means in the digital computer for providing second pluralities of signals individually and digitally representing the different factors, third means in the digital computer for providing third signals in the computer representing controlled increments in the independent variable to control successive cycles of computation, fourth means operatively coupled to the first, second and third means in the digital computer for obtaining variations in first particular ones of the first pluralities of signals in the successive cycles of computation in accordance with the magnitudes of the controlled increments in the independent variable and in accordance with the interrelationship between the different derivatives and different factors in the differential equation to be solved, fifth means operatively coupled to the first, second and third means in the digital computer for obtaining variations in others of the first pluralities of signals than the first particular ones of the first pluralities of signals and in a particular fraction of the successive cycles of computation and for obtaining such variations in accordance with the magnitudes of the controlled increments in the independent variable and in accordance with the interrelationship between the different derivatives and different factors in the differential equation to be solved, sixth means for providing visual indications of the values of individual ones of the different derivatives as represented by individual ones of the first pluralities of signals, seventh means for providing for controlled adjustments in the production of the third signals in accordance with the change in the values of the derivatives represented by the particular ones of the first pluralities of signals in the successive cycles of computation relative to the change in the values of the derivatives represented by the others of the first pluralities of signals in such successive cycles of computation and upon the presentation of the visual indications by the sixth means, and eighth means operatively coupled to the third and sixth means for adjusting the production of the third signals by the third means in accordance with the controlled adjustments of the adjustable means to obtain controlled variations in the magnitude of the increments in the independent variable.

36. In combination for facilitating the solution of a differential equation represented by a plurality of different derivatives of a dependent variable and a plurality of factors individually modifying the derivatives where the derivatives are to be integrated with respect to an independent variable, a digital computer, first means in the computer for providing first pluralities of signals individually representing the different derivatives, second means in the computer for providing second pluralities of signals individually representing the different factors, third means in the computer for providing third signals representing increments in the independent variable in successive cycles of computation, fourth means in the computer and operatively coupled to the first, second and third means in the computer for individually varying the signals in the first plurality in accordance with the interrelationship between the different derivatives and the different factors in the differential equation to be solved and in accordance with the magnitude of the increments in the independent variable in the successive cycles of computation, fifth means for providing for adjustments in individual ones of the first and second pluralities of signals to represent changes in the values of the individual derivatives and factors and adjustments in the production of the third signals to represent changes in the magnitude of each increment in the independent variable, and sixth means operatively coupled to the first, second, third and fifth means and responsive to adjustments in the fifth means for adjusting the individual ones of the first and second pluralities of signals and the production of the third signals in accordance with such adjustments in the fifth means.

37. The combination set forth in claim 36, including, seventh means operatively coupled to the first, second and third means for providing visual indications of the values represented by individual ones of the first and second pluralities of signals to control the adjustments of the fifth means.

38. In combination for facilitating the solution of a differential equation represented by a plurality of different derivatives of a dependent variable and a plurality of different factors individually modifying the different derivatives where the derivatives are to be integrated with respect to an independent variable, a digital computer, first means in the digital computer for providing first pluralities of signals individually and digitally representing the different derivatives, second means in the digital computer for providing second pluralities of signals individually and digitally representing the different factors, third means in the digital computer for providing third signals in the computer representing controlled increments in the independent variable to control successive cycles of computation.

fourth means operatively coupled to the first, second and third means in the computer for individually varying first particular ones of the first pluralities of signals in each cycle of computation in accordance with the interrelationship between the different derivatives and the different factors in the differential equation to be solved and in accordance with the magnitude of the increments in the independent variable in successive cycles of computation, fifth means operatively coupled to the first, second and third means in the computer for individually varying the signals in second particular ones of the first plurality in a particular fraction of the successive cycles of computation on a periodic basis in accordance with the interrelationship between the different derivatives and the different factors in the differential equation to be solved and in accordance with the magnitude of the increments in the independent variable in successive cycles of computation, sixth means for providing for adjustments in the particular fraction between the successive cycles of computation and the cycles of computation in which the second particular one of the first pluralities of signals become adjusted, and seventh means operatively coupled to the fifth and sixth means for providing adjustments, in accordance with the adjustments in the sixth means, between the successive cycles of computation and the cycles of computation in which the second particular ones of the first pluralities of signals become adjusted.

39. In combination for facilitating the solution of a differential equation represented by a functional relation between independent and dependent variables, derivatives, factors and parameters, some of them individually modifying the derivatives, a general purpose, digital computer, first means in the computer for storing first signals individually representing different derivatives of the dependent variable;

second means in the computer for storing second signals individually representing factors and parameters of the equation;

third means in the computer and operatively coupled to the first and second means for operating upon the first and second signals in an individual pattern of successive cycles of computation for progressively calculating values representative of the dependent variable as solutions of the differential equation to be solved;

fourth, externally accessible adjusting means connected to the computer for providing third, variable signals in representation of factors and/or parameters of the equation to be solved; and means in the computer for updating during each of the successive cycles of computation, individual ones of the second signals in accordance with the values represented by such individual ones of the third signals to include the third signals at least into the next iteration cycle.

40. The combination set forth in claim 39, including:

means operatively coupled to the first means in the computer for providing a visual display of individual ones of the first pluralities of signals to obtain indications of the individual adjustments to be made in the various initial conditions of the problem to be solved.

41. In combination of facilitating the solution of a differential equation represented by a functional relation between dependent and independent variables;

a general purpose digital computer;

first means in the computer for storing first signals individually representing the variables and the derivative or derivatives thereof;

second means in the computer for storing a particular signal representing an increment of an independent variable;

third means in the computer operatively coupled to the first and second means for operating the first signals in an individual pattern of successive iteration cycles of computation for progressively calculating values of the dependent variable in steps as determined by the increment of the independent variable;

fourth, externally accessible adjusting means connected to the computer for providing a variable signal in representation of said increment of the independent variable; and means in the computer for updating prior to a sequence of successive cycles of computation, said particular signal as stored by the second means in accordance with the value represented by the signal as provided by the fourth means.

42. In combination with the combination set forth in claim 41 and comprising an adjustable clock pulse source connected to the fourth means for adjusting the clock pulse period in accordance with the signal as provided by the fourth means in representation of the increment of said independent variable; and fifth means in the computer connected to be responsive to the pulses of the clock pulse source to provide commencement of an iteration cycle in response to a pulse of the clock pulse source.

43. In combination for a digital analog problem simulator, a general purpose digital computer, first means in the computer for storing first signals representative of a plurality of subroutines, each subroutine representing particular arithmetic operations;

second means in the computer for storing second signals representing operands for use by the subroutines of the plurality;

third means in the computer for storing third signals representative of providing particular sequences of executing particular ones of the subroutines as particular iteration cycles for progressively computing a solution of a differential equation;

fourth means in the computer and connected to the first, second and third means for operating upon the second signal in response to the first and third signals for obtaining fourth signals in representation of the solution and to be included in the second signals for obtaining the progressive iterations; and fifth means for providing a fifth signal and including means for manually adjusting the value represented by the fifth signal and connected to the computer so that the value of the fifth signal be included in the second signals in that in response to particular ones of the third signals, particular ones of the second signals are updated during each iteration in accordance with the adjusted value of the fifth signal.

44. The combination, as set forth in claim 43, and comprising externally accessible switching means connected to the computer for selecting particular ones among the subroutines of the plurality to be included in the iteration program.

45. In combination for providing digitally analog simulation, comprising:

a general purpose, digital computer having floating point arithmetic capabilities;

first means in the computer storing digital signals representative of dependent and independent variables and of parameters of a numerical equation including a digital signal representing digital representation of an increment for stepwise variation of the independent variable as an analog quantity;

second means in the computer progressively calculating the numerical values of the dependent variable in steps progressing with the independent variable as varied by the increment, the second means providing signals representative of the progressively calculated numerical values;

third means accessible externally to the computer and connected thereto for providing particular adjusting signals in form of particular digital signals variable independently from the operation of the second means; and means for connecting the third means to the second means of the computer to include the respectively adjusted particular signals in each calculating step as signals representing parameters of the equation, the particular signals as adjusted being included in the calculation of steps subsequent to the adjustment and as adjusted independently from the occurrence of the adjustment.

46. The combination, as set forth in claim 45, and including externally accessible means for providing second particular signals and being connected to the second means in the computer to include these adjusted signals as the increment for the stepwise variation of the independent variable.

47. In combination for providing manifestations of a solution for a differential equation having at least one dependent and at least one independent variable, a general purpose digital computer;

first means in the computer storing first signals representative of dependent and independent variables and of parameters of the equation;

second means in the computer for storing second signals representative of an iteration computing program for progressively calculating a dependent variable in steps of variations of the independent variable;

third means in the computer for processing the first signals under control of the second signals to obtain particular ones of the first signals representative of the dependent variable as function of the independent variable;

fourth means for providing a visible display of digital data;

switching means connected to the computer for selectively connecting the fourth means to the first means under control of the third means for controlling the display of the selected ones of a quantity as represented by one of the first signals and as updated pursuant to progression of the iteration program.

48. In combination for providing manifestations of a solution for a differential equation having dependent and independent variables, a general purpose, digital computer;

first means in the computer storing signals representative of dependent and independent variables and of parameters of the equation;

second means in the computer for storing second signals representative of an iteration computing program for progressively calculating a dependent variable in steps of variations of the independent variable;

third means in the computer storing third signals representative of a supplementary computing program for progressively varying particular ones of the first signals at lesser frequency than the iteration as determined by the second means as providing for variations of others of the first signals;

fourth means in the computer for obtaining variations in some of the first signals by operation and under control of the second and third means, the variations obtained including a sequence of signals representative of a dependent variable of the equation as a function of the independent variable in steps of increments thereof; and fifth means connected for providing adjustable signals representing the value of the increments for the independent variable as controlling the steps of providing the sequence of signals representing the dependent variable as function of the progressively varied independent variable in steps of the increments.

49. The combination, as set forth in claim 48, and including means connected for providing adjustable signals for adjusting the frequency of varying the particular ones of the first signals.

50. The combination, as set forth in claim 48, and including means under control of the fifth means to control repetition of the iteration and progression thereof when the increment representing a period of time has elapsed in real time.

51. The combination, as set forth in claim 50, including means for controlling the progressive variation of the particular ones of the first signals in steps within that portion of each of the real time periods not occupied for completion of an iteration as controlled by the fourth means.

52. In combination for providing manifestations of a solution for a differential equation which has dependent and independent variables and parameters, a general purpose digital computer;

first means in the computer storing first signals representative of dependent and independent variables and of parameters of the equation;

second means in the computer storing second signals representative of subroutines for the calculations of numbers including iteration type integration, and including subroutines needed for calculation and solution of a particular differential equation;

third means in the computer for storing third signals representative of combining selective sequences of the second signals for progressively calculating the dependent variable in the particular equation in steps of variation of the independent variable as represented by one of the first signals by establishing an iteration computing program of the particular differential equation;

fourth means in the computer for processing the first signals under control of the second and third signals to obtain particular ones of the first signals representative of the dependent variable as a function of the independent variable;

means adjustable to different positions for providing fifth signals independently from the operation of the fourth means; and fifth means operatively coupled to the adjustable means and to the first and fourth means in the computer and providing to the computer the fifth signals to operate as particular ones of the first signals for each iteration cycle as controlled by the fourth means.

References Cited

UNITED STATES PATENTS

| | | | |
|---|---|---|---|
| 3,037,192 | 5/1962 | Everett | 340—172.5 |
| 3,166,636 | 1/1965 | Rutland et al. | 178—24 |
| 3,187,321 | 6/1965 | Kameny | 340—345 |
| 3,248,528 | 4/1966 | Campeau | 235—167 |
| 3,248,705 | 4/1966 | Dammann et al. | 340—172.5 |
| 3,328,763 | 6/1967 | Rathbun et al. | 340—172.5 |
| 3,341,819 | 9/1967 | Emerson | 340—172.5 |
| 3,355,714 | 11/1967 | Culler | 340—172.5 |

OTHER REFERENCES

AFIPS: Proceeding, 1962, Spring Joint Computer Conference, May 1–3, 1962, vol. 21, pp. 129–138.

PAUL J. HENON, *Primary Examiner.*

R. B. ZACHE, *Assistant Examiner.*